(12) United States Patent
Karabinis et al.

(10) Patent No.: US 7,203,490 B2
(45) Date of Patent: Apr. 10, 2007

(54) SATELLITE ASSISTED PUSH-TO-SEND RADIOTERMINAL SYSTEMS AND METHODS

(75) Inventors: Peter D. Karabinis, Cary, NC (US); Boris Bogatin, Huntingdon Valley, PA (US); Brian M. Deobald, Bethesda, MD (US); Santanu Dutta, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 318 days.

(21) Appl. No.: 10/795,620

(22) Filed: Mar. 8, 2004

(65) Prior Publication Data

US 2004/0192200 A1 Sep. 30, 2004

Related U.S. Application Data

(60) Provisional application No. 60/477,522, filed on Jun. 11, 2003, provisional application No. 60/473,959, filed on May 28, 2003, provisional application No. 60/457,118, filed on Mar. 24, 2003, provisional application No. 60/457,043, filed on Mar. 24, 2003.

(51) Int. Cl.
   *H04Q 7/20* (2006.01)
   *H04B 7/185* (2006.01)
   *H04M 1/00* (2006.01)
(52) U.S. Cl. .................. 455/428; 455/561; 455/13.3
(58) Field of Classification Search ............... 455/519, 455/13.1, 427, 428, 507, 550.1, 13.3, 561; 370/354
   See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |

(Continued)

FOREIGN PATENT DOCUMENTS

EP 0 506 255 A2 9/1992

(Continued)

OTHER PUBLICATIONS

Andrews et al., *Tripling the Capacity of Wireless Communications Using Electromagnetic Polarization*, Nature, vol. 409, Jan. 18, 2001, pp. 316-318.

(Continued)

*Primary Examiner*—Tilahun Gesesse
(74) *Attorney, Agent, or Firm*—Myers Bigel Sibley & Sajovec, P.A.

(57) ABSTRACT

A satellite is used to route push-to-send messages among terrestrial base stations. Reduced push-to-send delays thereby may be provided, when a source push-to-send radioterminal is widely separated from a destination push-to-send radioterminal. Satellite routing only may be used when the source push-to-send radioterminal and the destination push-to-send radioterminal are not communicating with a single terrestrial base station or with a group of terrestrial base stations that are proximate one another. A destination base station that is communicating with the destination push-to-send radioterminal may be determined at the satellite, at a satellite gateway and/or at a central server.

109 Claims, 27 Drawing Sheets

U.S. PATENT DOCUMENTS

| | | |
|---|---|---|
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,717,830 A * | 2/1998 | Sigler et al. ............. 455/426.1 |
| 5,724,666 A | 3/1998 | Dent |
| 5,737,685 A * | 4/1998 | Locascio et al. ........... 455/12.1 |
| 5,752,196 A | 5/1998 | Ahvenainen et al. |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,872,544 A | 2/1999 | Schay |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,073,006 A * | 6/2000 | Sawyer et al. ............... 455/410 |
| 6,073,014 A | 6/2000 | Blanchard et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A * | 8/2000 | Mallinckrodt ............... 455/522 |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,301,263 B1 * | 10/2001 | Maggenti .................... 370/462 |
| 6,324,405 B1 | 11/2001 | Young et al. |
| 6,339,707 B1 | 1/2002 | Wainfan et al. |
| 6,356,755 B1 * | 3/2002 | Valentine et al. ........ 455/435.1 |
| 6,418,147 B1 | 7/2002 | Wiedeman |
| 6,418,316 B2 | 7/2002 | Hildebrand et al. |
| 6,445,926 B1 | 9/2002 | Boch et al. |
| 6,449,461 B1 | 9/2002 | Otten |
| 6,477,150 B1 * | 11/2002 | Maggenti et al. ........... 370/312 |
| 6,522,865 B1 | 2/2003 | Otten |
| 6,526,278 B1 | 2/2003 | Hanson et al. |
| 6,591,111 B1 * | 7/2003 | Stosz et al. ................. 455/518 |
| 6,628,919 B1 | 9/2003 | Curello et al. |
| 6,684,057 B2 | 1/2004 | Karabinis |
| 6,735,437 B2 | 5/2004 | Mayfield et al. |
| 6,763,226 B1 * | 7/2004 | McZeal, Jr. ................ 455/90.2 |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 2001/0012775 A1 | 8/2001 | Modzelesky et al. |
| 2002/0006117 A1 | 1/2002 | Duske, Jr. et al. |
| 2002/0013149 A1 | 1/2002 | Threadgill et al. |
| 2002/0041575 A1 | 4/2002 | Karabinis et al. |
| 2002/0072389 A1 | 6/2002 | Ward et al. |
| 2002/0090942 A1 | 7/2002 | Karabinis et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054760 A1 | 3/2003 | Karabinis |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0143949 A1 | 7/2003 | Karabinis |
| 2003/0149986 A1 | 8/2003 | Mayfield et al. |
| 2003/0153267 A1 | 8/2003 | Karabinis |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |

2006/0040659 A1  2/2006  Karabinis

FOREIGN PATENT DOCUMENTS

| EP | 0 597 225 A1 | 5/1994 |
|---|---|---|
| EP | 0 506 255 B1 | 11/1996 |
| EP | 0 748 065 A2 | 12/1996 |
| EP | 0 755 163 A2 | 1/1997 |
| EP | 0 797 319 A2 | 9/1997 |
| WO | WO 01/54314 A1 | 7/2001 |

OTHER PUBLICATIONS

Beach et al., *Capacity and Service Extension for Future Wireless Networks Using Adaptive Antennas*, Antennas and Propagation, Conference Publication No. 407, Apr. 4-7, 1995, pp. 125-129.

Cho et al., *Fundamental Techniques and Future Trends in Smart Antenna Technology*, NTT R&D, vol. 51, No. 6, 2002, pp. 437-446.

Cusani et al., *A Simple Polarization-Recovery Algorithm for Dual-Polarized Cellular Mobile-Radio Systems in Time-Variant Faded Environments*, IEEE Transactions on Vehicular Technology, vol. 49, No. 1, Jan. 2000, pp. 220-228.

Czylwik, *Downlink Beamforming for Mobile Radio Systems With Frequency Division Duplex*, The 11th IEEE International Symposium on Personal, Indoor and Mobile Radio Communications, vol. 1, Sep. 18-21, 2000, pp. 72-76.

Gardner et al., *Making the Most Out of Spectral Redundancy in GSM: Cheap CCI Suppression*, IEEE Conference Record of the Thirty-Fifth Asilomar Conference on Signals, Systems and Computers, vol. 1, Nov. 4-7, 2001 pp. 883-889.

Gerlach, *Cellular CDMA Downlink Beamforming in Multipath Environments*, 4th CDMA International Conference and Exhibition, The Realization of IMT-2000, vol. 2, 1999, pp. 270-276.

Hafeez et al., *Capacity and Quality Enhancement for ANSI-136 Downlink Using Interference Cancellation and Beamforming*, IEEE 52 nd Vehicular Technology Conference, vol. 5, Sep. 24-28, 2000, pp. 2414-2421.

Jeng et al., *Experimental Evaluation of Smart Antenna System Performance for Wireless Communications*, IEEE Transactions on Antennas and Propagation, vol. 46, No. 6, Jun. 1998, pp. 749-757.

Lehmann et al., *Evaluations of Link-Level Performance Improvements by Using Smart Antennas for the TD-CDMA Based UTRA TDD Mobile Radio Systems*, 52nd IEEE Vehicular Technology Conference, vol. 3 , Sep. 24-28, 2000, pp. 1328-1332.

Li et al., *Spatial Multiuser Access With MIMO Smart Antennas for OFDM Systems*, IEEE 54th Vehicular Technology Conference, vol. 3, Oct. 7-11, 2001, pp. 1553-1557.

Liu et al., *Smart Antennas in Wireless Systems: Uplink Multiuser Blind Channel and Sequence Detection*, IEEE Transactions on Communications, vol. 45, No. 2, Feb. 1997, pp. 187-199.

Marzetta et al., *Capacity of a Mobile Multiple-Antenna Communication Link in Rayleigh Flat Fading*, IEEE Transactions on Information Theory, vol. 45, No. 1, Jan. 1999, pp. 139-157.

Miller et al., *Estimation of Co-Channel Signals With Linear Complexity*, IEEE Transactions on Communications, vol. 49, No. 11, Nov. 2001, pp. 1997-2005.

Mohamed et al., *A Combined Antenna Array and Multi-User Detection DS-CDMA Receiver in Single-Path and Multi-Path Fading Channels*, Wireless Personal Communications, vol. 20, 2002, pp. 251-265.

Mohamed et al., *A Low-Complexity Combined Antenna Array and Interference Cancellation DS-CDMA Receiver in Multipath Fading Channels*, IEEE Journal on Selected Areas in Communications, vol. 20, No. 2, Feb. 2002, pp. 248-256.

Monsen, *MMSE Equalization of Interference on Fading Diversion Channels*, IEEE Transactions on Communications, Vol. Com-32, No. 1, Jan. 1984, pp. 5-12.

Monsen, *Multiple-Access Capacity in Mobile User Satellite Systems*, IEEE Journal on Selected Areas in Communications, vol. 13, No. 2, Feb. 1995, pp. 222-231.

Naguib et al., *Applications of Space-Time Block Codes and Interference Suppression for High Capacity and High Data Rate Wireless Systems*, Conference Record of the Thirty-Second Asilomar Conference on Signals, Systems & Computers, vol. 2, Nov. 1-4, 1998, pp. 1803-1810.

Naguib et al., *Space-Time Block Codes and Interference Suppression for High Capacity Wireless Systems*, Conference Record of the Thirty-Section Asilomar Conference on Signals, Systems and Computers, vol. 2, Nov. 1-4, 1998, pp. 1803-1810.

Nishimori et al., *Automatic Calibration Method Using Transmitting Signals of an Adaptive Array for TDD Systems*, IEEE Transactions on Vehicular Technology, vol. 50, No. 6, Nov. 2001, pp. 1636-1640.

Papadopoulos et al., *Reduction of Mixed Cochannel Interference in Microcellular Shared Time-Division (STDD) Systems*, IEEE Transactions on Vehicular Technology, vol. 47, No. 3, Aug. 1998, pp. 842-855.

Rapajic, *Information Capacity of a Multipath Mobile Communication Channel With Large Number of Receiving Antennas*, IEEE ITW2001, Sep. 2-7, 2001, pp. 104-106.

Razavilar et al., *Software Radio Architecture With Smart Antennas: A Tutorial On Algorithms and Complexity*, IEEE Journal on Selected Areas in Communications, vol. 17, No. 4, Apr. 1999, pp. 662-676.

Suthaharan et al., *Space-Time Coded MIMO-OFDM for High Capacity and High Data-Rate Wireless Communication Over Frequency Selective Fading Channels*, IEEE 4th International Workshop Mobile and Wireless Communications Network, 2002, Sep. 9-11, 2002, pp. 424-428.

Wells, *Increasing the Capacity of GSM Cellular Radio Using Adaptive Antennas*, IEE Proc.-Commun., vol. 143, No. 5, Oct. 1996, pp. 304-310.

Wolniansky et al., *V-BLAST: An Architecture for Realizing Very High Data Rates Over the Rich-Scattering Wireless Channel*, Invited paper, Proc. ISSSE-98, Pisa, Italy, Sep. 29, 1998, pp. 295-300.

Wong et al., *Adaptive Antennas at the Mobile and Base Stations in an OFDM/TDMA System*, IEEE Transactions on Communications, vol. 49, No. 1, Jan. 2001, pp. 195-206.

Wong et al., *Performance Enhancement of Multiuser MIMO Wireless Communication Systems*, IEEE Transactions on Communications, vol. 50, No. 12, Dec. 2002, pp. 1960-1970.

Notification of Transmittal of the International Search Report and the Written Opinion of the International Searching Authority, or the Declaration, International Search Report and Written Opinion of the International Searching Authority, PCT/US04/08012, Jun. 22, 2006.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", Wireless Networks, Vo. 4, 1998, pp. 189-198.

\* cited by examiner

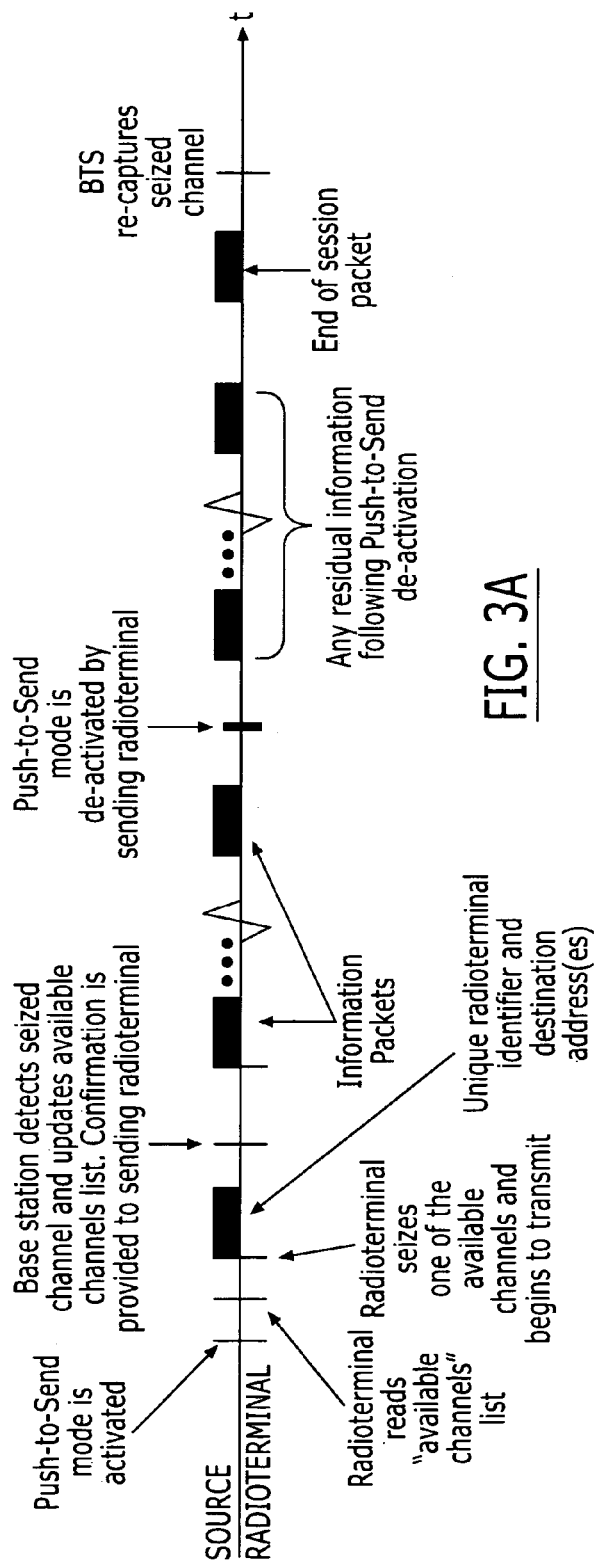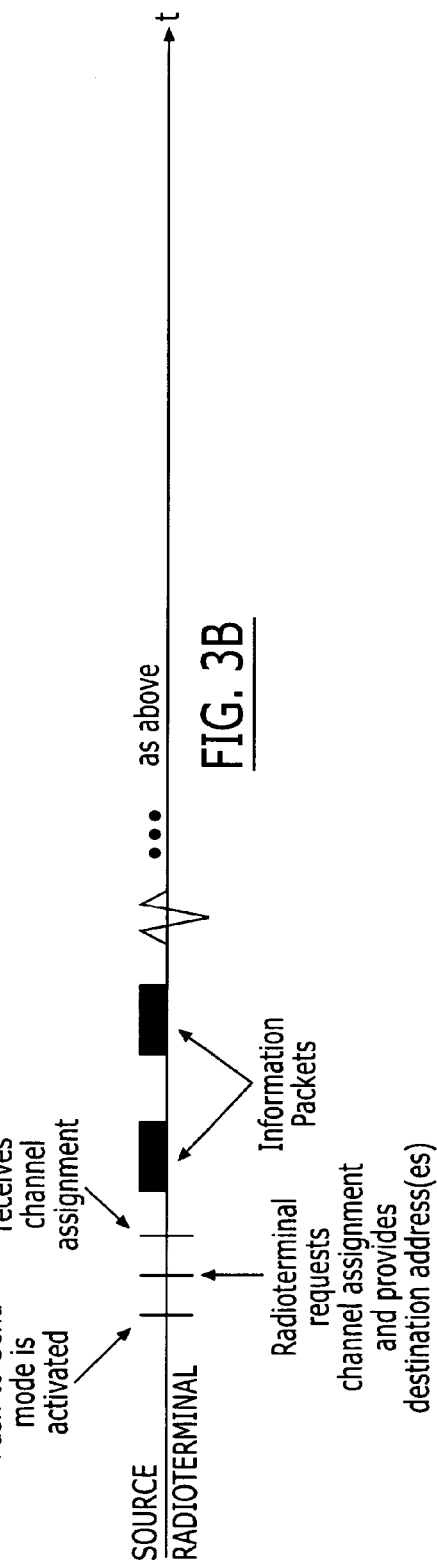
FIG. 3A
FIG. 3B

| PtS Radioterminal | Base Station | Likely Destinations |
|---|---|---|
| ⋮ | ⋮ | ⋮ |

SATELLITE ASSISTED PUSH-TO-SEND RADIOTERMINAL SYSTEMS AND METHODS

CROSS-REFERENCE TO PROVISIONAL APPLICATIONS

This application claims the benefit of Provisional Application Ser. No. 60/457,043, entitled Satellite Assisted Push-To-Send Radiotelephone Systems and Methods, filed Mar. 24, 2003; Provisional Application Ser. No. 60/457,118, entitled Radio Frequency Communication Systems and Methods That Use Polarization Orthogonality to Double Channel Capacity, filed Mar. 24, 2003; Provisional Application Ser. No. 60/473,959, entitled Systems and Methods That Enable Co-Channel Communications With a Base Station of a Plurality of Radioterminals, filed May 28, 2003; and Provisional Application Ser. No. 60/477,522, entitled Satellite Assisted Push-To-Send Radioterminal Systems, Methods and Protocols, filed Jun. 11, 2003; all of which are assigned to the assignee of the present invention, the disclosures of all of which are hereby incorporated herein by reference in their entirety as if set forth fully herein.

FIELD OF THE INVENTION

This invention relates to push-to-send radioterminal systems, methods and protocols, also referred to as push-to-talk, group call or trunked radioterminal systems, methods and protocols.

BACKGROUND OF THE INVENTION

Push-to-send radioterminal systems, methods and protocols are increasingly being used to provide "walkie talkie" capability in cellular communication systems. Radioterminals marketed by Nextel Communications, Inc., for example, can provide this capability. Such radioterminals are distinguishable by a separate push-to-send or push-to-talk button.

When push-to-send capabilities are provided over one or more proximate terrestrial base stations, using an appropriate air interface protocol, an acceptably low push-to-send delay may be provided. However, there is an increasing desire to provide push-to-send capability over a large geographical region and even to provide nationwide, continent-wide, and/or even global push-to-send capability. Unfortunately, in these wider geographic regions an unacceptable delay, on the order of three or four seconds or more, may be produced.

SUMMARY OF THE INVENTION

Embodiments of the present invention use a satellite to route push-to-send messages among terrestrial base stations. In some embodiments, a satellite of a satellite radioterminal communications system is used to route push-to-send messages among terrestrial base stations. In other embodiments, a satellite is used to at least partially bypass terrestrial routing of push-to-send messages among terrestrial base stations. In yet other embodiments, a satellite is used to route selected push-to-send messages among terrestrial base stations. Push-to-send signaling messages and/or push-to-send communications messages may be routed via the satellite. Reduced push-to-send delays thereby may be provided in some embodiments of the present invention, especially when a source push-to-send radioterminal is widely separated from a destination push-to-send radioterminal.

In some embodiments, a determination is made as to whether a source push-to-send radioterminal and a destination push-to-send radioterminal are communicating with a single terrestrial base station or a group of terrestrial base stations that are proximate one another. The satellite is used to route a push-to-send message from the source push-to-send radioterminal to the destination push-to-send radioterminal if the source push-to-send radioterminal and the destination push-to-send radioterminal are not communicating with the single terrestrial base station or terrestrial base stations that are proximate one another. In some embodiments, this determination may be made by accessing a listing of terrestrial base stations and push-to-send radioterminals that are communicating therewith, and determining from the listing whether the source push-to-send radioterminal and the destination push-to-send radioterminal are communicating with a single base station or with terrestrial base stations that are proximate one another. The listing may be associated with a satellite gateway for the satellite, with the single terrestrial base station or at least one of the terrestrial base stations that are proximate one another, and/or may be independent of the satellite gateway and the terrestrial base stations.

In other embodiments, in order to provide the listing of terrestrial base stations and push-to-send radioterminals that are communicating therewith, the source push-to-send radioterminal and the destination push-to-send radioterminal may register with the listing. In some embodiments, registration is performed upon power-on of a radioterminal and/or upon movement of the radioterminal among terrestrial base stations.

In some embodiments, the terrestrial base stations communicate with push-to-send radioterminals using at least one satellite band frequency. In these embodiments, the terrestrial base stations may be part of an ancillary terrestrial network that is described, for example, in U.S. Patent Application Publication Nos. US 2003/0054760, US 2003/0054761, US 2003/0054814, US 2003/0073436, US 2003/0054762, US 2003/0153267, US 2003/0224785, US 2002/0006117, US 2002/0072389, US 2002/0041575, US 2002/0090942, US 2001/0012775, US 2002/0013149, US 2003/0068978, US 2003/0143949, US 2003/0153308 and/or US 2003/0054815, all of which are assigned to the assignee of the present invention, the disclosures of all of which are hereby incorporated herein by reference in their entirety as if set forth fully herein. These Published U.S. Patent Applications will be referred to collectively herein as the "Published Applications".

In still other embodiments of the present invention, a satellite is used to route push-to-send messages among terrestrial base stations by sending a push-to-send message from a source push-to-send radioterminal to a first terrestrial base station communicating therewith, and sending the push-to-send message from the first terrestrial base station to the satellite. The push-to-send message is then sent from the satellite to a satellite gateway that is associated with the satellite. A determination is then made by the satellite gateway, of a second terrestrial base station that is communicating with the destination push-to-send radioterminal. The push-to-send message is then sent from the satellite gateway back to the satellite along with routing information that identifies the second terrestrial base station. The push-to-send message is then sent from the satellite to the second terrestrial base station, and the push-to-send message is then sent from the second terrestrial base station to the destination push-to-send radioterminal. It will be understood that the determination by the satellite gateway of a second terrestrial base station that is communicating with the destination push-to-send radioterminal may only be selectively performed for a first push-to-send message from the source push-to-send radioterminal to the destination push-to-send radioterminal, and may not need to be performed for subsequent push-to-send messages therebetween that are closely spaced in time to the first push-to-send message.

In some embodiments, routing to the satellite may only be performed if it is first determined that the source push-to-send radioterminal and the destination push-to-send radioterminal are not communicating with the first terrestrial base station or that the second terrestrial base station is not proximate the first terrestrial base station. These determinations may be performed by accessing a listing, as was described above. Moreover, in sending the push-to-send message from the first terrestrial base station to the satellite, the push-to-send message may be concentrated with other communications from the first terrestrial base station to the satellite. Also, in sending the push-to-send message from the second terrestrial base station to the destination radioterminal, the push-to-send message may be deconcentrated from other communications from the satellite to the second terrestrial base station.

It will also be understood that, in some embodiments, the push-to-send message may be sent from the second terrestrial base station to multiple destination radioterminals that communicate therewith. In other embodiments, the push-to-send message may be sent from the satellite to multiple second base stations and then to multiple destination radioterminals that communicate therewith. In some embodiments, the push-to-send message is sent from the satellite to the second terrestrial base station using a satellite spot beam that covers a plurality of terrestrial base stations including the second terrestrial base station. The push-to-send message may be ignored at the plurality of terrestrial base stations that are covered by the satellite spot beam, except for the second terrestrial base station.

In some embodiments of the present invention, prior to sending the push-to-send message from the satellite gateway back to the satellite along with routing information that identifies the second terrestrial base station, the destination push-to-send radioterminal may be interrogated to determine whether it is capable of receiving the push-to-send message. Interrogation may be selectively performed for a first push-to-send message, but may not need to be performed for subsequent push-to-send messages that are closely spaced in time to the first push-to-send message.

In some embodiments, when a push-to-send message is sent from a source push-to-send radioterminal to multiple destination push-to-send radioterminals, routing of the push-to-send message to all of the second radioterminals may be via the satellite even when one or more of the second radioterminals are communicating with the first terrestrial base station or a proximate terrestrial base station. These embodiments can equalize the push-to-send delay times for all of the second radioterminals, even when some destination radioterminals are relatively close to, and other destination radioterminals are relatively far from, the source radioterminal.

In some embodiments of the present invention, the push-to-send message is sent from the source push-to-send radioterminal to the first terrestrial base station communicating therewith, by seizing an uplink channel of the first terrestrial base station by the source push-to-send radioterminal, receiving confirmation from the first terrestrial base station in response to the seizing of the uplink channel, and then sending the push-to-send message over the uplink channel in response to the confirmation. In other embodiments, the source push-to-send radioterminal requests an uplink channel from the first terrestrial base station, receives assignment of an uplink channel from the first terrestrial base station, and then sends the push-to-send message over the assigned uplink channel. Finally, in some embodiments, the push-to-send message is sent to the first terrestrial base station over a return link that uses a return link alphabet, and the push-to-send message is sent from the second base station to the destination radioterminal over a forward link that uses a forward link alphabet that has more symbols than the return link alphabet. Moreover, in some embodiments, the source push-to-send radioterminal sends the push-to-send message to the first terrestrial base station over a channel of the return link in a manner that collides with at least one other message from a radioterminal to the first terrestrial base station, and the first terrestrial base station is configured to decode both the push-to-send message and the at least one other message.

In other embodiments, prior to the source push-to-send radioterminal receiving confirmation from the first terrestrial base station in response to seizing of the uplink channel, a determination is made of at least one likely destination push-to-send radioterminal based upon a listing of likely destination push-to-send radioterminals that is associated with the source push-to-send radioterminal. A determination also is made as to whether the at least one likely destination push-to-send radioterminal is able to receive the push-to-send message. The confirmation is sent to the source push-to-send radioterminal upon determining that the at least one likely destination push-to-send radioterminal is able to receive the push-to-send message. The determination may be made by including in the listing that was described above, an indicator that indicates if the destination push-to-send radioterminal is able to receive push-to-send messages. The determination may be made by interrogating the at least one likely destination push-to-send radioterminal. These determinations of likely destination push-to-send radioterminals and their ability to receive a push-to-send message may also be performed in other embodiments of the present invention, wherein an uplink channel is assigned by the first terrestrial base station, rather than seized by the source push-to-send radioterminal.

In other embodiments of the present invention, a satellite is used to route push-to-send messages among terrestrial base stations by sending a push-to-send message from a source push-to-send radioterminal to a first terrestrial base station communicating therewith, and sending the push-to-send message from the first terrestrial base station to the satellite. A determination is made at the satellite of a satellite spot beam that covers a second terrestrial base station that is communicating with the destination push-to-send radioterminal. The push-to-send message is then sent from the satellite to the second terrestrial base station over the spot beam that was determined, and the push-to-send message is then sent from the second terrestrial base station to the destination push-to-send radioterminal. Accordingly, these embodiments may make the determination at a satellite itself rather than at a satellite gateway. These embodiments can thereby potentially reduce push-to-send delays at the potential expense of greater complexity at the satellite. As was described above in connection with other embodiments, these embodiments may also selectively route to the satellite if the destination push-to-send radioterminal is not communicating with the first terrestrial base station or with a base station proximate thereto, may use a listing to identify the spot beam, may ignore push-to-send messages at other base stations that are included in the satellite spot beam, may obtain an uplink channel by seizing the uplink channel or by receiving assignment of an uplink channel, may use fewer symbols in the return link alphabet than in the forward link alphabet, may decode colliding messages and/or may use a likely destination push-to-send radioterminal list, as was described extensively above.

In other embodiments of the present invention, a satellite is used to route push-to-send messages among terrestrial base stations by configuring a first multi-mode radioterminal to use a first communication protocol and/or a first air interface, in response to activation of a push-to-send mode. A push-to-send message is sent from the first multi-mode radioterminal to a first terrestrial base station communicating therewith using the first communication protocol and/or the first air interface. The push-to-send message is then sent from the terrestrial base station to the satellite. The push-to-send message is then sent from the satellite to a second terrestrial base station that is communicating with a second multi-mode radioterminal, either directly from the satellite or via a satellite gateway, as was described above. The second multi-mode radioterminal is configured to use the first communication protocol and/or the first air interface, or is configured to use a second communication protocol and/or a second air interface that is different from the first communication protocol and/or the first air interface, in response to the second terrestrial base station. The push-to-send message is then sent from the second terrestrial base station to the second multi-mode radioterminal using the first and/or second communication protocol and/or air interface. Accordingly, these embodiments of the invention can use multiple communications protocols and/or air interfaces for push-to-send messages.

Yet other embodiments of the invention transmit push-to-send messages over a terrestrial wireless network using a satellite frequency band. Thus, an ancillary terrestrial network as was described in one or more of the Published Applications, may be used to transmit push-to-send radioterminal messages, with or without use of a satellite, using a satellite frequency band. Any of the above-described embodiments also may be combined with the use of a satellite frequency band.

It will be understood by those having skill in the art that embodiments of the present invention were described above primarily with respect to method aspects. However, other embodiments of the present invention provide systems, terrestrial base stations, satellites, satellite gateways, servers and radioterminals according to any of the embodiments that were described above.

BRIEF DESCRIPTION OF THE DRAWINGS

FIGS. 3A and 3B are timing diagrams of operations for communicating between a source radioterminal and a base station according to various embodiments of the present invention.

DETAILED DESCRIPTION

Figure 1:
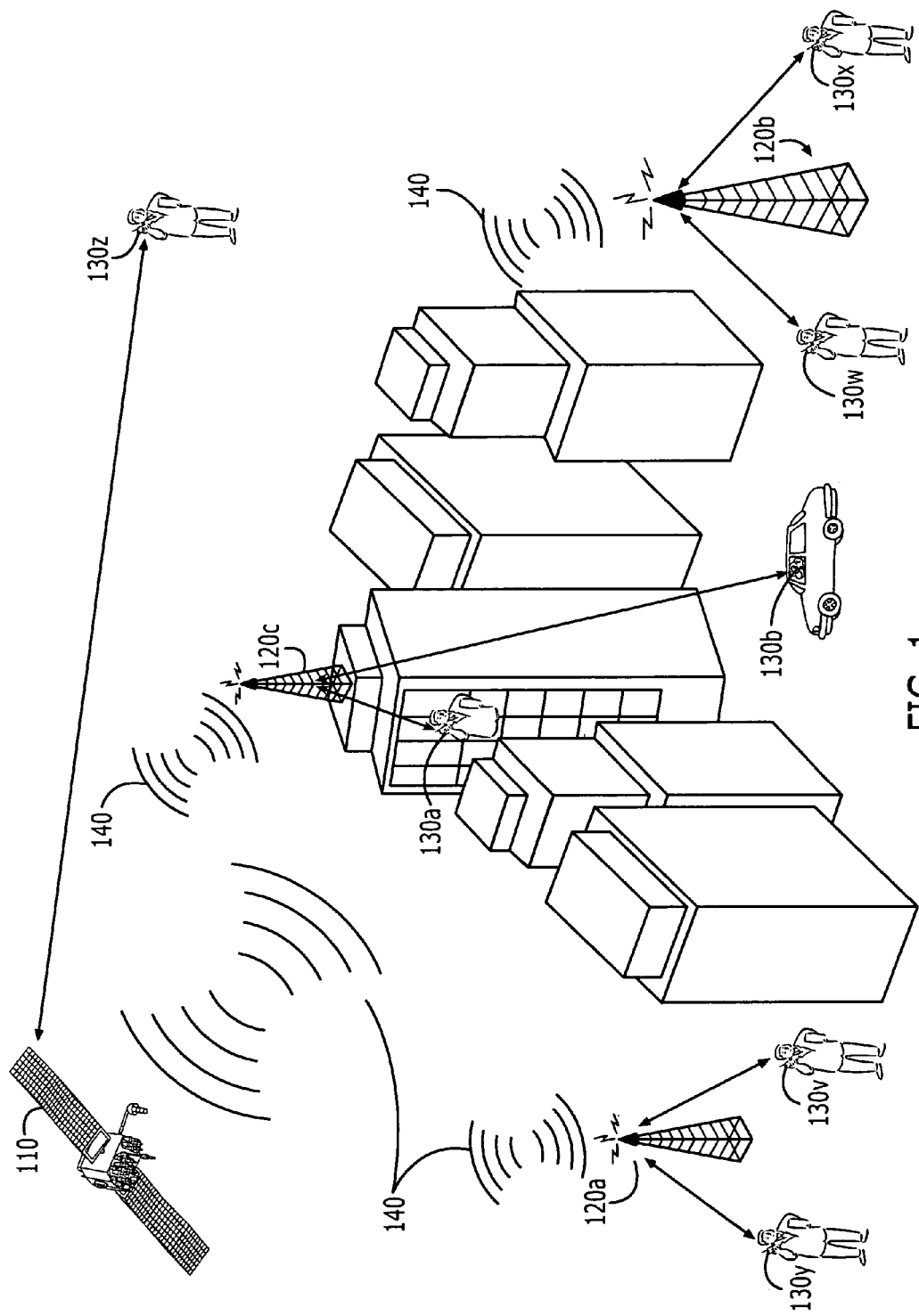
FIGS. 1 and 2 are diagrams of push-to-send radioterminal communication methods and systems according to various embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In push-to-send radioterminal systems and methods, a plurality of radioterminals having push-to-send capability may interface with a plurality of terrestrial base stations over a wide geographic area. Conventionally, terrestrial routing using terrestrial cellular and/or other infrastructure may be used to determine to which base station(s) the receiving radioterminals are registered. This may be time consuming, especially when providing service over a broad geographic region, and may introduce unacceptable delay in setting up a call, particularly when the push-to-send call set-up protocol is suboptimum and/or burdened by legacy features that may be unrelated to push-to-send functionality.

In sharp contrast, some embodiments of the present invention utilize a satellite, a satellite gateway and/or a central server that is accessible by a satellite gateway, to store a listing of the associated base stations for all radioterminals that are registered and/or all registered radioterminals that have push-to-send capability. The listing may be a global or centralized listing of all system-wide registered radioterminals, or only of those system-wide registered radioterminals that have push-to-send capabilities. The centralized listing may be provided at the satellite, at the satellite gateway and/or in a central server that is not associated with the satellite gateway. By routing a push-to-send signaling protocol and/or communications information via a satellite and, in some embodiments, via a satellite gateway, push-to-send delays may be reduced.

In some embodiments, the satellite may be independent of, and/or may be using different service links from, the terrestrial cellular system and some satellite capacity may be used to implement push-to-send registration and routing. In other embodiments, the terrestrial base stations are configured to operate as an ancillary terrestrial network for satellite radioterminal communications as described, for example, in one or more of the Published Applications.

In particular, when a radioterminal is turned on, one of its initial functions is to synchronize with a system, typically by acquiring the system's Broadcast Control CHannel (BCCH), and to register with that system. After a radioterminal has achieved synchronization with a system, the radioterminal registers with that system by transmitting identifying information. The system may thus know whether a given radioterminal is on or off, and the location of that radioterminal, based at least on the location of the infrastructure (i.e., the base station) that has received the radioterminal's identifying information (registration message). As the radioterminal's position may change, due to the radioterminal's mobility, and the radioterminal may move into the service area of other infrastructure, the radioterminal may re-register with the new infrastructure and may also de-register with the infrastructure that it had originally registered with. As such, the system may continue to have current (or near current) knowledge of at least a measure of the location of a radioterminal.

Some embodiments of the present invention may contain a Space-Based Network (SBN) and an Ancillary Terrestrial Network (ATN). Elements of the two networks may be integrated, and information may flow between the two, unidirectionally or bidirectionally. The SBN may include a Space-Based Component (SBC) comprising one or more satellites, and a Ground-Based Component (GBC) comprising one or more satellite gateways and peripheral facilities such as a network operations center. The ATN may include a plurality of Ancillary Terrestrial Components (ATCs) that may reuse at least some of the frequencies of the SBN and may also include other terrestrial infrastructure associated with cellular/PCS band(s), unlicensed-use band(s), and/or other bands. The ATN and the SBN may be configured to exchange information wirelessly and/or otherwise. The SBC may comprise one or more geostationary satellites and/or one or more non-geostationary satellites.

It may be advantageous for a system to include at least one location that is configured to maintain a current list of all (system-wide) registered radioterminals. Such location may be, for example, at or associated with, a satellite gateway.

In some embodiments, each time a radioterminal is turned on, synchronizes with a BCCH, and registers with at least one of the system's infrastructure facilities, the identity of that radioterminal may be coupled with the identity of the infrastructure facility that the radioterminal has registered with and both may be relayed to the at least one location to become part of a record comprising all currently active system-wide (turned-on and able to receive and/or transmit) radioterminals. Thus, in some embodiments, when the Push-to-Send (PtS) function of a source radioterminal is activated, in order for the source radioterminal to transmit information to a destination radioterminal the system may, following reception of a message indicating the intentions of the source radioterminal, first determine whether the destination radioterminal is registered. This determination may be made by examining a current list of system-wide registered radioterminals that may be maintained, as already stated, by a satellite gateway. If the destination radioterminal is found to be registered, the system may interrogate the destination radioterminal to determine if it is currently capable of receiving and/or desires to receive. In response to a confirmation by the destination radioterminal, the system may inform the source radioterminal to start transmission of information intended for the destination radioterminal.

In some embodiments, the above may occur each time the PtS function of a source radioterminal wishing to transmit information to a destination radioterminal is activated. In some other embodiments, the above may occur only initially, prior to the source radioterminal transmitting its first PtS message to the destination radioterminal, with subsequent message(s) between the source and destination radioterminals, occurring within a predetermined time interval of the first, being transmitted without confirmation that the receiving radioterminal is on and able to receive and/or desires to receive. The need for subsequent confirmation(s) may be reduced or eliminated based on a recognition that for a typical PtS session, a plurality of messages may be exchanged between two radioterminals over a relatively short interval of time. Thus, following a first successful PtS packet exchange (subject to confirmation as described above) the subsequent session packets may also be exchanged successfully (without the need for confirmations), since both radioterminals will likely be maintained on and in locations able to receive and/or transmit (PtS sessions tend to be short).

In addition to including at least one location that is configured to maintain a current list of all (system-wide) registered radioterminals, a base station and/or other infrastructure facility may be configured, according to some embodiments of the present invention, to maintain a current list of radioterminals that are registered with that base station and/or other infrastructure facility. As such, PtS sessions that involve radioterminals being served by the same base station and/or other infrastructure facility, such as a group of base stations that are proximate one another, may be served more efficiently locally, as will be described in greater detail hereinbelow.

Moreover, in other embodiments, the centralized listing of system-wide registered radioterminals, or those system-wide registered radioterminals that have push-to-send capability, may be provided in one or more central servers that need not be associated with a satellite gateway. Thus, in some embodiments, satellite and/or terrestrial links may be used for routing between the central server and the base stations(s) or Base Transceiver System(s) (BTS) associated with the intended destination radioterminal(s) and/or source radioterminal.

In other embodiments, in addition to a base station and/or other infrastructure facility being configured to maintain a current list of locally registered radioterminals, the base station and/or other infrastructure facility may also be configured to receive, and associate with each locally registered radioterminal, a list of registered destinations that the locally registered radioterminal is likely to initiate communications with. Configuring infrastructure with a list of registered likely destinations for each locally registered radioterminal may be advantageously used in some embodiments to further reduce the PtS call set-up delay, as will be discussed further below.

In accordance with some embodiments of the invention, elements of an architecture of a wireless communications system/method providing satellite assisted PtS communications is illustrated in FIG. 1. As is illustrated in FIG. 1, these systems/methods comprise an SBN (with only one satellite 110 of the SBC shown) and an ATN that may contain a plurality of base stations 120a–120c and other infrastructure components (not shown). Still referring to FIG. 1, three illustrative base stations are shown: base station 120a serving radioterminals 130v and 130y, base station 120b serving radioterminals 130w and 130x, and base station 120c serving two other radioterminals: one, 130a, inside of a building and the other, 130b, vehicular. Radioterminal 130z is shown to be outside of all base station service regions (at least outside the ones that it can communicate with and/or is commissioned or authorized to communicate with) and is, therefore, being served by at least one satellite 110 of the SBN. Each radioterminal 130 that is illustrated in FIG. 1 may be capable of communicating directly with the SBN and/or the ATN, in some embodiments. In some embodiments, ATN connectivity may be used, when available. Also, at least some of the base stations 120 that are illustrated in FIG. 1 may be capable of communicating with the SBN, in some embodiments. FIG. 1 also illustrates wireless communications 140 between at least some base stations of the ATN and the SBN.

Figure 2:
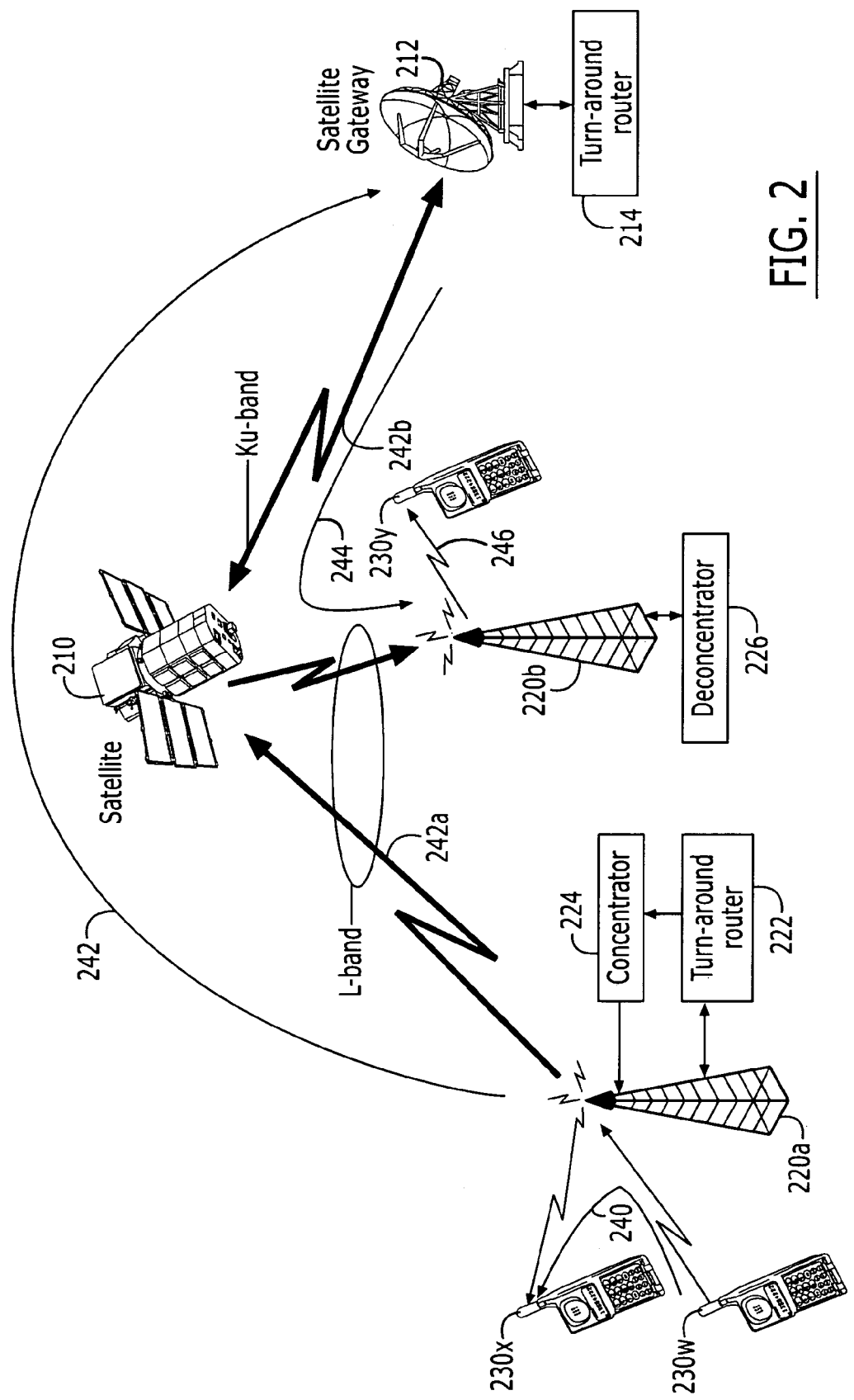

FIG. 2 is a more detailed diagram of some embodiments of the invention.

For simplicity, the SBN is depicted as comprising one satellite 210 and one satellite gateway 212. Interfaces that the satellite gateway may have with the PSTN, a PDN and/or other networks are not shown. Also for simplicity, the ATN is depicted comprising an ATC with only two base stations (base station 220a and base station 220b) serving only three active radioterminals (radioterminals 230w, 230x, and 230y).

Still referring to FIG. 2, if, for example, radioterminal 230w activates its PtS function in order to transmit information to radioterminal 230x, base station 220a may recognize that the destination radioterminal 230x is registered locally with base station 220a and may thus turn around and retransmit the information received from radioterminal 230w without involving any other facilities of the system, as illustrated by link 240.

As illustrated in FIG. 2, a turn-around router 222 may be provided at base station 220a to locally (at base station 220a) process the received information from radioterminal 230w and retransmit it to radioterminal 230x. If, on the other hand, radioterminal 230w activates its PtS function in order to relay information to radioterminal 230y, where radioterminal 230y is registered with a base station 220b other than base station 220a, base station 220a may recognize that the destination radioterminal 230y is not registered locally and may thus relay the received information to the satellite gateway 212 via link 242. Before relaying the received information to the satellite gateway 212, base station 220a may use a concentrator 224 to reduce or minimize the channel resources (e.g., to reduce the bandwidth used) in transmitting the information received from radioterminal 230w to the satellite gateway 212. See, for example, Patent Application Publication No. US 2003/0153267.

Thus, prior to the originating BTS 220a communicating with the satellite 210 and satellite gateway 212, it may determine whether the intended recipient (destination) radioterminal is registered and/or able to communicate with that BTS 220a. Thus, if the intended recipient radioterminal is radioterminal 230x, the BTS 220a may route the communication to radioterminal 230x without the need to communicate with the satellite 210. A turnaround router 222 may be employed at each BTS to determine whether the recipient radioterminal is registered and/or able to communicate with that BTS, to thereby allow the BTS to turnaround the message to the recipient radioterminal. If the turnaround router 222 determines that the recipient radioterminal is not registered with the BTS, then the turnaround router 222 can provide the originating radioterminal message to the concentrator 224, which then communicates with the satellite gateway 212 over link 242. Accordingly, in these embodiments, routing may take place by first determining if local routing can be performed as shown by link 240. If local routing cannot be performed, global routing is performed by the satellite gateway as shown by link 242 and the appropriate BTS is communicated with as shown by link 244.

As is illustrated in FIG. 2, the source base station 220a may relay information to the satellite gateway 212 by transmitting information to the satellite 210 over a wireless link 242a, for example a return L-band link. The satellite 210 may then relay the information to the satellite gateway 212 via a feeder link 242b, such as a Ku-band feeder link. In some embodiments, a base station 220a may be configured to relay information to a satellite gateway 212 via terrestrial routing.

As previously noted, the satellite gateway 212 may be configured to maintain a list of all (system-wide) registered PtS radioterminals 230, with each registered radioterminal being associated with the identity of a corresponding base station 220 and/or other infrastructure that has reported that radioterminal to the satellite gateway 212 as registered. The satellite gateway 212 may also be configured to associate a satellite spot beam (satellite cell) with each base station in its footprint. Thus, the satellite gateway may be configured to turn around the received PtS information and route it over the appropriate spot beam (or spot beams) that relate to the destination base station (or base stations) that are associated with and are serving the registered destination radioterminal(s) using a turn around router 214. One or more base station(s) other than the destination base station(s) may receive a PtS message that is turned-around by the satellite gateway and is routed over one or more satellite spot beams. However, only the destination base station(s) may fully process the received PtS information, as only for the destination base station(s) will the received PtS information be relevant. The non-destination base station(s) may ignore some or all of the information.

The decision by a base station 220 to at least partially ignore or fully process a PtS message that is received from a satellite gateway 212 via a satellite 210 may, for example, be based on the identity of the destination base station(s) and/or the identity of the destination radioterminal(s) that may be embedded in the PtS message. If a base station receives a PtS message from a satellite gateway 212 and that message contains an identifier that is associated with that base station, the base station may fully process the message. Otherwise, the destination base station may ignore the message.

Thus, in accordance with the above description and in reference to FIG. 2, a PtS message that originates with radioterminal 230w and is destined for radioterminal 230y may be relayed to a satellite gateway 212 (via a satellite 210) by source base station 220a. The message may then be turned-around by the satellite gateway 212 and may be transmitted to the ground by a satellite beam that covers destination base station 220b within its footprint. Base station 220b may use a deconcentrator 226 to reduce or minimize the channel resources that are used to transmit the information received from the satellite 210 to the radioterminal 230y, by, for example, converting the high capacity signal that is received from the satellite gateway 212 over the link 244 to the low capacity signals 246 that are sent to destination radioterminal 230y.

In other embodiments, if radioterminal 230w desires to communicate with both radioterminals 230x and 230y, the transmission(s) of radioterminal 230w may follow the path 242 through the gateway 212, as described above. This can make reception by both destination radioterminals 230x and 230y substantially concurrent.

In some embodiments, at least some of the communication information from a source radioterminal to the destination radioterminal(s) may be routed terrestrially while the signaling involved in establishing a session may be routed between the source and the destination radioterminal(s) via the SBN. In some embodiments, all source and destination radioterminal(s) that are within the service region of the ATN may communicate terrestrially, via connectivity provided by the ATN and/or other infrastructure, while relying on the SBN to transport signaling information only. These embodiments are further illustrated in FIG. 4 wherein a terrestrial router 420 communicates with a registration center 410 to terrestrially route PtS communications. In still other embodiments, all PtS communications including data and signaling between a source and destination radioterminal(s) may be provided terrestrially using at least one satellite frequency.

FIGS. 3A and 3B illustrate protocols that a source radioterminal may use to establish communications with a base station and/or other infrastructure, according to various embodiments of the invention. In accordance with FIG. 3A, after a source radioterminal's PtS function has been activated, the source radioterminal may read an "available channels" list that may be broadcast by the serving base station. The source radioterminal may also read, from time to time, the available channels list while it is in idle mode (prior to the activation of the PtS function). The base station may also pre-assign (or pre-designate) a channel (or channels) to the source radioterminal following the source radioterminal's registration with the base station.

The source radioterminal may pick one of the available channels and may send a message on that channel. The choice of channel may be made by the radioterminal randomly, pseudo-randomly and/or in a predetermined way. The base station may be monitoring a measure of activity on all channels of the available channels list and may thus detect that a particular channel of the available channels list has been seized by a radioterminal. The base station may, upon detection that a particular channel of the available channels list has been seized, delete that channel from the available channels list and accordingly update the available channels list broadcast. In contrast to the above channel assignment methodology, FIG. 3B illustrates an alternate protocol whereby the source radioterminal, following activation of its PtS function, requests channel assignment from the system.

Referring again to FIG. 3A, after a source radioterminal has picked a channel from the available channels list, the source radioterminal may transmit on that channel a data sequence that may be unique to the source radioterminal (e.g., a sequence that may be based, for example, on a unique radioterminal identifier) and may also include the destination(s) of the information to follow. If the base station is able to decipher the data sequence sent by the source radioterminal, the base station will know the identity of the source radioterminal and the destination(s) of its message. The base station may at this time delete the channel that has been seized by the source radioterminal from the available channels list transmission, and may substitute in the space occupied by the deleted channel's identifier a radioterminal confirmation identifier, which can provide the source radioterminal with feedback that it has successfully captured a channel and that the destination radioterminal(s) is (are) registered and able to receive, as discussed further hereinbelow. The source radioterminal may read the confirmation identifier and may thus know that it has successfully acquired a channel via which it can communicate with the base station and the destination radioterminal(s). If not all destination radioterminals are registered and/or able to receive, and/or desire to receive, the source radioterminal may be notified accordingly and may be given the option to communicate with the sub-set of destination radioterminals that are registered and able and willing to receive.

If a message collision with another radioterminal attempting to seize the same channel occurs, the base station may not be able to successfully decipher any of the colliding messages. In that case, the colliding radioterminals may compete for channel access again since no confirmation will be sent by the base station and the allowed time interval for such confirmation will expire. If a collision occurs but the base station is able to successfully decipher a message, the radioterminal associated with the "survivor" unique data sequence will be sent a confirmation, thus providing that radioterminal with channel access. In some embodiments of the invention that will be described in detail below, a base station receiver may be configured such that a collision of L co-channel messages ($L \geq 2$) may not prevent a base station receiver from successfully deciphering $\xi \leq L$ co-channel messages. In that case, the corresponding $\xi$ successful source radioterminals may be sent confirmation and channel assignment information by the base station. All $\xi$ co-channel source radioterminals may be allowed to remain co-channel or, at least some, may be given different channel assignment. As used herein, the term "co-channel" indicates signals that overlap in time and space, and that use the same frequency carrier, the same time slot if the signals are Time Division Multiple Access. (TDMA) signals, and the same spreading code if the signals are Code Division Multiple Access (CDMA) signals, such that the two signals collide at a receiver.

In particular, as will be described in detail below, according to some embodiments of the present invention, it is possible to configure two physically distinct radioterminals to transmit to a base transceiver station (BTS) co-channel, using the same return-link radio-channel resource(s) (the same carrier frequency, time interval, and/or spreading code) while still being able, at the BTS, to reliably demodulate and reconstruct the two data streams of the two physically distinct radioterminals. It is also possible to configure a BTS to transmit to two physically distinct radioterminals cochannel, over the same forward-link radio-channel resource(s), while each of the two distinct radioterminals is able to reliably demodulate and reconstruct the information intended for it. The two physically distinct radioterminals may thus communicate bidirectionally with a BTS, co-channel, using no more channel resource(s) than a single radioterminal would use. The signal processing techniques that make this possible according to some embodiments of the present invention, can exploit the multipath scattering nature of the radiochannel and/or the multi-dimensional nature of space and its relationship to electromagnetic wave propagation. Moreover, embodiments of the invention can be extended to allow three or more physically distinct radioterminals to communicate co-channel with a BTS without using any more radiochannel resource(s) than a single radioterminal would. Additional details will be provided below.

In some embodiments, as illustrated in FIG. 3A, a radioterminal may attempt to seize a channel "blindly", without first reading the available channels list following activation of its PtS function. The radioterminal may only be informed by a base station control channel that certain channels are available for return-link communications. The radioterminal may attain this information from the base station control channel either before or after the radioterminal's PtS function is activated. Based on this information, following activation of its PtS function, a radioterminal may randomly, pseudo-randomly and/or in a predetermined way, pick a channel and send an initial message to the base station over that channel. If the channel picked by the radioterminal is unoccupied, the base station may be able to decipher the radioterminal's initial message and may thus provide an authorization to that radioterminal to communicate over that channel. If the channel picked by the radioterminal is already occupied, no authorization may be sent to the radioterminal and the radioterminal may try again to gain access on the same or other channel. In some embodiments, a base station receiver may be configured to receive co-channel communications, as will be described in detail below. In these embodiments, even if the channel picked "blindly" by a radioterminal is already occupied and a collision occurs, the base station receiver may still be able to successfully decipher the radioterminal's attempt to capture a channel and may thus allocate a channel to that radioterminal.

Note that even in reference to FIG. 3B, wherein channel access is requested by a radioterminal via a RACH request, co-channel collisions may still occur over the RACH. Collisions in the RACH may, in general, increase the call set-up interval of PtS and/or non-PtS communications. Thus, in some embodiments, at least some RACH receivers of a system may be configured for co-channel reception, as will be described in detail below, to eliminate or reduce the time interval(s) associated with PtS and/or non-PtS call set-up. In some embodiments, at least some RACH and at least some non-RACH receivers of the same and/or different base stations (or other infrastructure) are configured for co-channel reception. In other embodiments all receivers, RACH and/or non-RACH, of a base station and/or other infrastructure are configured for co-channel reception.

Co-channel reception according to some embodiments of the invention may be more beneficial for an infrastructure (base station) receiver than for a radioterminal receiver, because an infrastructure transmitter may not be power limited and may thus resort to a higher-alphabet modulation format (i.e. 8-PSK, 16-QAM, 64-QAM, etc.) to increase channel capacity on a forward link. In contrast, a radioterminal's transmitter may be power limited and may thus be constrained to lower-alphabet modulation formats (i.e. QPSK, GMSK, etc.). Thus, the ability of two or more radioterminals to send information to an infrastructure element (base station) co-channel may be used advantageously to increase channel capacity on the return link(s). According to some embodiments, therefore, systems and/or methods, that may include PtS functionality, may be configured to utilize different modulation alphabets on forward and return links with a return link alphabet having a smaller number of distinct states (symbols) than a forward link alphabet, and with at least some infrastructure (base station) receivers of the system configured for co-channel reception, as will be described in detail below.

As stated earlier, a base station may maintain a list of all registered radioterminals that are registered in its service area and may relay this list to a satellite gateway. With each registered radioterminal in its service area, a base station may also associate a list of potential destinations that may also be registered and be able to receive. Information regarding this list may, for example, be received by a base station from a satellite gateway and such information may be based on inputs that a registered radioterminal may have provided to the system regarding its likely communications candidates. For example, the system may profile each of its commissioned radioterminals with a destinations list based on end-user inputs, usage and/or other criteria. The user of a radioterminal may define a set of destination identities (numbers) that the user intends/prefers, or is likely, to communicate with. Even if a user does not provide an appropriate or complete input (profile) to the system, and initiates PtS communications with a priori unspecified destinations, the system may be configured to update a user's profile based on such activity. This information may also include identity information regarding the base station(s) that the list of registered and able to receive potential destinations are registered with. Information regarding the identity of a base station also reveals information regarding the identity of a satellite cell that the base station may be covered by.

Thus, before sending a confirmation to transmit to a radioterminal that has successfully seized a channel from the available channels list, the base station may also examine the state of the destination radioterminal(s). If the destination radioterminal(s) that is (are) identified in the data sequence that is sent to the base station by the radioterminal attempting to capture a channel is (are) registered and able to receive, the base station may send a confirmation to transmit and of successful channel capture to the radioterminal that is attempting to communicate. This confirmation may be sent unless a low signal strength and/or low signal quality state has been reported to the system by at least one destination radioterminal. In that case, the system may chose to first interrogate the radioterminal that has reported the low signal strength and/or low signal quality state, as described further below.

If the set of destination radioterminals that are associated with a radioterminal attempting to capture a channel is examined and a specified destination radioterminal is not included, that specified destination radioterminal may be new and/or not yet associated with the originating radioterminal's active destination profile. In that case, the satellite gateway and/or any other location that maintains all (system-wide) registered radioterminals may be asked to provide a final decision as to the registered status of the sought-after destination radioterminal. This may introduce additional delay to the call set-up (channel establishment) procedure but it may do so only the first time the new destination is called. After that, the new destination may be added to the calling radioterminal's destination profile.

A registered radioterminal that is in idle mode may at times wake-up (activate its receiver) in order to perform certain functions such as to listen for incoming pages, estimate the strength of signals corresponding to nearby base stations, and/or estimate the strength and/or quality of a signal (or signals) being radiated by its serving base station. If a radioterminal estimates a signal strength and/or signal quality of its serving base station that is below a threshold, the radioterminal may inform the system that it has estimated a low signal strength and/or low signal quality state at its position. Based on this information, the system may decide to first interrogate a destination radioterminal that has reported a low signal strength and/or low signal quality state before delivering a confirmation to transmit to the source radioterminal. In some embodiments, only if a radioterminal responds to the system's interrogation will the system consider that radioterminal registered and able to receive. When a radioterminal that has informed the system of a low signal strength and/or low signal quality state determines that such a state is no longer valid, the radioterminal may inform the system of the improved signal state. As such, in some embodiments, the system may not need to interrogate a destination radioterminal that has reported an acceptable signal state. A signal state of a registered radioterminal may always be associated with the identity of the radioterminal. The rate at which a radioterminal determines its signal state may depend on at least one previously estimated signal state. In other embodiments, the system may always interrogate a destination radioterminal irrespective of its reported signal state.

In some embodiments, connectivity between the sending (source) base station and the destination base station(s) may be provided directly via a satellite without the need to involve a satellite gateway. The sending base station may include message tag(s), indicative of the destination base station(s) and/or the corresponding destination satellite cells. The satellite may be configured to interpret such tag(s) and route information accordingly to the appropriate satellite cells corresponding to the destination base stations(s).

In some embodiments where the ATN includes ATCs, cellular/PCS, and/or other infrastructure that may be utilizing a plurality of frequency bands and/or air interface protocols, radioterminals may communicate in PtS mode intra- and/or inter-band, and/or intra- and/or inter-air interface, by configuring the infrastructure of the different bands and/or different air interfaces and the radioterminals' functionality in the different bands and/or air interfaces in accordance with a PtS protocol. In some embodiments, the activation of the PtS function of a radioterminal may automatically configure that radioterminal in a particular band and/or in accordance with a particular air interface protocol that is equipped with PtS capability. In such embodiments, the destination radioterminal(s) that may be operative in other bands and/or in accordance with other air interface protocols may be commanded by the system, via control channel signaling, to also reconfigure in the band and/or in accordance with the air interface protocol that is equipped with PtS protocol capability. As such, the radioterminals that are reconfigured in the band and/or in accordance with the air interface protocol that is equipped with PtS protocol capability may be registered by the system in that band and/or air interface protocol that is equipped with PtS protocol capability.

In some embodiments where the ATN includes ATCs, cellular/PCS, and/or other infrastructure that may be utilizing a plurality of frequency bands and/or air interface protocols, the ATN may be configured so that registration of a radioterminal relates only to geography (physical coordinates) and holds across all bands and or air interface standards comprising the ATN. Subject to this "technology agnostic" registration method, the system may control the mode (band and/or air interface) of a radioterminal responsive to a mode used by a sending radioterminal and/or responsive to traffic loading across the bands and/or air interface protocols and/or responsive to other concerns such as system diagnostics.

Figure 5A:
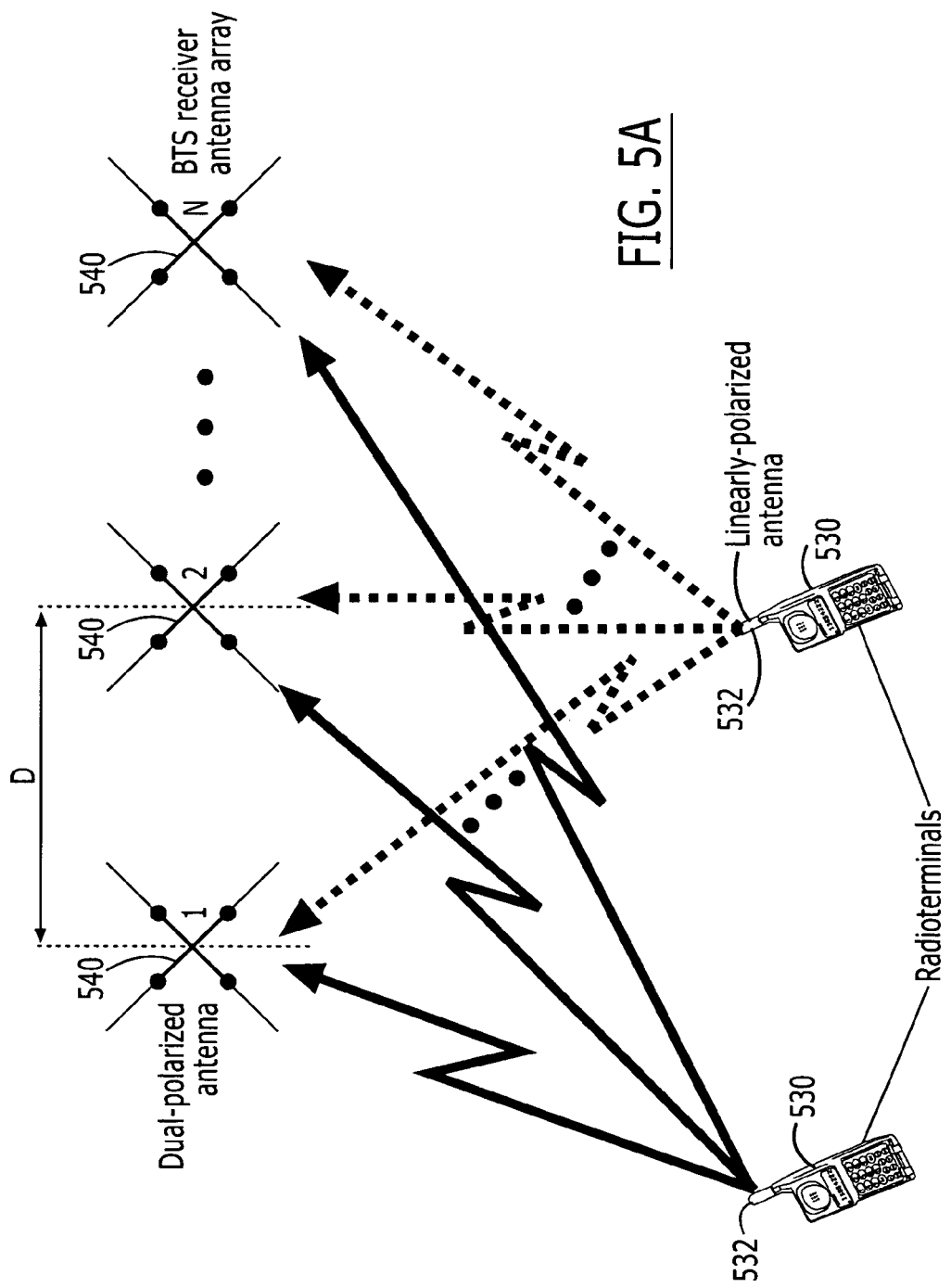
FIG. 5A is a diagram of radioterminal to base station communications according to embodiments of the present invention.
Figure 5B:
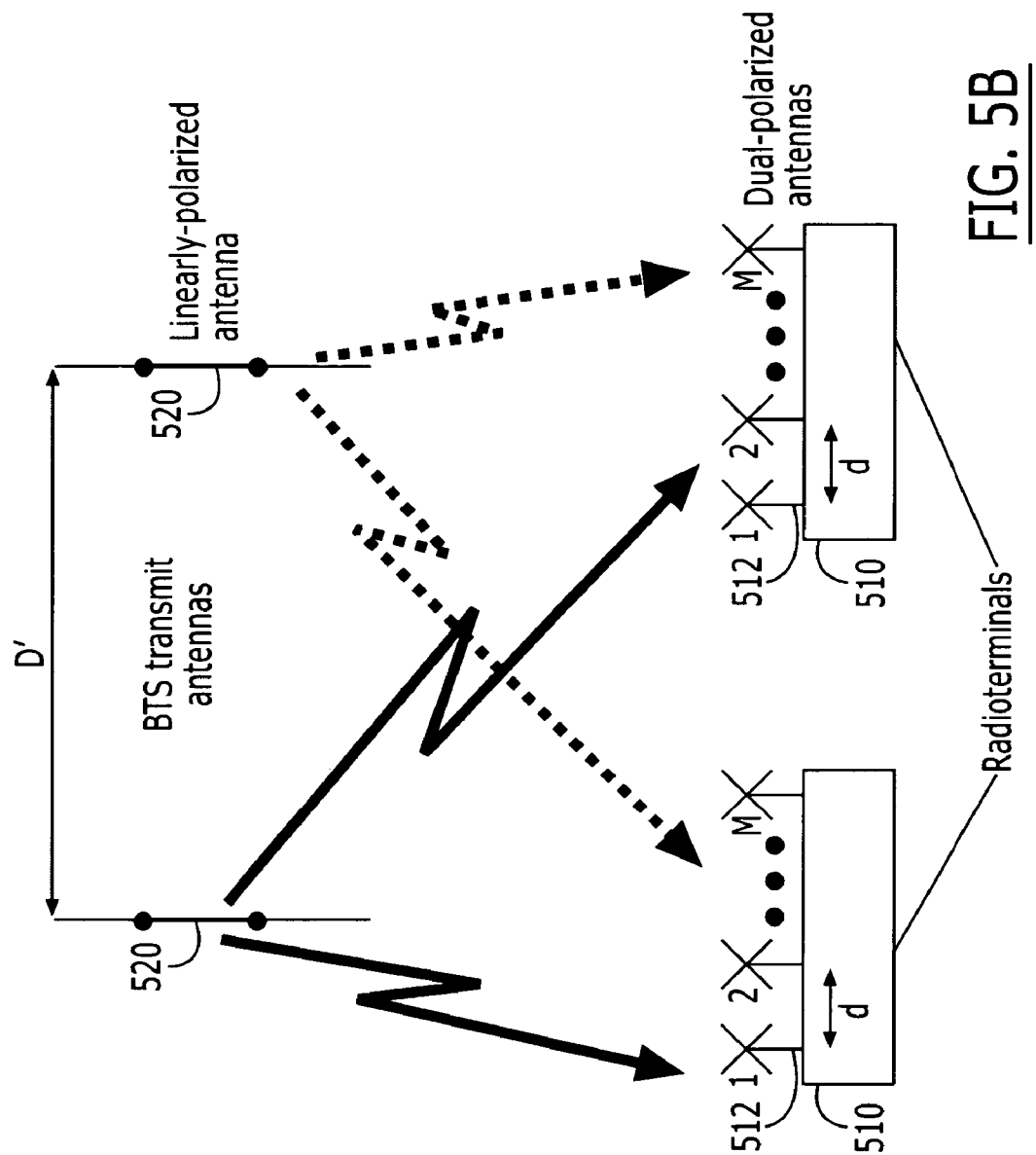
FIG. 5B is a diagram of base station to radioterminal communications according to embodiments of the present invention.

Co-channel communication systems and methods according to various embodiments of the present invention now will be described. In particular, in accordance with "non-Time Division Duplex" (non-TDD) embodiments, the receiver of a radioterminal and the receiver of a BTS may be configured to operate on a plurality of signals that may be acquired via a plurality of spatially-separated and/or co-located antennas. The transmitter of a radioterminal may use a single antenna. The BTS may transmit the information that is intended for a first radioterminal from a first antenna and the information that is intended for a second radioterminal from a second antenna that may be spatially-separated from the first. The two radioterminals may use the same return-link channel resource(s) to transmit information to the BTS. The BTS may use the same forward-link channel resource(s) to transmit information to the two radioterminals. FIGS. 5A and 5B illustrate antenna configurations of non-TDD embodiments. It will also be understood that some embodiments of FIGS. 5A and 5B may be used in TDD mode as well.

Those skilled in the art will recognize that the M dual-polarized (or cross polarized) receiver antennas 512 of a radioterminal 510, as illustrated in FIG. 5B, may be replaced by M triple (x, y, z) -polarized, linearly-polarized, circularly-polarized and/or other type of receiver antennas. In some embodiments, only some of the M dual-polarized receiver antennas 512 of a radioterminal 510, as illustrated in FIG. 5B, may be replaced with triple-polarized, linearly-polarized, circularly-polarized, and/or other type of antennas, and that the value of M may be different for different radioterminals. In still other embodiments, only one receiver antenna that has been tapped at different points may be used on a radioterminal to provide a plurality of signal inputs to the radioterminal's receiver. It will also be understood by those of skill in the art that the N dual-polarized receiver antennas 540 of a BTS, as illustrated in FIG. 5A, may be replaced in part or in entirety by triple (x, y, z)-polarized, linearly-polarized, circularly-polarized, and/or other type of receiver antennas. Finally, those having skill in the art will also recognize that one or both of the linearly-polarized transmitter antennas 520 of a BTS, as illustrated in FIG. 5B, may be replaced by a dual- or multi-dimensionally-polarized, circularly-polarized and/or other type of transmitter antenna(s) and that the linearly-polarized transmitter antenna 532 of a radioterminal 530 may be replaced by a dual-polarized, multi-dimensionally-polarized, circularly-polarized and/or other type of transmitter antenna.

Those having skill in the art will also recognize that embodiments of FIGS. 5A and 5B may be extended to accommodate L co-channel radioterminals (L>2) by having L transmitter antennas 520 on the BTS with the $\lambda^{th}$ such antenna ($\lambda$=1, 2, ..., L) transmitting information intended for a corresponding $\lambda^{th}$ radioterminal.

Figure 5C:
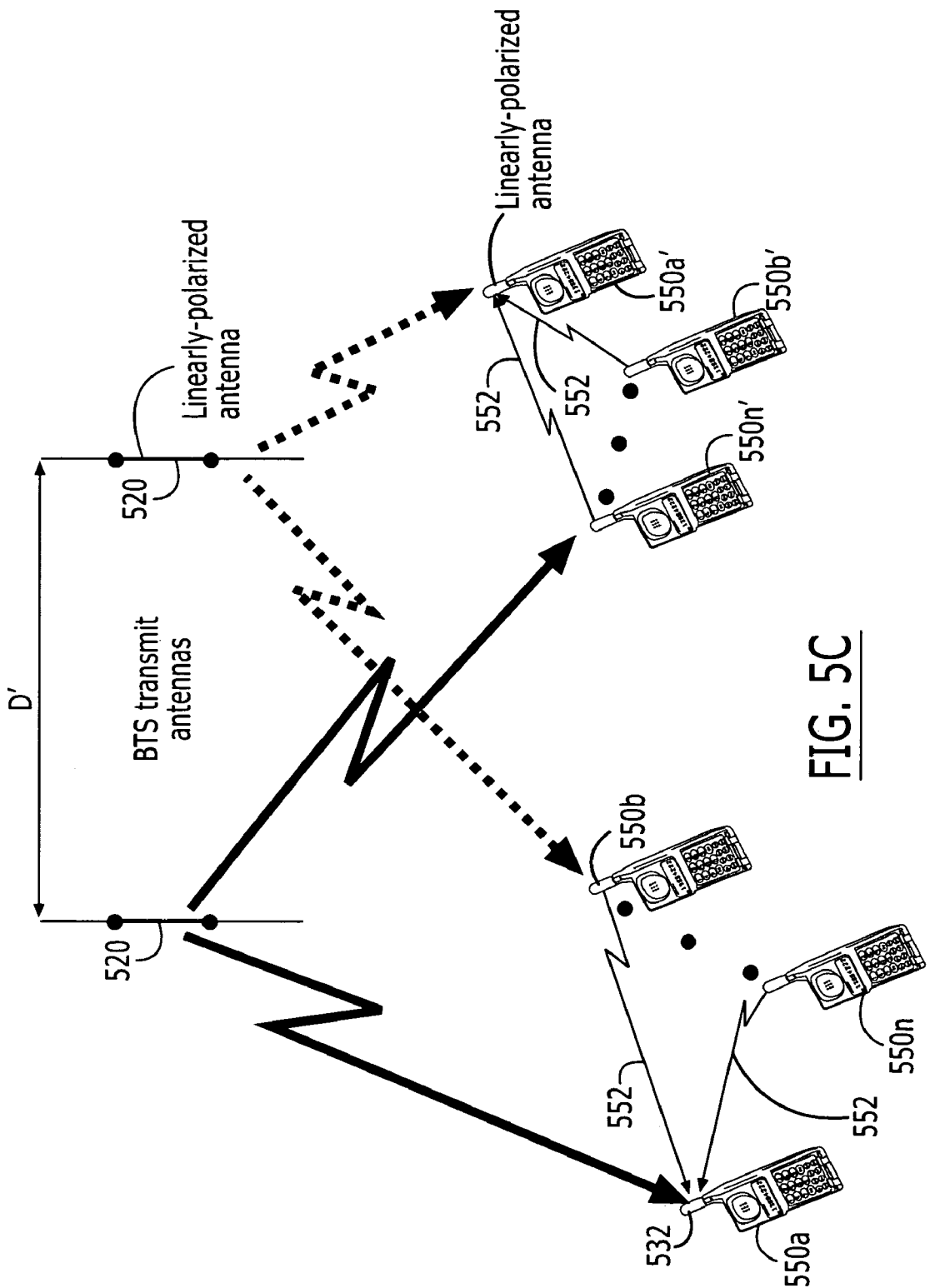
FIG. 5C is a diagram of base station to radioterminal communications according to other embodiments of the present invention.

Referring now to FIG. 5C, in environments of dense radioterminal communications, such as in airports, convention centers, shopping malls, etc., one or more radioterminals 550b–550n that is/are proximate to a first co-channel radioterminal 550a may be configured to provide signals to the first receiving co-channel radioterminal 550a. These signals may be relayed from the one or more proximate radioterminals 550b–550n to the first receiving co-channel radioterminal 550a via short-range wireless links 552. The first receiving co-channel radioterminal 550a may be configured to process the signals received from the one or more proximate radioterminals so as to improve a quality measure, such as the Bit Error Rate (BER), of the information that is being received from the BTS. Still referring to FIG. 5C, one or more radioterminals 550b'–550n' that is/are proximate to a second receiving co-channel radioterminal 550a', may be configured to provide signals to the second receiving co-channel radioterminal 550a'. These signals may be relayed from the one or more proximate radioterminals 550b'–550n' to the second receiving co-channel radioterminal 550a' via short range wireless links 552. The second receiving co-channel radioterminal 550a' may be configured to process the signals received from the one or more proximate radioterminals, so as to improve a quality measure such as the BER of the information that is being received from the BTS. Accordingly, two or more radioterminals such as radioterminals 550a and 550a' may operate co-channel. It also will be understood that some embodiments of FIG. 5C may be used in TDD mode as well.

Figure 6A:
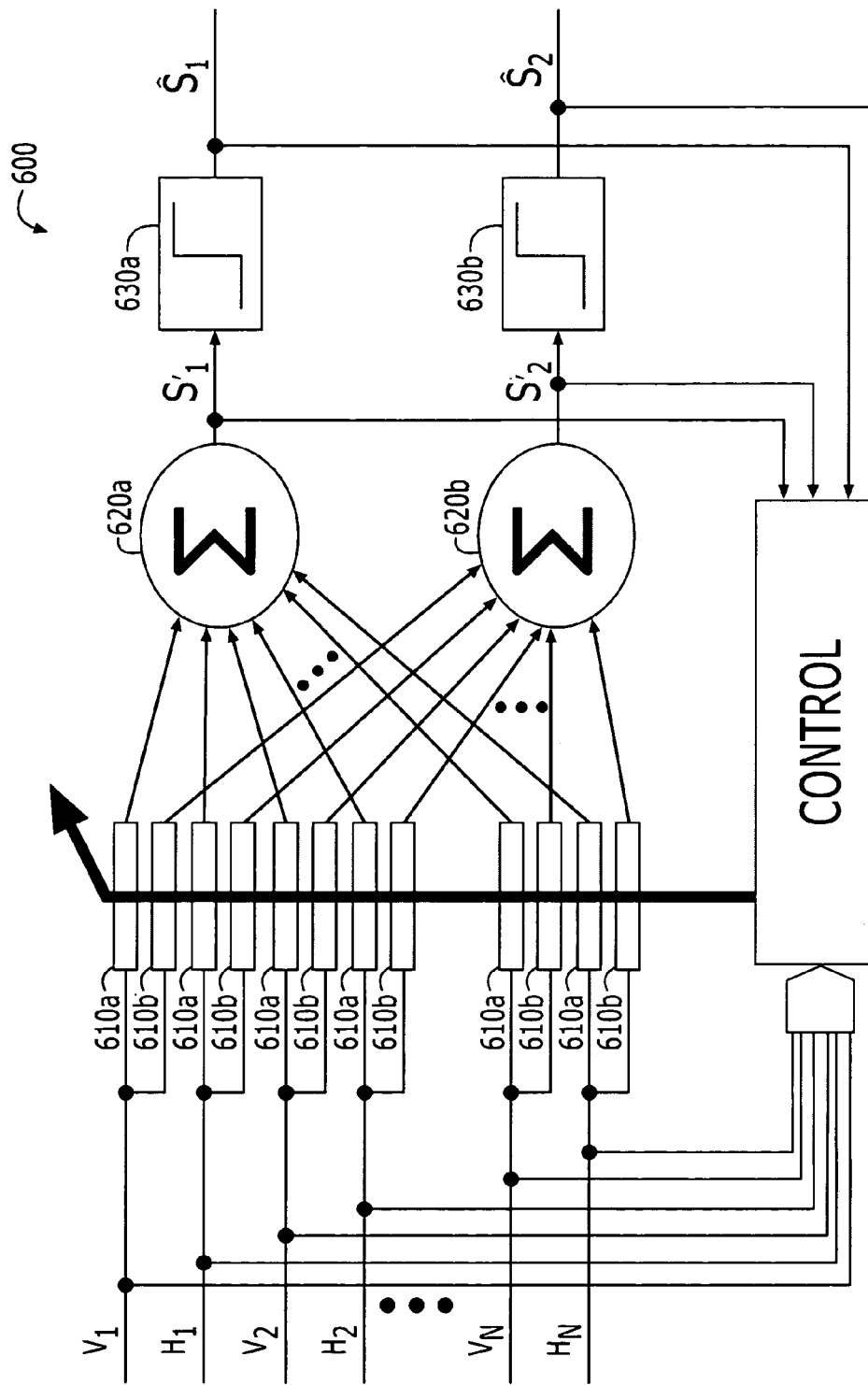
FIGS. 6A–6B are block diagrams of receivers that may be used in FIGS. 5A–5C according to embodiments of the present invention.

A linear receiver processor, in accordance with the well-known Least Mean Squared Error (LMSE) criterion, is illustrated in FIG. 6A for non-TDD embodiments. Those skilled in the art will recognize that other linear and/or non-linear receiver processors such as, for example, Kalman-based, least squares, recursive least squares, Zero Forcing (ZF) and/or Maximum Likelihood Sequence Estimation (MLSE) etc, may be used in lieu of and/or in combination with the receiver processor of FIG. 6A. It also will be understood that FIG. 6A illustrates a receiver for a BTS, but the principles and architecture may also be applied to a radioterminal.

In accordance with the illustrative BTS receiver antenna array 540 of FIG. 5A, each antenna of the array 540 operates in two spatial dimensions and provides two signals to the receiver: one corresponding to the first spatial dimension "vertically-polarized" and the other corresponding to the second spatial dimension "horizontally-polarized." Thus, in accordance with the receiver antenna array that is illustrated in FIG. 5A, the $i^{th}$ antenna (i=1, 2, . . . , N) provides the receiver with the signal inputs $V_i$ and $H_i$. As is illustrated in FIG. 6A, each signal of the set $\{V_1, H_1, V_2, H_2, \ldots, V_N, H_N\}$ is operated on by two transversal filters 610a, 610b; one for each co-channel source (radioterminal). The transversal filter outputs are summed at 620a, 620b, to produce an output signal S'j (=1, 2) based on which a decision is made at Blocks 630a, 630b regarding the information symbol that has been transmitted by the $j^{th}$ co-channel source. The transversal filters may be fractionally spaced, synchronously spaced or single tap filters.

Figure 7:
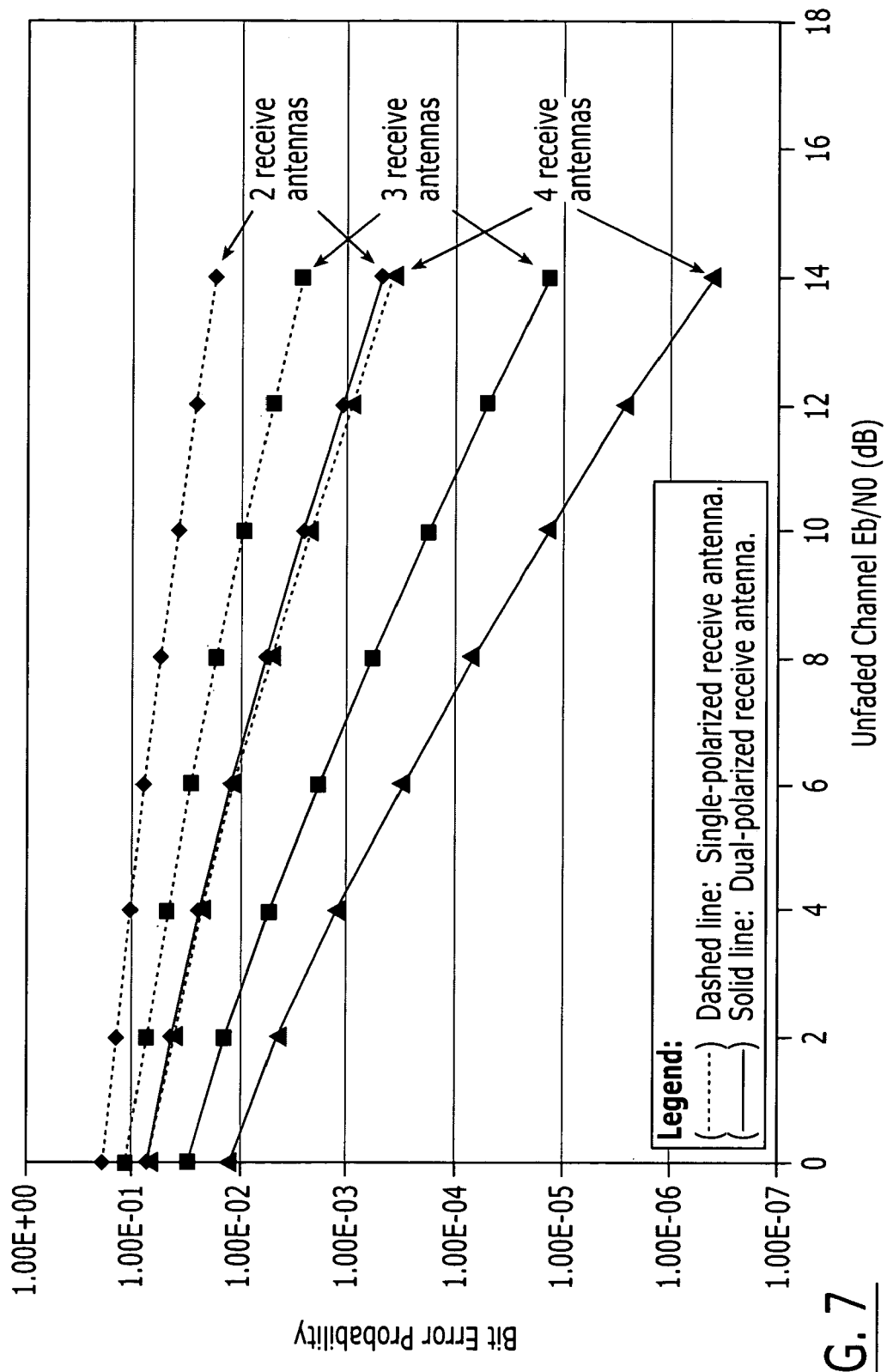
FIG. 7 graphically illustrates simulated receiver performance for signals in Rayleigh fading channels according to some embodiments of the present invention.

A computer simulation has been developed to assess the potential efficacy of the receiver of FIG. 6A. FIG. 7 graphically illustrates results of the computer simulation. The simulation modeled two co-channel radioterminals each transmitting independent data using Binary Phase Shift Keyed (BPSK) modulation with no Forward Error Correction (FEC) coding. The computer simulation modeled bursty transmission to emulate GSM. Within each burst of data, the channel was assumed static and an a priori known to the receiver training sequence (the burst mid-amble in GSM terminology) was used to estimate the transversal filter coefficients of the receiver. For each burst of data a new Rayleigh fading channel was picked pseudo-randomly. Flat Rayleigh-fading channels were assumed. Consequently, there was no Inter-Symbol Interference (ISI), only non-dispersive Co-channel Interference (CCI) due to the co-channel radioterminal. Thus, the receiver transversal filters reduced to single coefficient devices. The Bit Error Rate (BER) was evaluated for several receiver antenna configurations as described below.

As shown in FIG. 7, for the case of four dual-polarized receiver antennas, the uncoded Rayleigh-faded channel BER for each co-channel radioterminal, at $E_b/N_0$ of 4 dB, is $\sim 10^{-3}$, whereas the BER of classical BPSK in Additive White Gaussian Noise (AWGN) with no fading, at the same $E_b/N_0$ of 4 dB is $\sim 10^{-2}$. Thus, the simulations appear to show that not only has the receiver of FIG. 6A reduced the CCI, but significant diversity gain has also been attained.

Figure 6B:
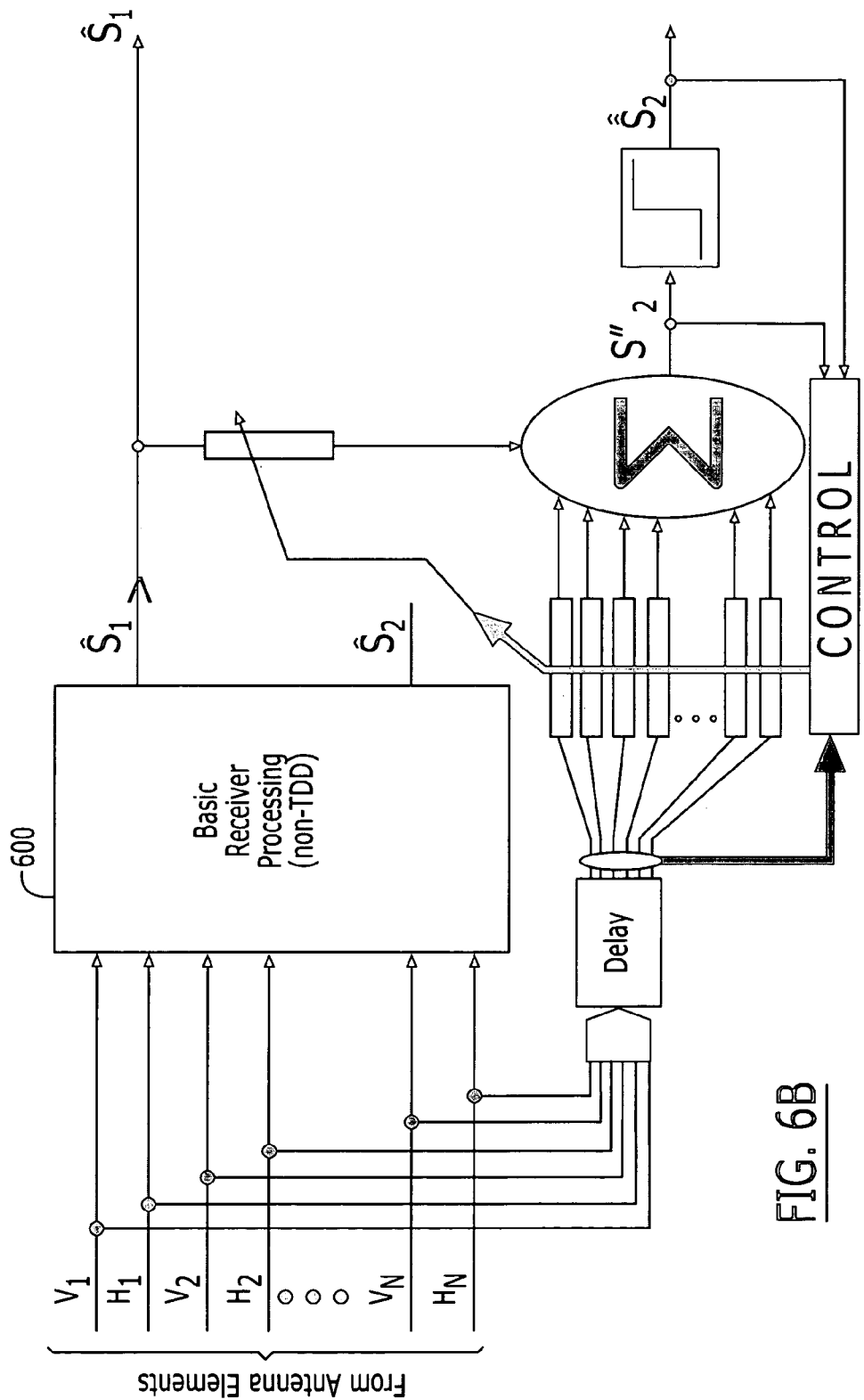

To potentially improve further on the receiver performance of FIG. 6A, a receiver architecture of FIG. 6B may be used. The receiver of FIG. 6B uses an estimate of the co-channel signal that has minimum noise and/or interference variance to cancel the CCI in the other co-channel signal, thus reducing or minimizing noise enhancement in the other co-channel signal, since a regenerated noise-free estimate of the CCI may now be used in the cancellation. Referring again to FIG. 6A, the noise and/or interference variance of the two co-channel decision variables $S'_1$ and $S'_2$ may be estimated once per "data burst." The duration of the data burst may be chosen small relative to the rate-of-change of the channel state so as to validate a static (or quasi-static) channel assumption over a given data burst. The estimate of noise and/or interference variance of $S'_j$ (j=1, 2) may, for example, be based on the magnitude of a linear superposition of squared transversal filter weights, that may be involved in forming $S'_j$ or may be based on processing of an a priori known to the receiver, training sequence. In the illustrative example of FIG. 6B, the noise and/or interference variance of $S'_1$ has been found to be smaller than the noise variance of the second decision variable, $S'_2$. Thus, the decision that is made on $S'_1$, assumed correct, may be used to form an improved decision variable $S''_2$, based on which a decision or a series of decisions may be made regarding the data elements transmitted by the second co-channel radioterminal.

It will be understood by those of skill in the art that, in the illustrative receiver processing of FIG. 6B, if the second decision variable was found to have lower noise and/or interference variance, a decision on that variable may have been made and that decision may have been used to form an improved first decision variable. It will also be understood by those skilled in the art that the principle and receiver architecture that is illustrated on FIG. 6B, of first deciding on the least noise and/or interference variance variable and then using that decision to improve the noise and/or interference variance of the second decision variable, may be extended similarly to the general case where there are L co-channel radioterminals and, therefore, L decision variables at the receiver. In that case, the one (out of the L) decision variable with minimum noise and/or interference variance will be identified, a decision on it will be made, and that decision will be used to improve the noise and/or interference variance of the second least noise and/or interference variance variable. Then, a decision on the improved second least noise and/or interference variance variable will be made and now both decisions that have been made thus far can be used to improve the decision variable of the third least noise and/or interference variance variable, etc. Finally, it will be understood that even though the receiver principles and architectures of FIGS. 6A and 6B have been described using nomenclature associated with a BTS, the principles and receiver architectures of FIGS. 6A and 6B, and variations thereof, are also applicable to the radioterminal.

Figure 8:
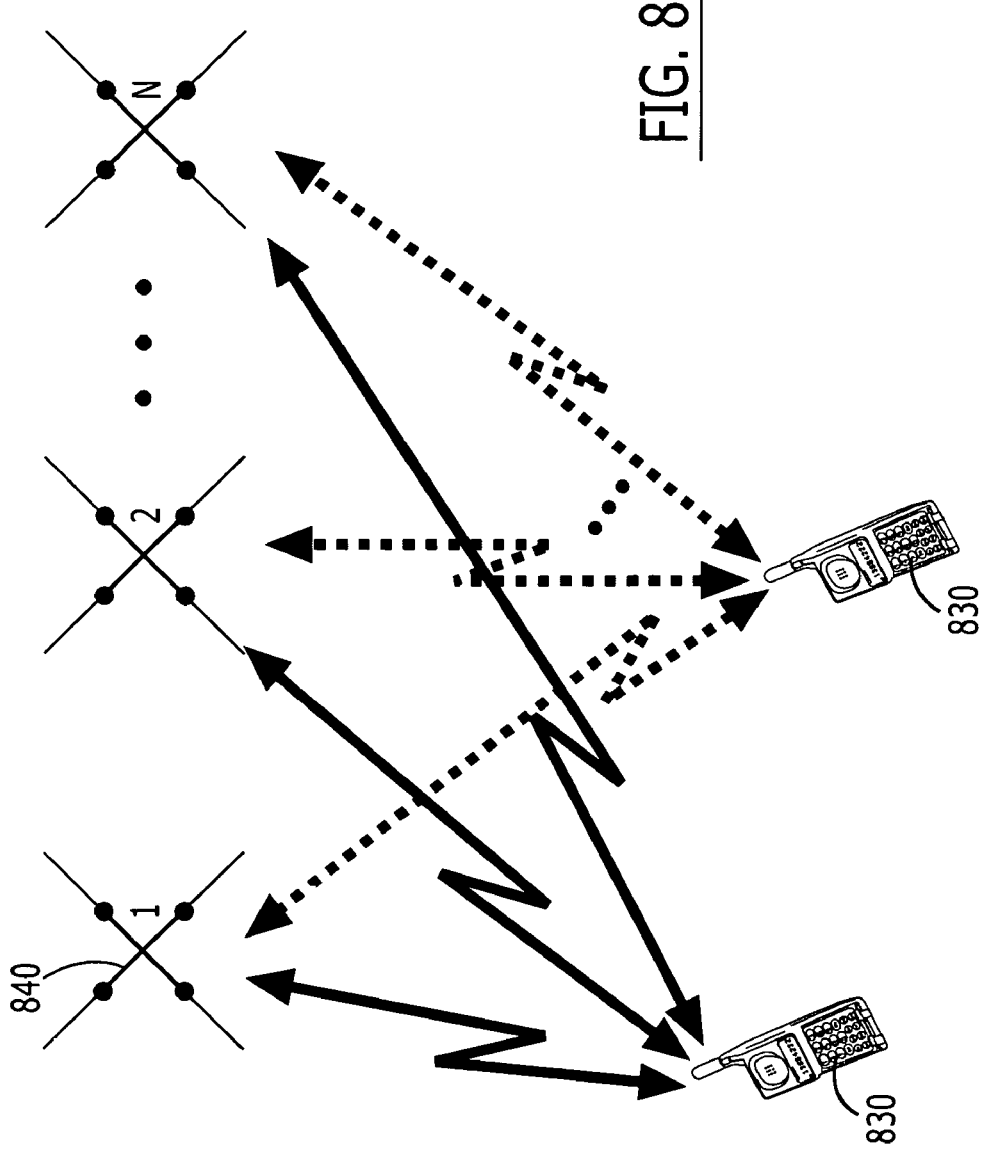
FIG. 8 is a diagram of base station to radioterminal bidirectional communications according to embodiments of the present invention.

FIG. 8 illustrates two radioterminals communicating co-channel bidirectionally with a BTS in a TDD mode according to other embodiments of the present invention. When the radioterminals 830 transmit information to the BTS antennas 840, a BTS receiver of FIG. 6A and/or 6B may be used to process the received waveforms, as was already described, and make decisions on the data that has been transmitted co-channel to the BTS antennas 840 by the radioterminals 830. This function is illustrated by Block 910 of FIG. 9. The BTS receiver of FIG. 9 may also be configured to perform processing of the received waveforms in accordance with the well-known zero-forcing criterion thereby "forcing to zero", to the extent that digital quantization effects and/or other implementation constraints may allow, the ISI and the CCI, at least over the span of the transversal filters used. This function is illustrated by Block 920 of FIG. 9 and is further illustrated in greater detail in FIG. 10.

Figure 11:
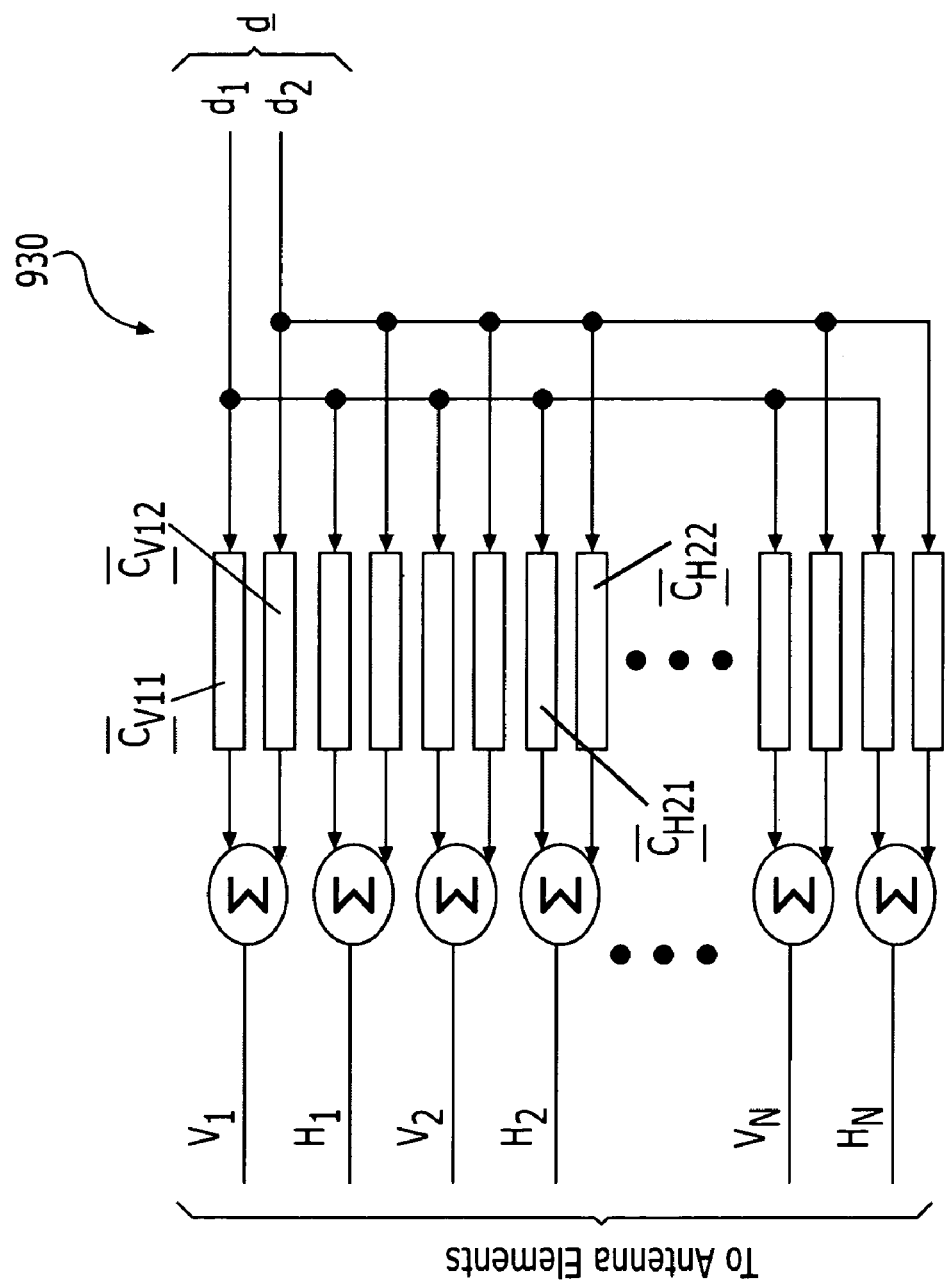
FIG. 11 is a block diagram of a transmitter that may be used in FIG. 9 according to embodiments of the present invention.

Over the time interval of a TDD frame, the state of the channel may be assumed static or quasi-static provided that the TDD frame interval has been chosen sufficiently small. Thus, capitalizing on the reciprocity of the TDD channel over its static or quasi-static interval the transversal filter coefficients that have been derived by the BTS receiver to yield "zero" ISI and CCI at the BTS, may be used to process or pre-distort a BTS data vector d prior to transmitting it to the co-channel radioterminals. In TDD, the same BTS antenna array may be performing both receive and transmit functions. This function is illustrated by Block 930 of FIG. 9 and is further illustrated in greater detail in FIG. 11. It also will be understood that some embodiments of FIG. 8 may be used in non-TDD mode, as well.

Figure 9:
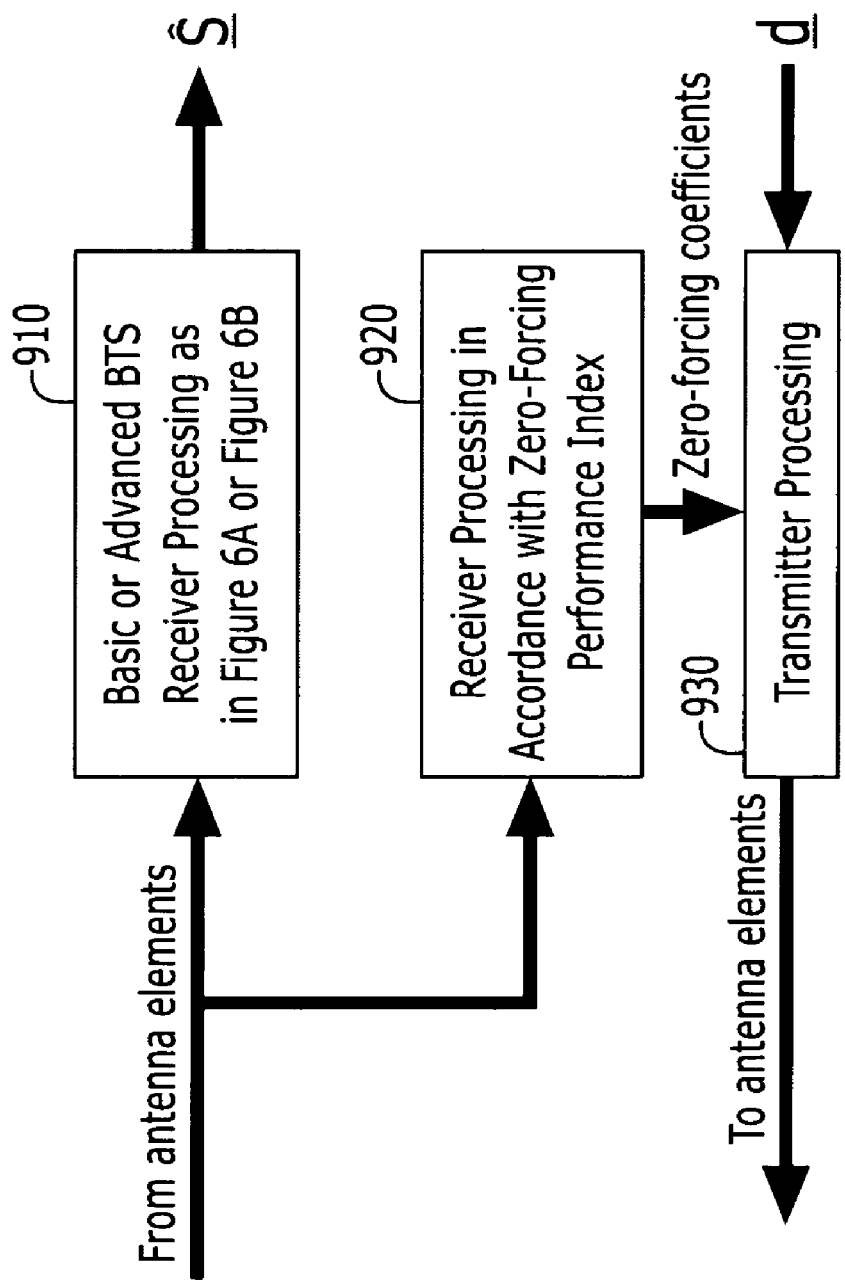
FIG. 9 is a block diagram of a receiver and transmitter that may be used in embodiments of FIG. 8.
Figure 10:
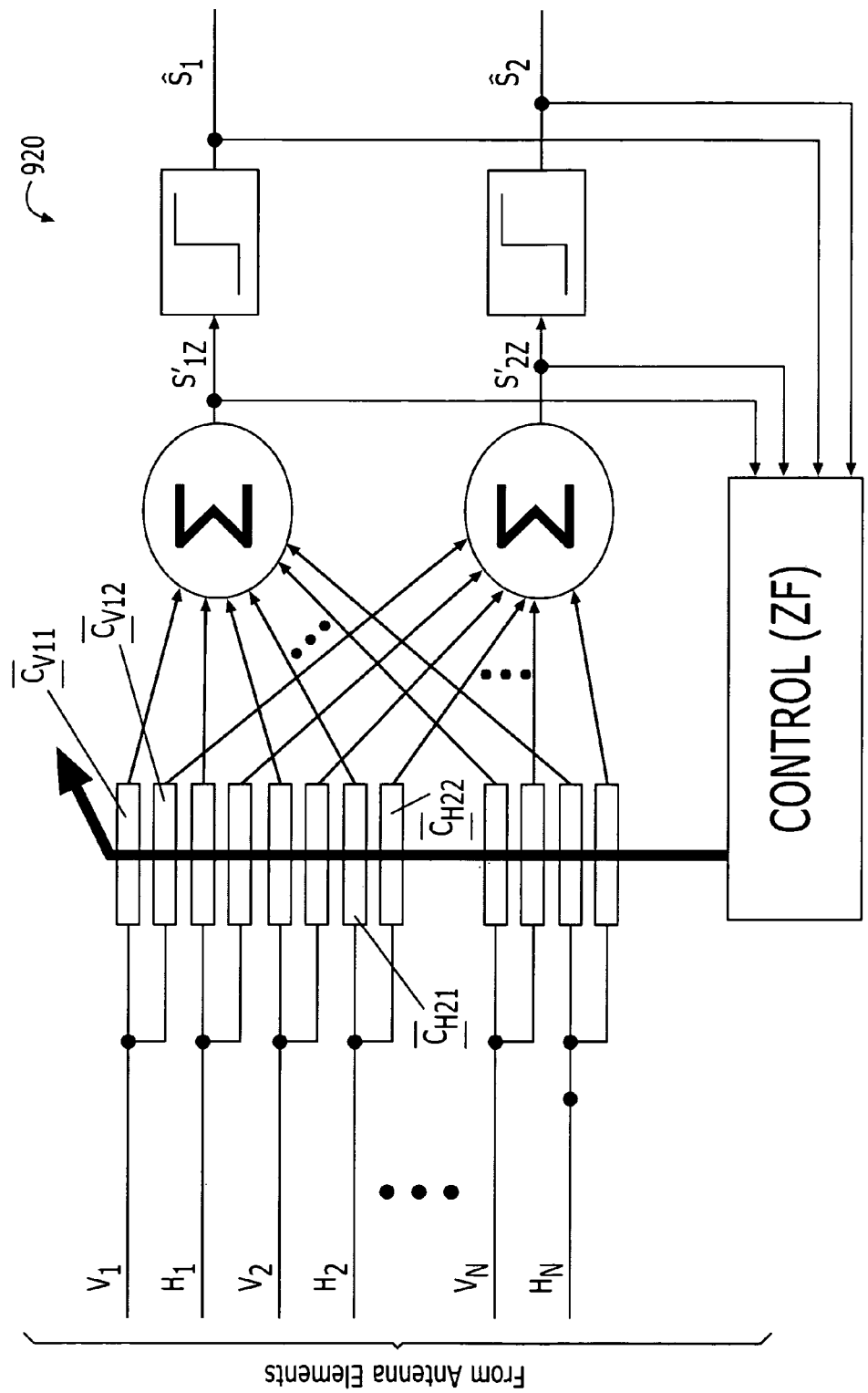
FIG. 10 is a block diagram of a receiver that may be used in FIG. 9 according to embodiments of the present invention.

Given the above, the information that is transmitted by a BTS, co-channel, for a plurality of radioterminals, can arrive at the plurality of co-channel radioterminals free, or substantially free, of ISI and CCI. Thus, the receiver complexity of a radioterminal may be reduced and the radioterminal may only be equipped with a single linearly-polarized receiver antenna. Those skilled in the art will recognize that even in TDD mode the principles and receiver architectures that were described earlier for the non-TDD case can apply for both a BTS and a radioterminal. Also, those skilled in the art will recognize that the zero-forcing processing at a BTS receiver as illustrated in FIGS. 9 and 10 may be omitted and instead, the transversal filter coefficients derived from a LMSE processor (Block 910 of FIG. 9) may be used for the transmitter processing (Block 930 of FIG. 9) of a BTS. Accordingly, information that is received when wirelessly receiving at least two signals on the same carrier frequency, time interval, and/or code, from a corresponding at least two radioterminals, may be discriminated among the at least two signals.

Additional push-to-send radioterminal communication methods and systems according to various embodiments of the present invention now will be described. As was already described, for example in connection with FIGS. 1, 2 and 4, some embodiments of the present invention can use a satellite to route push-to-send messages among terrestrial base stations. In some embodiments, a satellite of a satellite radioterminal communications system is used to route push-to-send messages among terrestrial base stations. In other embodiments, a satellite is used to at least partially bypass terrestrial routing of push-to-send messages among terrestrial base stations. In still other embodiments of the present invention, a satellite is used to route selected push-to-send messages among terrestrial base stations.

Figure 4:
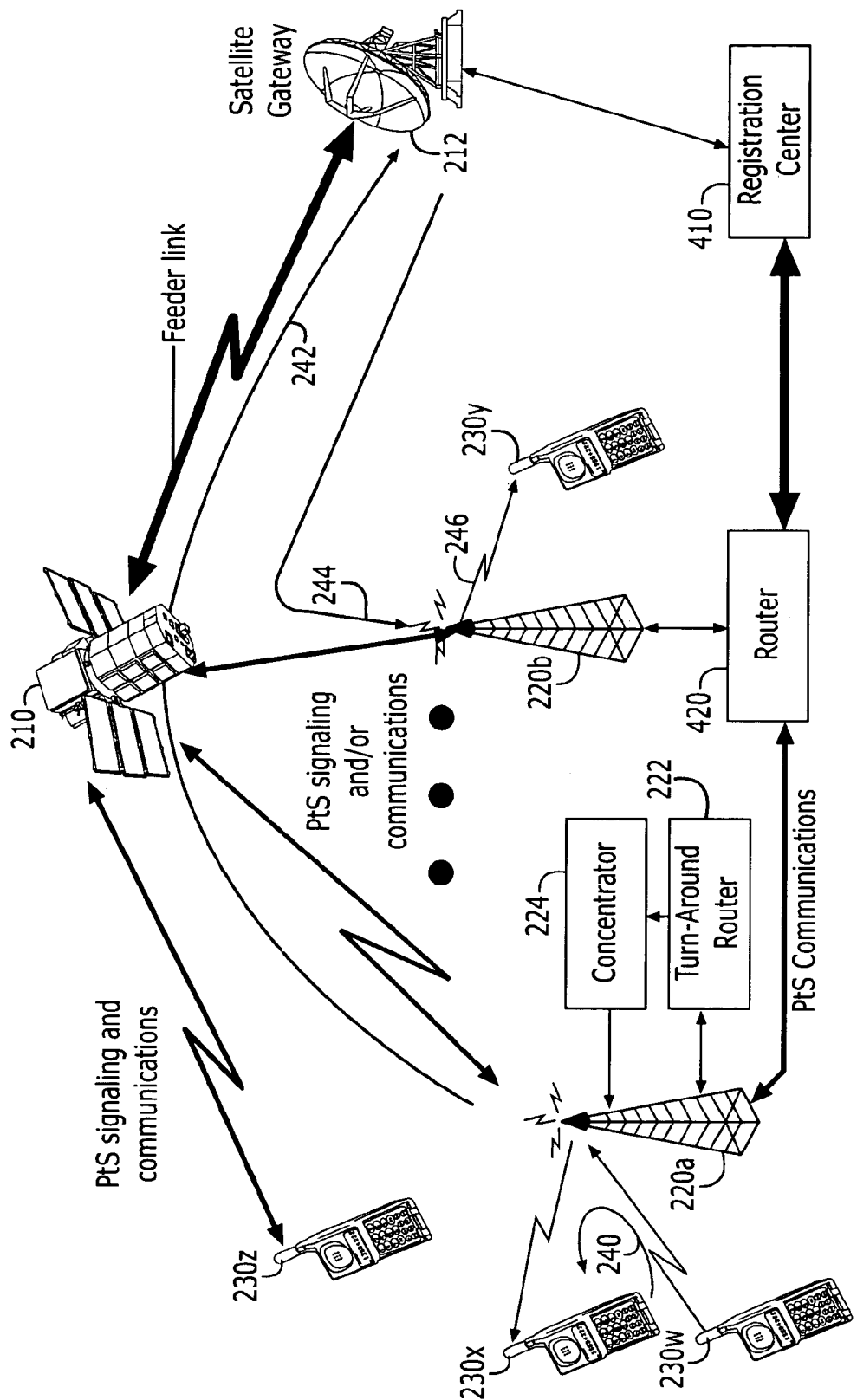
FIG. 4 is a diagram of push-to-send radioterminal communication methods and systems according to still other embodiments of the present invention.
Figures 12, 13:
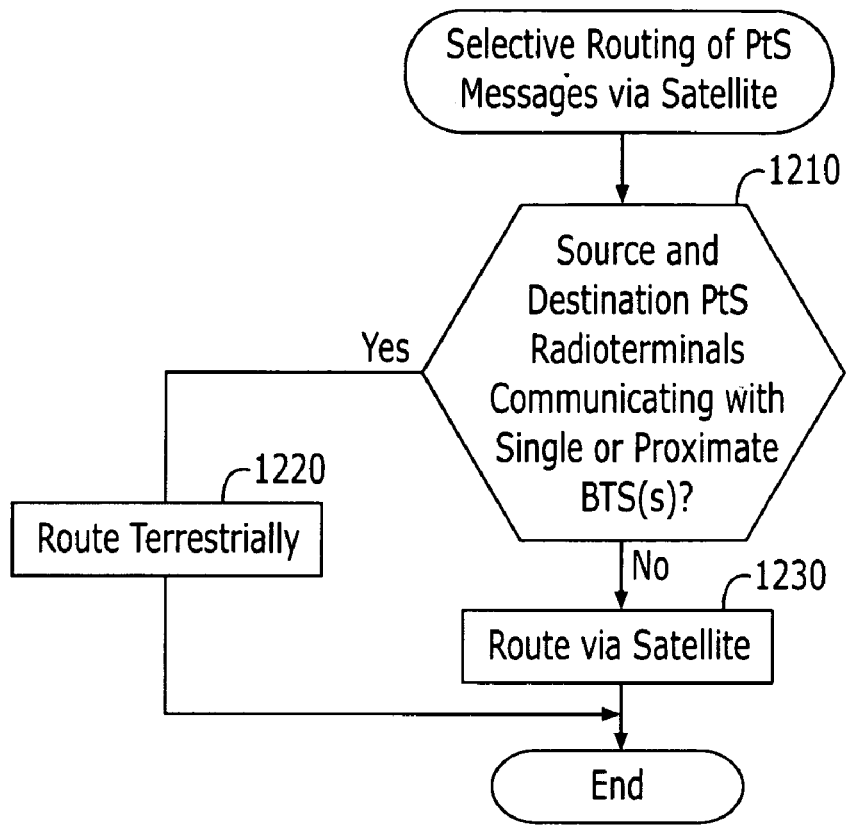
FIG. 12 is a flowchart of operations that may be performed for push-to-send radioterminal communications according to embodiments of the present invention.
FIG. 13 illustrates a listing of radioterminals, associated base stations and likely destinations according to embodiments of the present invention.

FIG. 12 is a flowchart of operations that may be performed to use a satellite to route selected push-to-send messages among terrestrial base stations according to some embodiments of the present invention. Referring to FIG. 12, at Block 1210, a determination is made as to whether a source push-to-send radioterminal and a destination push-to-send radioterminal are communicating with a single terrestrial base station or, in some embodiments, with terrestrial base stations that are proximate one another. For example, referring to FIG. 4, a determination is made as to whether a source push-to-send radioterminal 230w and a destination push-to-send radioterminal 230x are communicating with a single terrestrial base station 220a. In FIG. 4, base station 220a also may represent a group of terrestrial base stations that are proximate to one another and which, in some embodiments, may use common terrestrial control. As shown at Block 1220, if the source and destination push-to-send radioterminals are communicating with the single or proximate base stations, then routing is performed terrestrially, for example as shown by link 240 of FIG. 4. Alternatively, at Block 1230, if the source and destination push-to-send radioterminals are not communicating with the single or proximate base station(s), then routing is performed via satellite, for example using links 242 and 244 of FIG. 4.

Still referring to FIG. 12, according to some embodiments of the present invention, the determination of Block 1210 may be made by accessing a listing of terrestrial base stations and push-to-send radioterminals that are communicating therewith, and determining from the listing whether the source push-to-send radioterminal and the destination push-to-send radioterminal are communicating with a single terrestrial base station or a group of proximate base stations.

FIG. 13 schematically illustrates a listing according to some embodiments of the present invention. As shown in FIG. 13, the listing includes identifications of push-to-send radioterminals, a base station that is communicating therewith and, in some embodiments, likely destination PtS radioterminals. More specifically, the listing of FIG. 13 may be contained in a turnaround router 222 that is associated with a given base station, such as base station 220a, according to some embodiments of the present invention. In these embodiments, the listing of FIG. 13 can list all PtS radioterminals that are communicating with the given base station 220a or group of base stations that are proximate one another. In these embodiments, since only a single base station or group of base stations are covered by the listings, the identification of the base station itself (second column of FIG. 13) may be omitted. A turnaround router 420 also may be associated with base station 220b. The turnaround router 222, 420 that is associated with base stations 220a, 220b, or a group of base stations that are proximate to one another, may thereby be used to determine whether terrestrial routing should be used or satellite routing should be used.

In other embodiments of the present invention, a listing of FIG. 13 also may be included in a turnaround router 214 that is associated with a satellite gateway 212 as illustrated in FIG. 2. The turnaround router 214 may include therein a listing of FIG. 13 that contains all system-wide push-to-send radioterminals, and may also include all non-push-to-send radioterminals and an identification of a base station that is associated therewith. Thus, a listing at a turnaround router 214 that may be associated with the satellite gateway 212 can be used to determine an appropriate satellite spot beam that may be used to establish a link 244 from the satellite gateway 212 to a destination push-to-send radioterminal 230y that is not associated with the same or a proximate base station to the originating push-to-send terminal 230w.

In other embodiments of the present invention, the listing of FIG. 13 for all of the push-to-send radioterminals and, optionally, for all system-wide radioterminals need not be associated with the satellite gateway 212, but may be contained in a separate central server or registration center 410 as illustrated in FIG. 4. Accordingly, a central server may be used to contain registration information for all push-to-send radioterminals in the push-to-send radioterminal system. The information may be in the form of a listing of FIG. 13 or other analogous forms that will be known to those having skill in the art.

Referring again to FIG. 13, in other embodiments of the present invention, prior to making the determination of FIG. 12, Block 1210, the listing of FIG. 13 is populated by performing registration of the push-to-send radioterminals upon power-on of the source push-to-send radioterminal(s) and/or the destination push-to-send radioterminal. In other embodiments, re-registration in the listing of FIG. 13 may also be performed upon movement of the source push-to-send radioterminal and/or the destination push-to-send radioterminal(s) among the terrestrial base stations.

Figure 14:
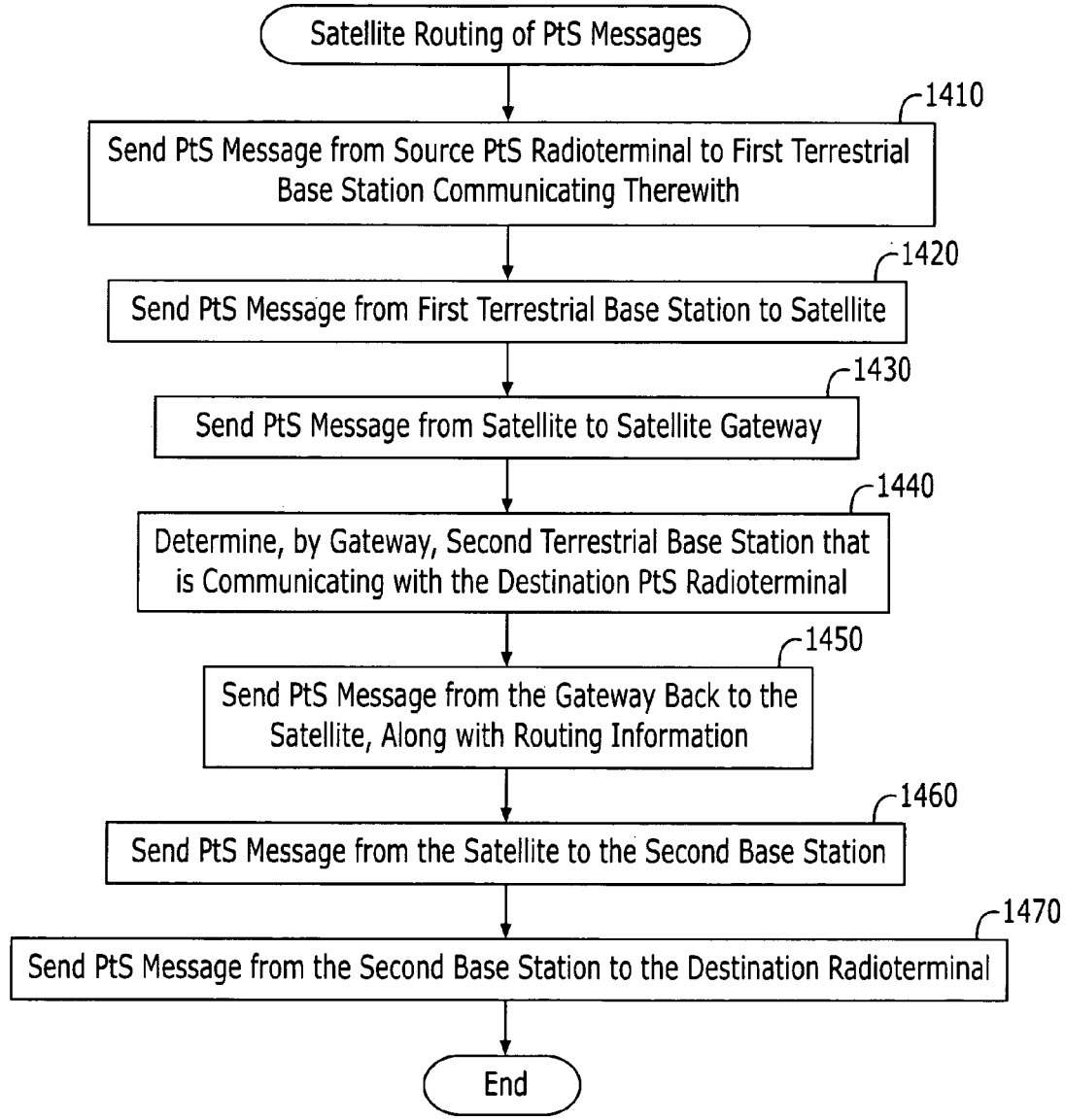
FIGS. 14–21 are flowcharts of other operations that may be performed for push-to-send radioterminal communications according to other embodiments of the present invention.

FIG. 14 is a flowchart of operations for satellite routing of push-to-send messages according to other embodiments of the present invention. Embodiments of FIG. 14 will be described in connection with FIGS. 2 and 4, as examples.

Referring to FIG. 14, at Block 1410, a push-to-send message is sent from a source push-to-send radioterminal, such as radioterminal 230w, to a first terrestrial base station, such as a base station 220a communicating therewith. At Block 1420, the push-to-send message is sent from the first terrestrial base station 220a to the satellite 210, for example over link 242a. Referring to Block 1430, the push-to-send message is sent from the satellite to a satellite gateway 212 that is associated with the satellite. At Block 1440, a determination is made by the satellite gateway of a second terrestrial base station, such as the base station 220b, that is communicating with the destination push-to-send radioterminal, such as radioterminal 230y. As was already described, this determination may be made, for example, using a turnaround router 214 and/or a registration center 410 that includes a listing such as was described, for example, in connection with FIG. 13.

Continuing with the description of FIG. 14, at Block 1450, the push-to-send message is sent from the satellite gateway 212 back to the satellite 210 along with routing information that identifies the second terrestrial base station 220b. At Block 1460, the push-to-send message is then sent from the satellite 210 to the second base station 220b. Finally, at Block 1470, the push-to-send message is sent from the second base station 220b to the destination radioterminal 230y.

In some embodiments of the present invention, operations of Block 1460 are performed by sending the push-to-send message from the satellite to the second base station using a satellite spot beam that covers a plurality of base stations including the second base station. In these embodiments, the push-to-send message is ignored at the plurality of base stations that are included in the satellite spot beam, except for the second base station.

Figure 15:
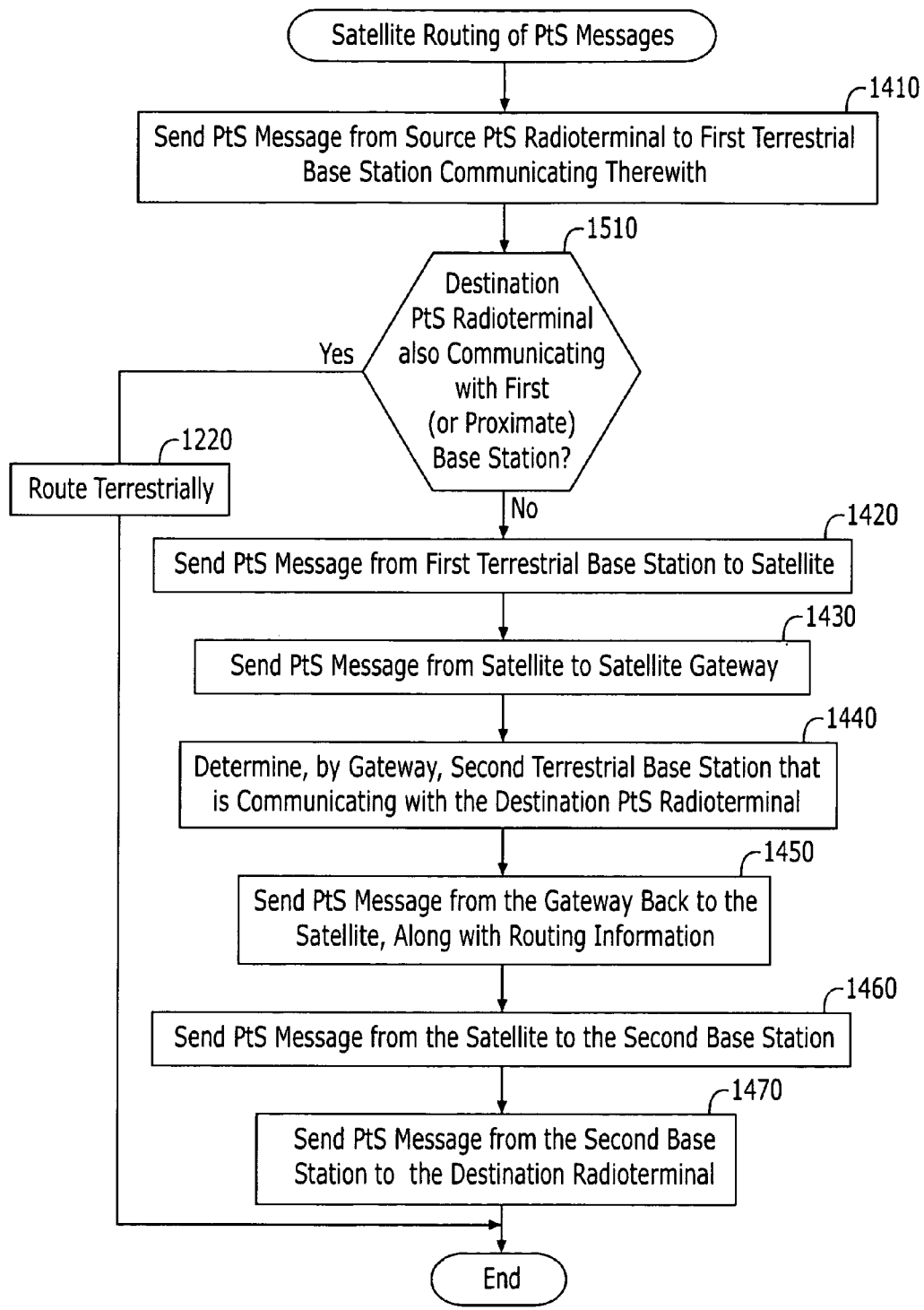

FIG. 15 is a flowchart of satellite routing of push-to-send messages according to other embodiments of the present invention. In FIG. 15, after performing the operations of Block 1410, a determination is made at Block 1510 as to whether the destination push-to-send radioterminal is also communicating with the first (or a proximate) base station. If so, then the operations of Block 1220 are performed to route terrestrially. If not, then operations of Blocks 1420–1470 are performed to route via the satellite. As was already described, operations at Block 1510 may be performed by accessing a listing such as was described in FIG. 13 that may be associated with the base station or a group of proximate base stations. Alternatively or in addition, a central registration center may be used.

Referring again to FIGS. 14 and 15, at Block 1420, when the push-to-send message is sent from the first terrestrial base station 220a to the satellite 210, a concentrator, such as concentrator 224, may be used to concentrate the push-to-send message with other communications from the first terrestrial base station 220a to the satellite 210. Moreover, at Block 1470, when sending the push-to-send message from the second base station to the destination radioterminal, a deconcentrator, such as deconcentrator 226, may be used to deconcentrate the push-to-send message from other communications from the satellite 210 to the second terrestrial base station 220b.

Still referring to FIGS. 14 and 15, it will be understood that a plurality of destination radioterminals 230y may be associated with the second base station 220b, so that at Block 1470, the push-to-send message is sent from the second base station to a plurality of destination radioterminals 230y. Moreover, in Block 1460, wherein the push-to-send message is sent from the satellite to second base station, the push-to-send message may be sent from the satellite 210 to a plurality of second base stations, and from the plurality of second base stations to a plurality of destination radioterminals that communicate therewith. Finally, it will also be understood by those having skill in the art that satellite routing according to embodiments of the present invention may be used to route push-to-send signaling messages and/or push-to-send communication messages among terrestrial base stations. In some embodiments, the signaling messages and the communication messages may be routed using a satellite. In other embodiments, as was shown in FIG. 4, push-to-send signaling may be routed via a satellite, but push-to-send communications may be routed terrestrially via a router 420.

Figure 16:
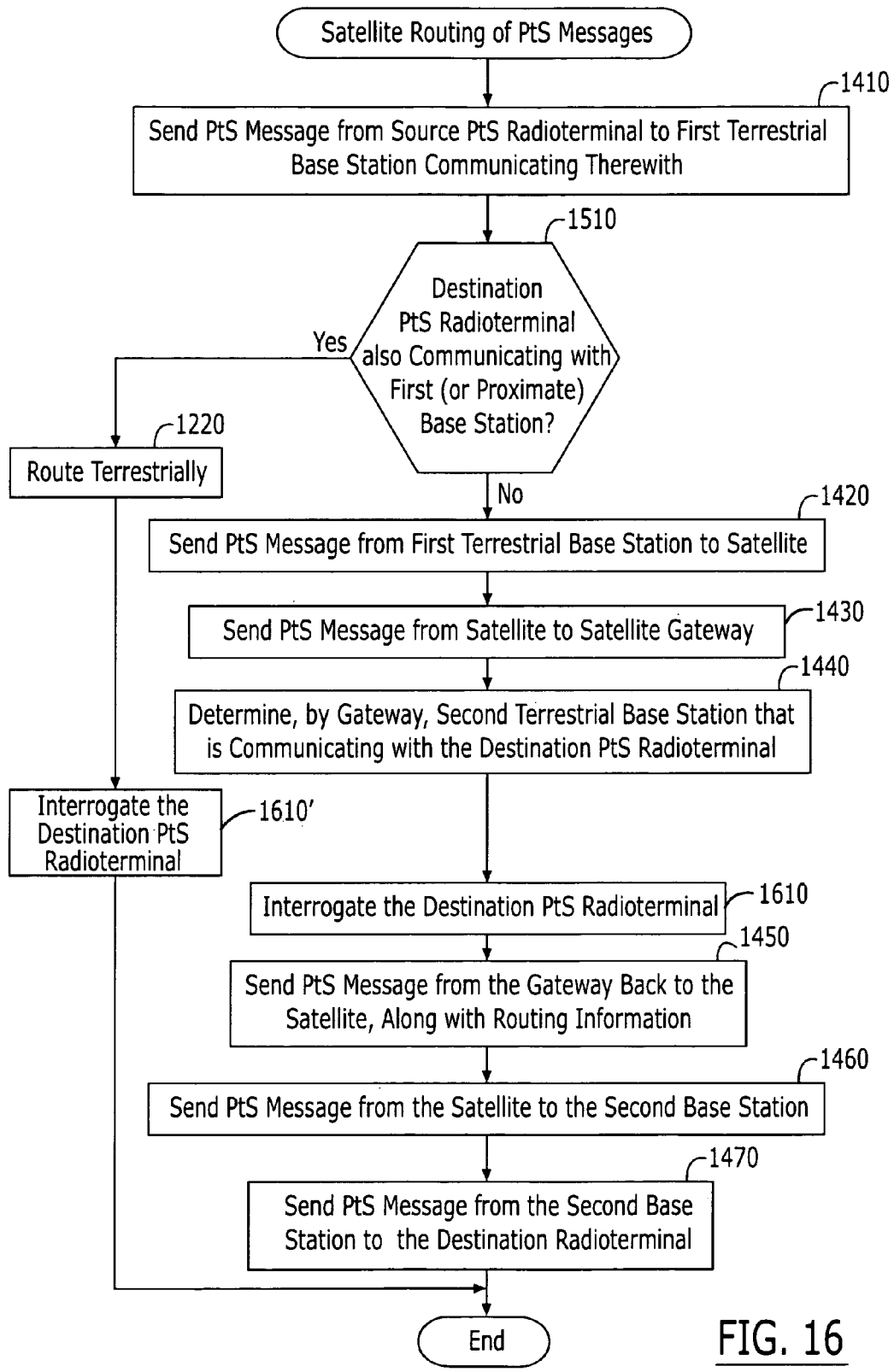

FIG. 16 is a flowchart of operations that may be performed for satellite routing of push-to-send messages according to other embodiments of the present invention. As shown in FIG. 16, after performing the operations of Block 1440, but before performing the operations of Block 1450, the destination push-to-send radioterminal is interrogated at Block 1610 to determine whether it is capable of receiving the push-to-send message. It will be understood by those having skill in the art that the interrogation Block 1610 of FIG. 16 may, instead of being performed when shown in FIG. 16, be performed after performing the operation(s) of Block 1510 but before performing the operation(s) of Block 1420 and/or at any other place in the flowchart of FIG. 16. Moreover, a similar interrogation may take place at Block 1610' for terrestrial routing. In some embodiments, this interrogating need only be performed for the first push-to-send message, but need not be performed for subsequent push-to-send messages that are closely spaced in time with the first push-to-send message.

Embodiments of the invention that were described in connection with FIGS. 2 and 4 have been described primarily in connection with communications that take place from a single source radioterminal 230w to a single destination radioterminal 230x or 230y. However, in many embodiments, communications may take place from a single source push-to-send radioterminal 230w to multiple destination radioterminals 230x and 230y. In some embodiments, all of the destination radioterminals may be communicating with the same, or a proximate, base station as the source radioterminal, so that routing may be performed terrestrially. In other embodiments, all of the destination radioterminals may be communicating with a second or a remote base station, such that all routing may be performed using the satellite.

However, in yet other embodiments, a source push-to-send radioterminal may desire to communicate with a destination push-to-send radioterminal 230x at the same or a proximate base station, and with a destination radioterminal 230y at a different or remote base station. In these embodiments, these diverse communications may be handled in one of two ways. In some embodiments, routing to the destination radioterminal 230x that shares a single or proximate base station may be performed terrestrially, whereas routing to the destination radioterminal 230y that does not share the single or proximate base station may be performed via the satellite 210. In such embodiments, however, the destination radioterminals 230x and 230y may not receive the push-to-send communications simultaneously, since there may be a greater delay in communicating with the remote push-to-send destination radioterminal 230y than the proximate destination radioterminal 230x.

In order to substantially equalize these delays, some embodiments of the present invention may determine whether a source push-to-send radioterminal and at least one of a plurality of destination push-to-send radioterminals are not communicating with a single or proximate base station. The satellite may be used to route the push-to-send message from the source push-to-send radioterminal to all of the destination push-to-send radioterminals if at least one of the destination push-to-send radioterminals is not communicating with the single or proximate base stations. Delays may thereby be substantially equalized.

Figure 17:
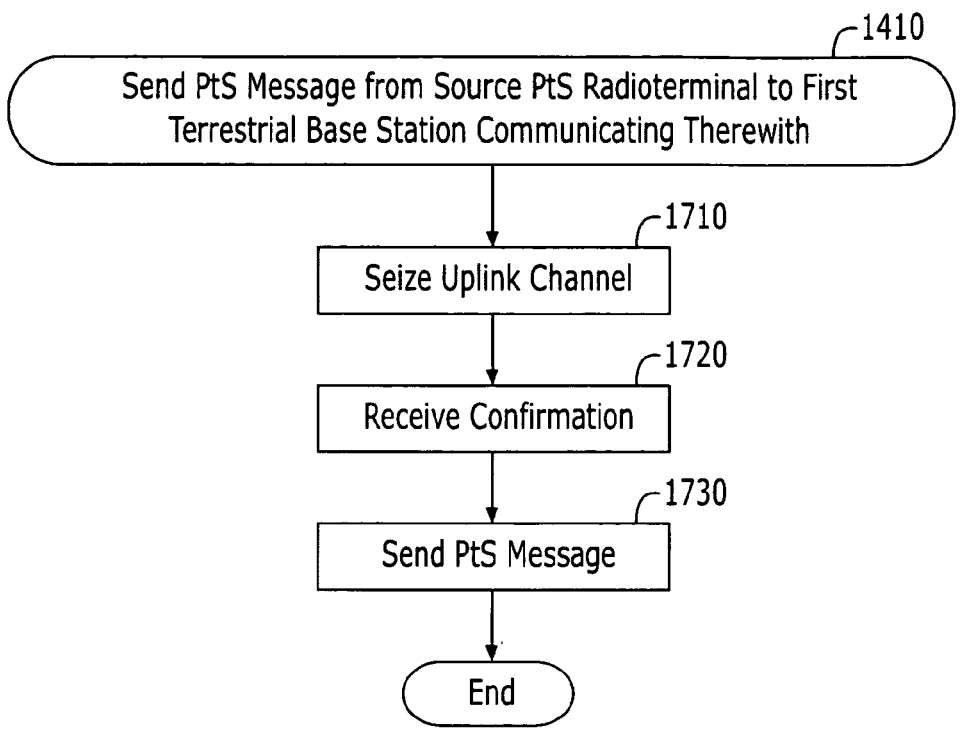

FIG. 17 is a flowchart of operations that may be performed in sending a push-to-send message from a source push-to-send radioterminal to a first terrestrial base station communicating therewith, which may correspond to Block 1410, according to some embodiments of the present invention. As shown in FIG. 17, at Block 1710, an uplink channel of the first terrestrial base station is seized by the source push-to-send radioterminal. At Block 1720, confirmation is received from the first terrestrial base station in response to the seizing of the uplink channel. At Block 1730, the push-to-send message is sent from the source push-to-send radioterminal to the first terrestrial base station over the uplink channel in response to receiving the confirmation. Other operations of FIG. 17 were described in detail in connection with FIG. 3A and need not be described further herein.

Figure 18:
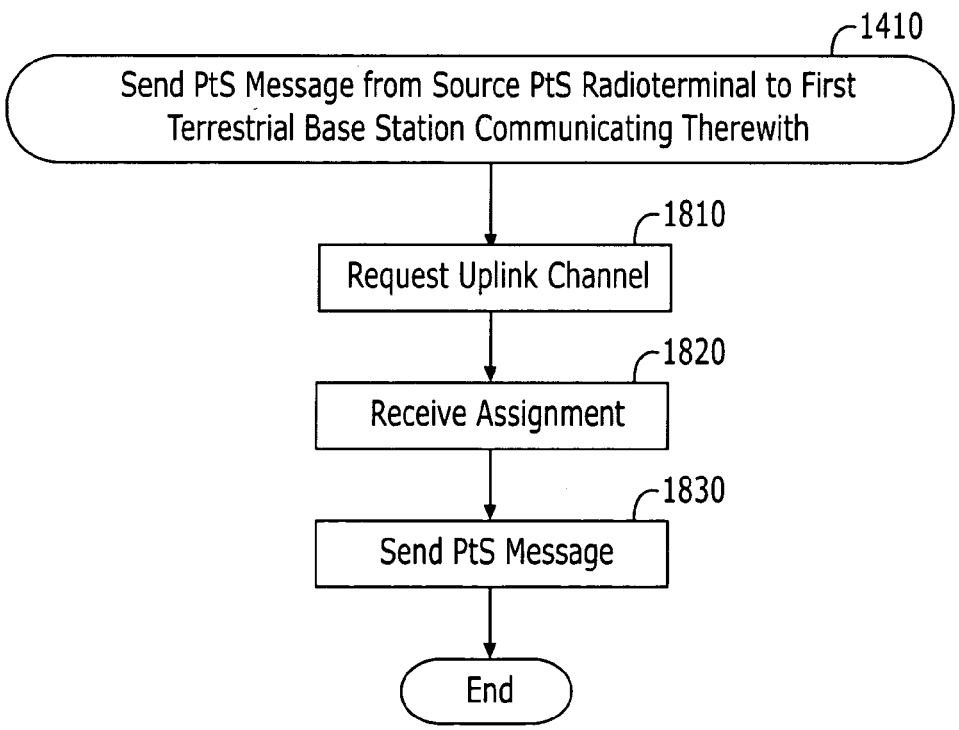

FIG. 18 is a flowchart of operations that may be performed in sending a push-to-send message from the source push-to-send radioterminal to the first terrestrial base station communicating therewith according to other embodiments of the present invention. Referring to FIG. 18, at Block 1810 an uplink channel is requested from the first terrestrial base station by the source push-to-send radioterminal. At Block 1820, assignment of an uplink channel is received from the first terrestrial base station in response to the requesting. Finally, at Block 1830, the push-to-send message is sent from the source push-to-send radioterminal to the first terrestrial base station over the uplink channel in response to receiving the assignment. Other operations of FIG. 18 were described in greater detail in connection with FIG. 3B, and need not be described further herein.

Figure 19:
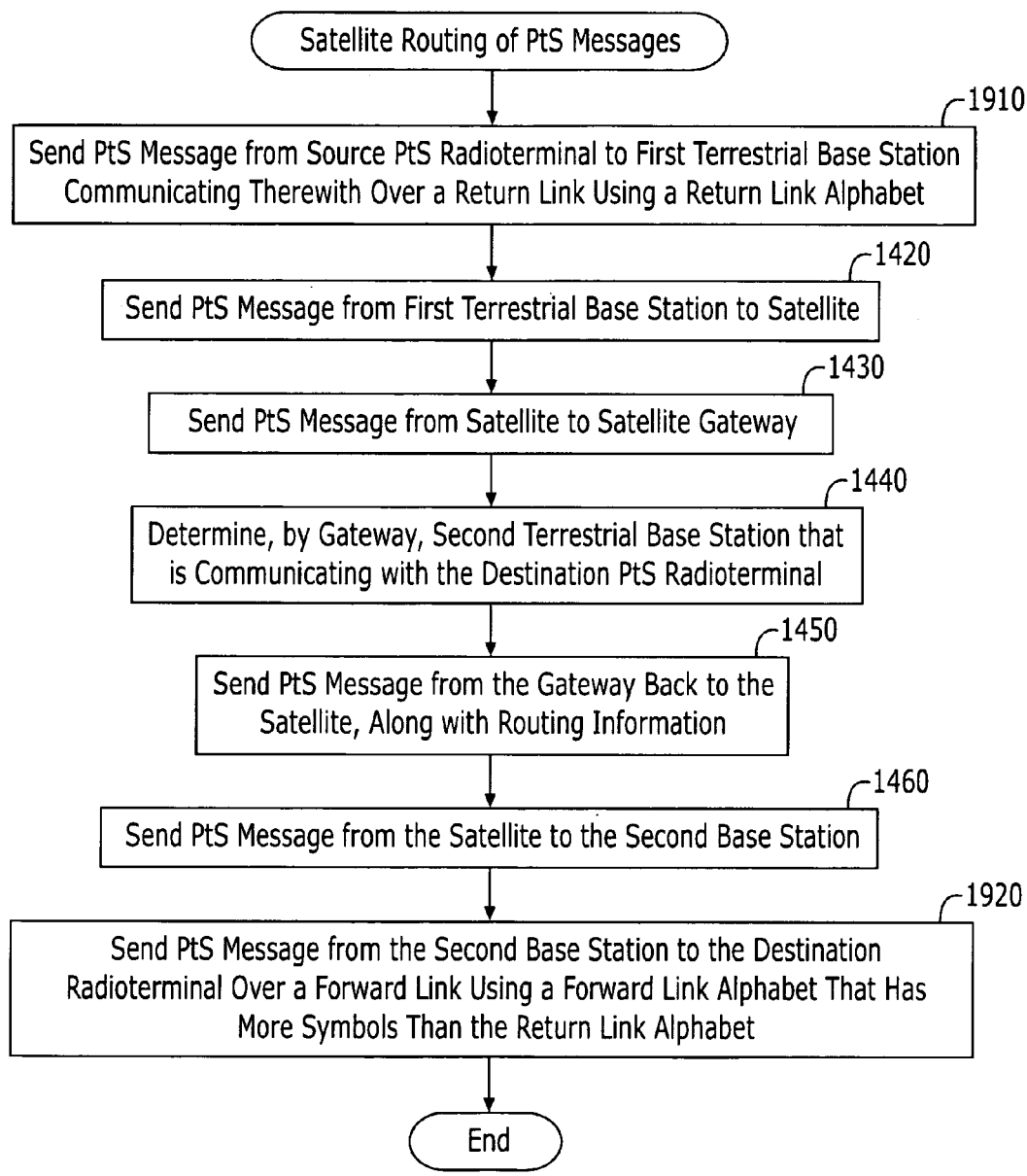

FIG. 19 is a flowchart of operations that may be performed for satellite routing of push-to-send messages according to other embodiments of the present invention. Embodiments of FIG. 19 combine operations of FIG. 14 with asymmetrical forward and return links, as were described above. In particular, at Block 1910, the operations at Block 1410 are performed over a return link using a return link alphabet. Operations of Blocks 1420–1460 are performed. Then, at Block 1920, operations of Block 1470 are performed using a forward link alphabet that has more symbols than the return link alphabet.

Still referring to FIG. 19, in some embodiments, operations of Block 1910 are performed over a channel of the return link in a manner that collides with at least one other message from a radioterminal to the first terrestrial base station, and the first terrestrial base station is configured to decode both the push-to-send message and the at least one other message using co-channel receiving principles that were already described.

Moreover, in other embodiments, the push-to-send message comprises a push-to-send signaling message and/or a push-to-send communications message, and the first terrestrial base station is configured to decode both the at least one other message and the push-to-send signaling message and/or push-to-send communication message. It also will be understood that Blocks 1910 and 1920 may be substituted for Blocks 1410 and 1470, respectively, in other embodiments of the present invention, and may also be used for return link communications and forward link communications with terrestrial base stations in other embodiments that were described above, or independent of other embodiments that were described above to perform push-to-send communications with a base station.

Figure 20:
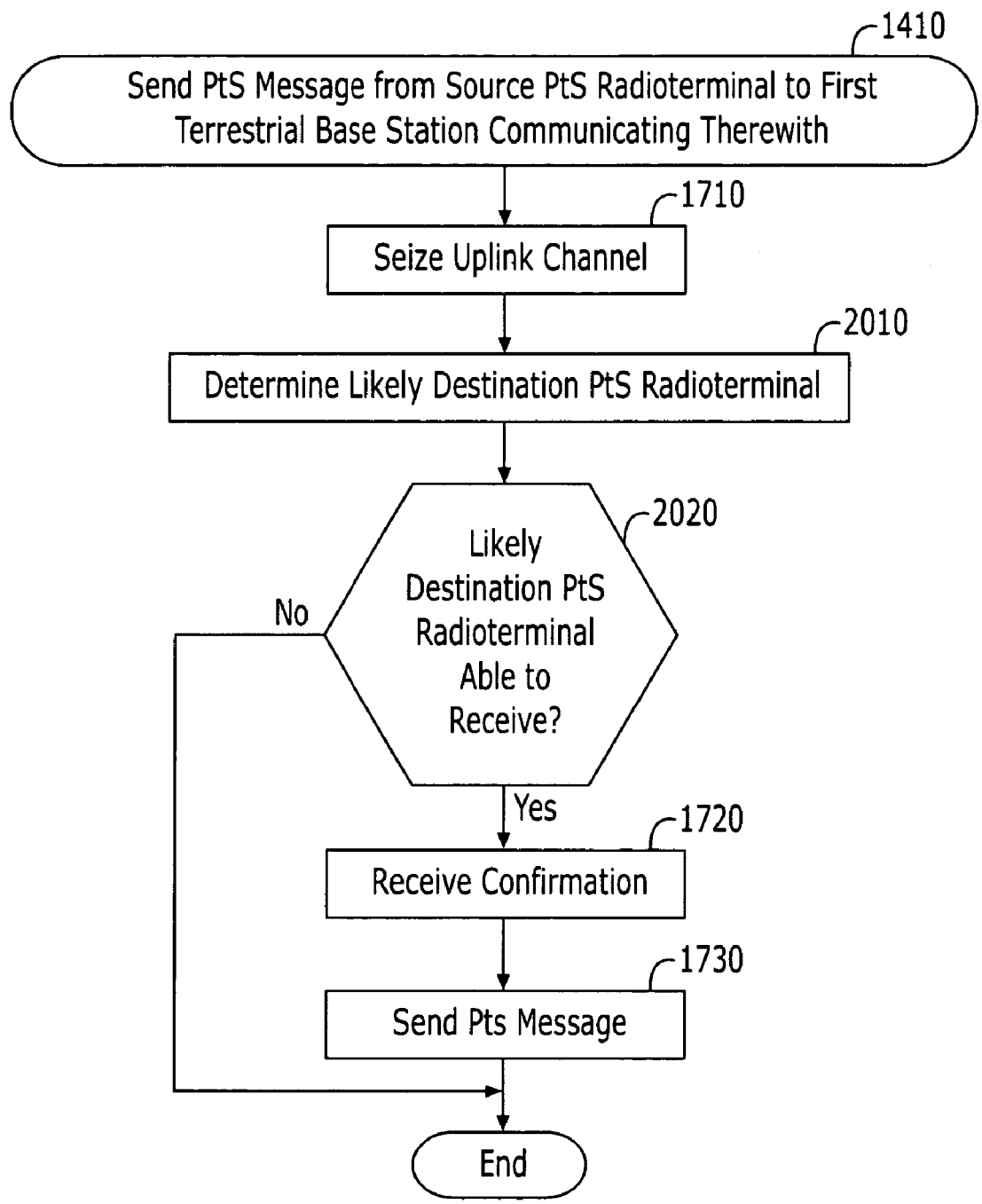
Figure 21:
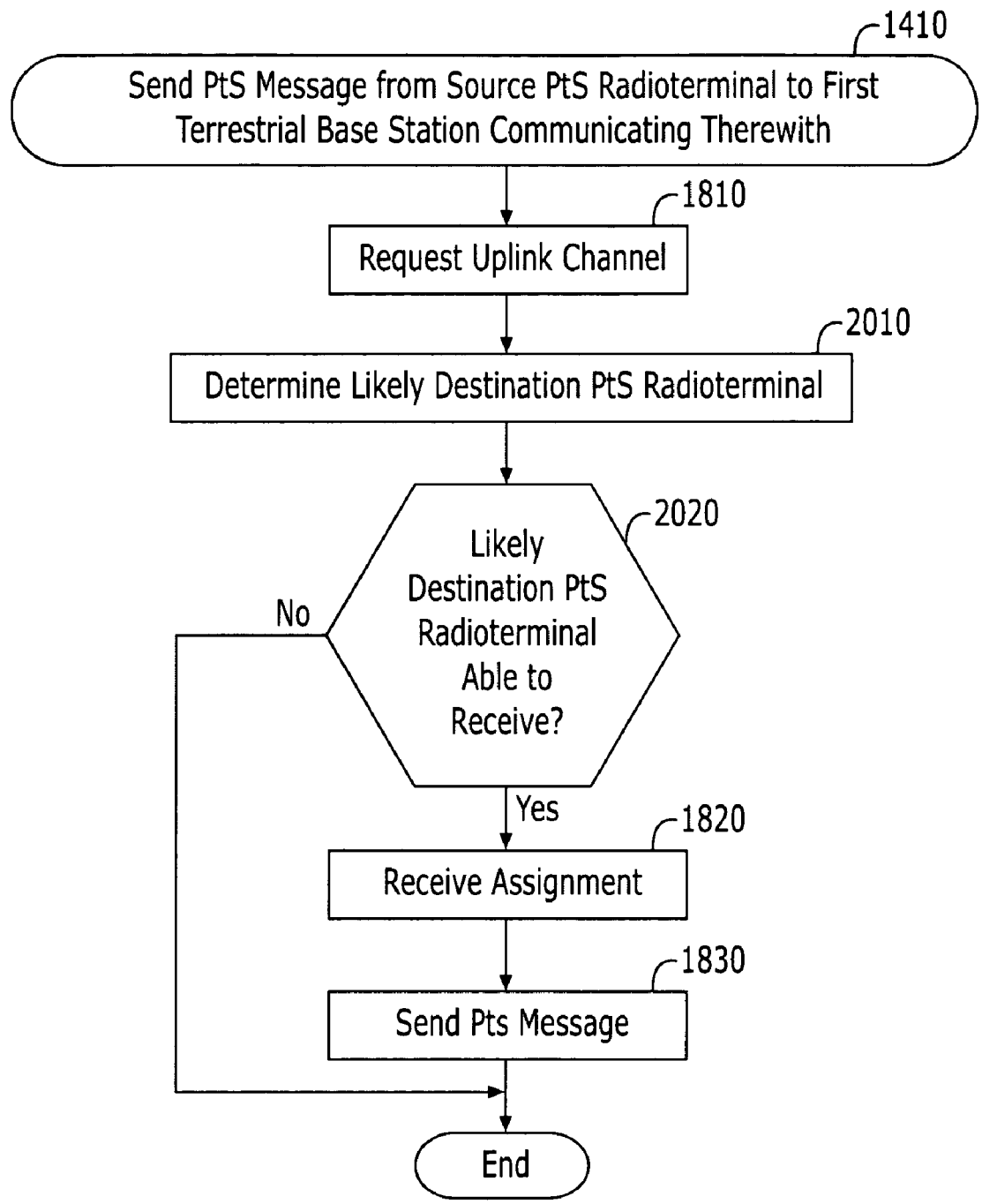

FIGS. 20 and 21 are flowcharts of other operations that may be performed according to other embodiments of the present invention. In these embodiments, at Block 2010, an identity of at least one likely destination push-to-send radioterminal is determined based upon a listing of likely destination push-to-send radioterminals that is associated with the source push-to-send radioterminal. Such a listing was described, for example, in connection with FIG. 13. At Block 2020, continued operations are performed if the at least one likely destination push-to-send radioterminal is able to receive the push-to-send message. In some embodiments, the determination of Block 2020 may be performed by determining whether the listing of likely destination push-to-send radioterminals that is associated with the source push-to-send radioterminal, such as was illustrated in FIG. 13, indicates that the at least one likely destination push-to-send radioterminal is able to receive the push-to-send message. In other embodiments, the determination of Block 2020 may be performed by interrogating the at least one likely destination push-to-send radioterminal.

Figure 22:
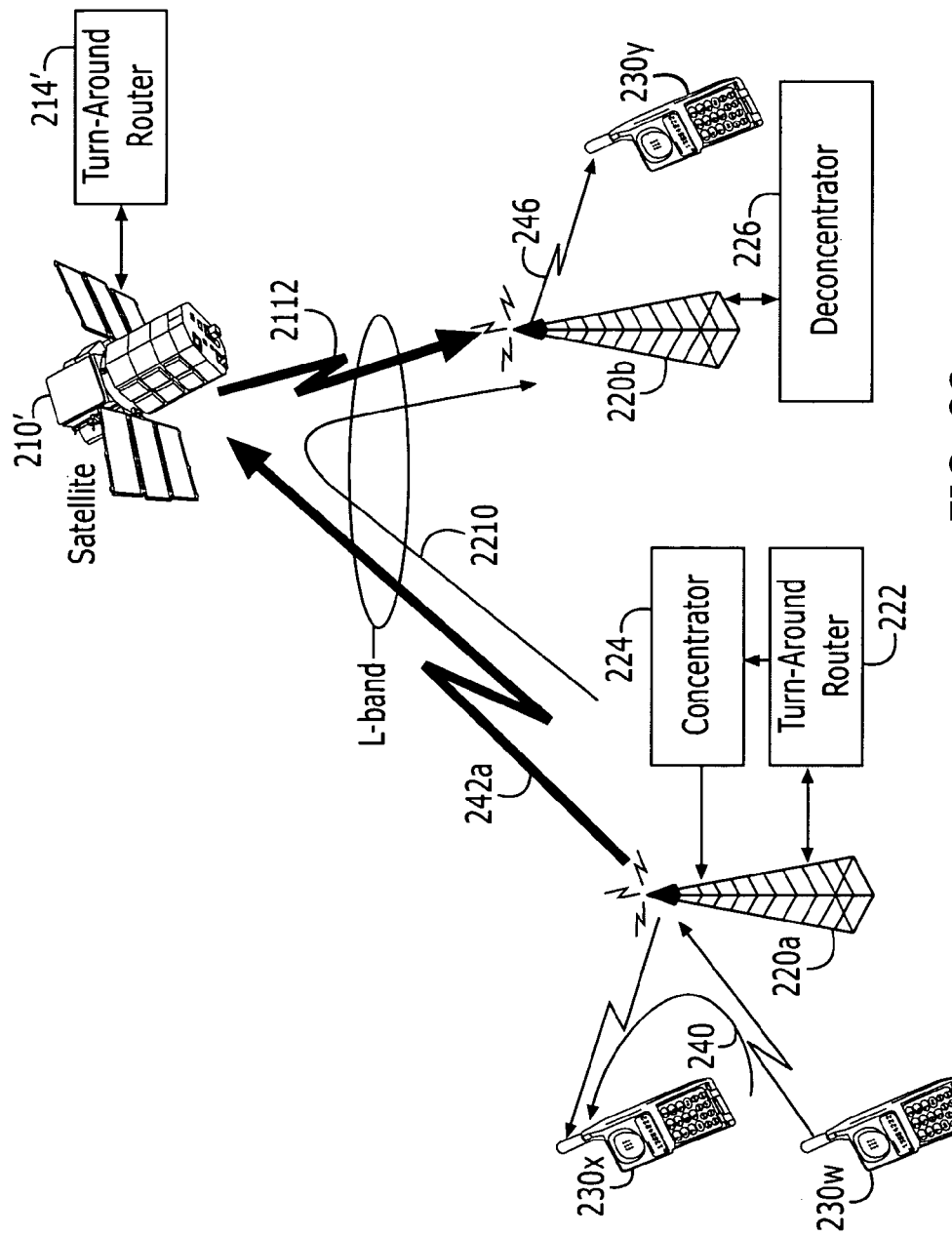
FIG. 22 is a diagram of push-to-send radioterminal communication methods and systems according to still other embodiments of the present invention.
Figure 23:
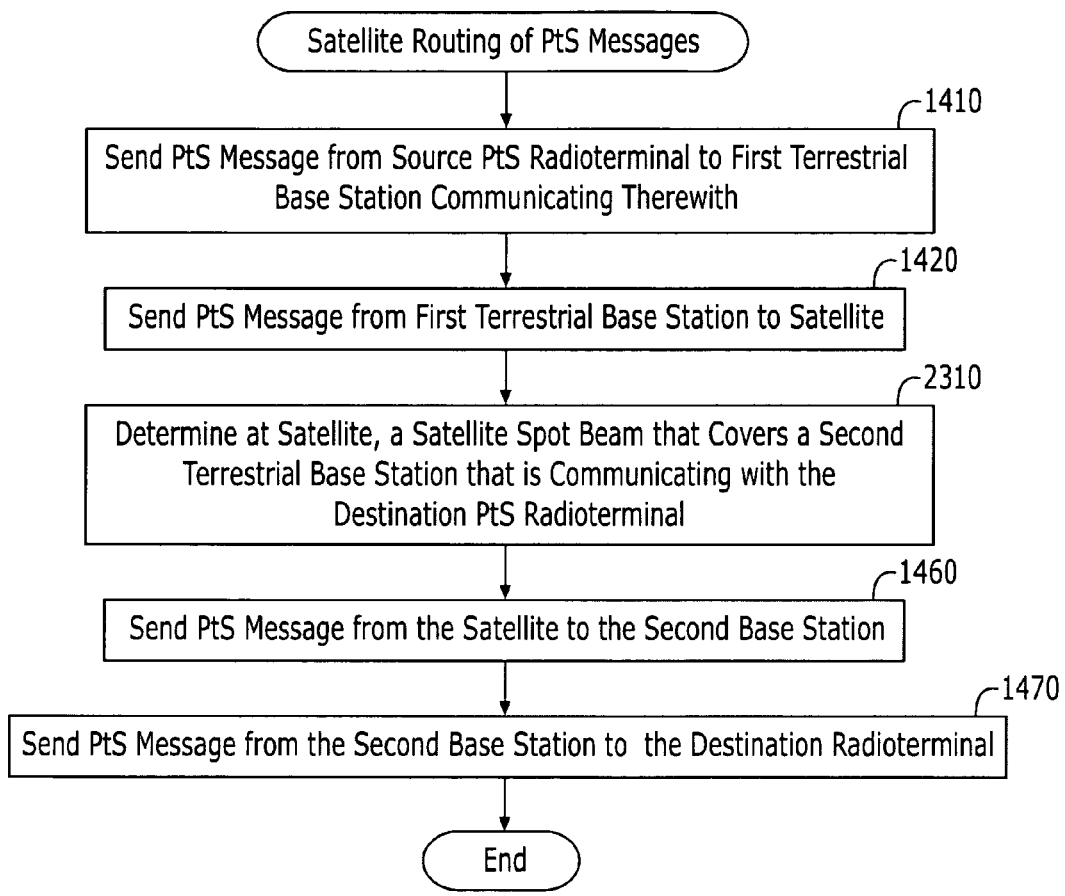
FIGS. 23 and 24 are flowcharts of operations that may be performed for push-to-send radioterminal communications of FIG. 22 according to embodiments of the present invention.

FIGS. 22 and 23 are a diagram and a flowchart, respectively, of satellite routing of push-to-send messages according to other embodiments of the present invention. In general, these embodiments, need not use a satellite gateway to determine a location of a second base station that is communicating with a destination push-to-send radioterminal. Rather, a satellite 210' itself may include additional processing capabilities thereon, including the provision of a turnaround router 214' thereon, without the need for ground-based routing at a turnaround router 214 that is associated with a satellite gateway and/or a registration center 410 that is associated with other terrestrial equipment.

Accordingly, referring to FIG. 23, the operations at Block 1410 and 1420 are performed to send a push-to-send message from a source push-to-send radioterminal 230w to a first terrestrial base station 220a communicating therewith, and to send the push-to-send message from the first terrestrial base station 220a to the satellite 210' over a satellite return link 242a. Then, at Block 2310, a determination is made at the satellite 210', of a satellite spot beam 2112 that covers a second terrestrial base station 220b that is communicating with the destination push-to-send radioterminal 230y. Operations of Blocks 1460 and 1470 are then performed, to send a push-to-send message from the satellite 210' to the second base station 220b over the spot beam that was determined, and to send the push-to-send message from the second base station 220b to the destination radioterminal 230y. Link 2210 indicates the push-to-send message being sent from the first terrestrial base station 220a to the satellite 210' and from the satellite 210' to the second terrestrial base station 220b.

Accordingly, by providing additional processing at the satellite 210', the need to route to the satellite gateway may be reduced or eliminated. It also will be understood that operations of FIGS. 15–21 may also be combined with operations of FIGS. 22 and 23, to selectively route push-to-send radioterminal communications to the satellite, to interrogate the destination push-to-send radioterminal, to seize an uplink channel, to request an uplink channel, to use different forward and return link alphabets, and to test as to whether the likely destination push-to-send radioterminal is able to receive.

Figure 24:
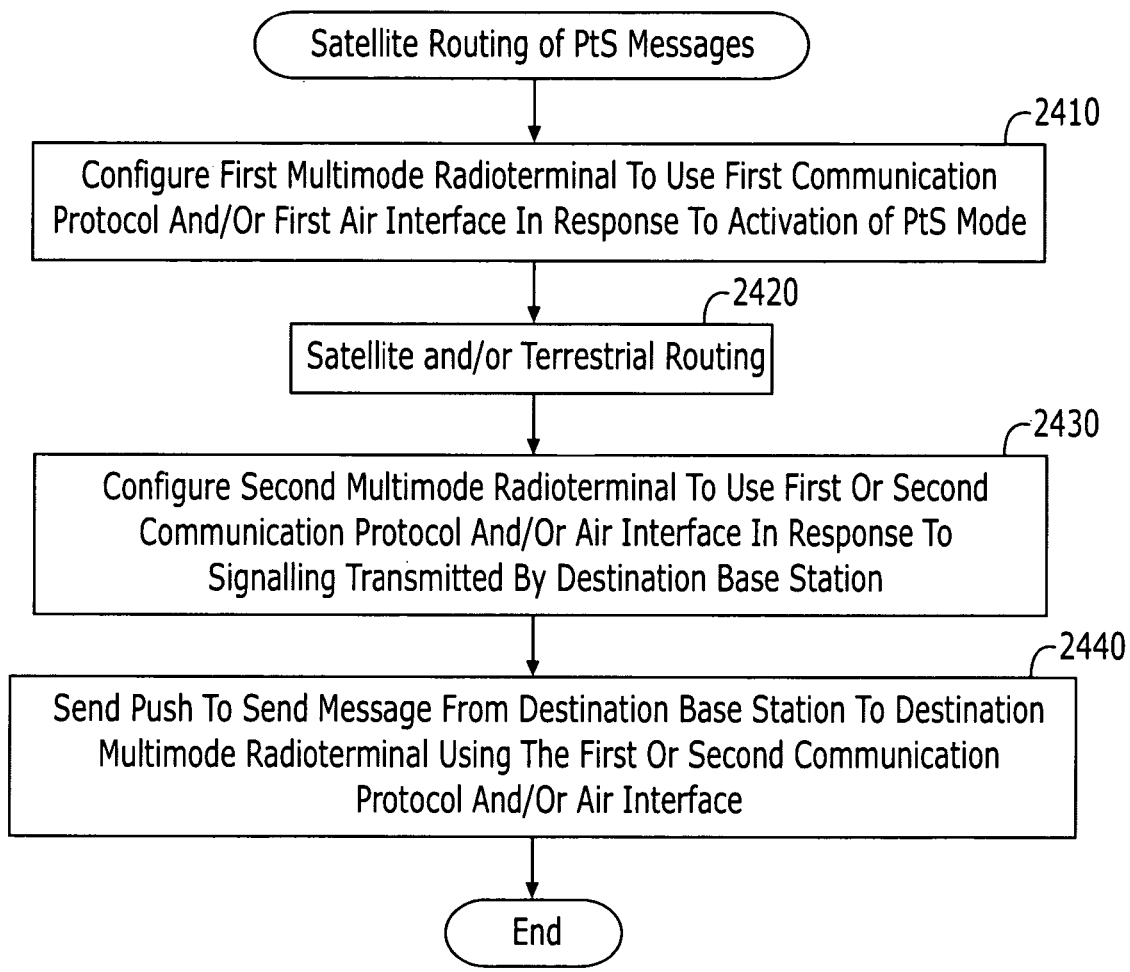

FIG. 24 is a flowchart of operations that may be performed for satellite routing of push-to-send messages according to yet other embodiments of the present invention. In these embodiments, prior to sending and receiving push-to-send messages, a multi-mode radioterminal is configured into a push-to-send mode. Moreover, push-to-send messages may be sent and received using the same or different communications protocols and/or air interfaces. As used herein, the terms "mode", "protocol" and "air interface" denote not only the multiple access method, but also the band of operation of the terminal. More specifically, referring to FIG. 24, at Block 2410 a first (source) multi-mode terminal is configured to use a first communication protocol and/or a first air interface in response to activation of a push-to-send mode. At Block 2420, satellite and/or terrestrial routing of the push-to-send message from the first radioterminal may be performed, according to any of the above-described embodiments. After routing, at Block 2430, a second (destination) multi-mode radioterminal is configured to use the first or second communication protocol and/or air interface in response to signaling transmitted by the destination base station. Finally, at Block 2440, the push-to-send message is sent from the second base station to the second (destination) multi-mode radioterminal using the first or second communication protocol and/or air interface.

Figure 25:
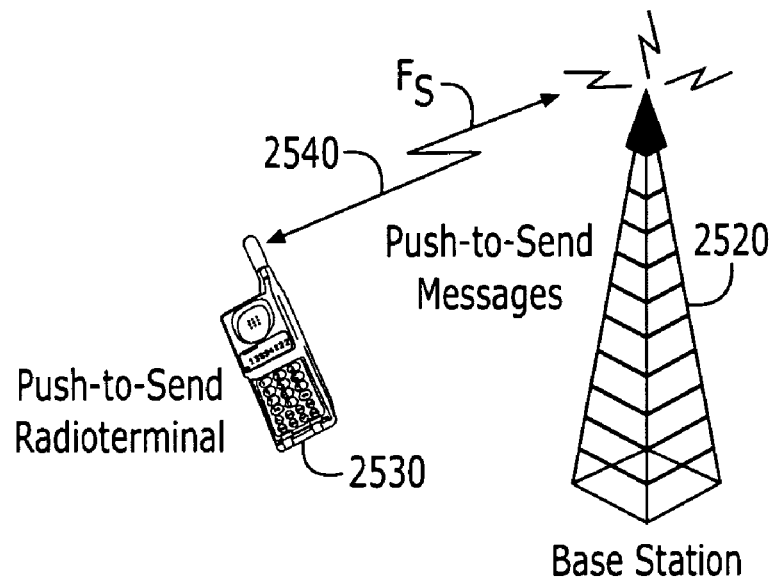
FIGS. 25 and 26 are diagrams of methods and systems for communicating between a radioterminal and a base station according to other embodiments of the present invention.

FIG. 25 is a diagram of push-to-send radioterminal communications methods and systems according to yet other embodiments of the present invention. These embodiments transmit push-to-send radioterminal messages over a terrestrial wireless network using a satellite frequency band.

More specifically, referring to FIG. 25, a base station 2520 and a push-to-send radioterminal 2530 bidirectionally communicate push-to-send messages 2540 using a satellite frequency band $F_s$. In some embodiments, the base station 2520 is a conventional terrestrial base station. In other embodiments, base station 2520 can be an ancillary terrestrial component of an ancillary terrestrial network of a satellite radioterminal system. Embodiments of FIG. 25 may be combined with any of the other embodiments described herein.

Figure 26:
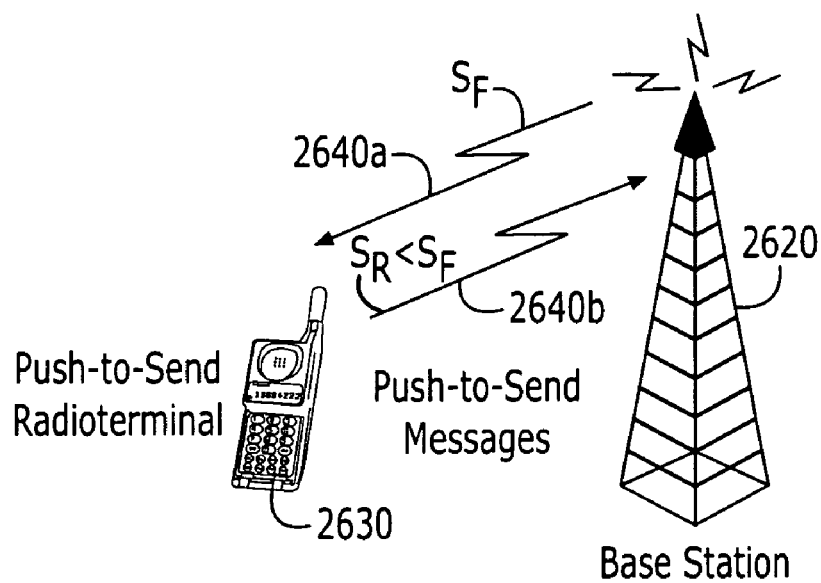

FIG. 26 is a diagram of push-to-send methods and systems according to still other embodiments of the present invention. As shown in FIG. 26, a push-to-send radioterminal 2630 and a base station 2620 communicate push-to-send messages among one another. On the downlink or forward link 2640a, a forward link alphabet $S_F$ is used. On an uplink or return link 2640b, a return link alphabet is used that has fewer symbols $S_R$ than the forward link alphabet. Stated differently, $S_R < S_F$. Both the radioterminal 2630 and the base station 2620 may be configured to include receivers and transmitters that use a forward link alphabet and a return link alphabet that has fewer symbols than the forward link alphabet. Moreover, messages on the return link may collide with at least one other message from a radioterminal to the base station 2620, but the base station 2620 is configured to decode both the push-to-send message and at least one other message, using co-channel receiving operations that were described above.

Figure 27:
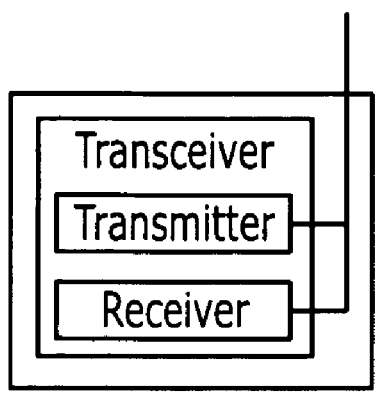
FIGS. 27 and 28 are diagrams of radioterminals and base stations, respectively, according to embodiments of the present invention.
Figure 28:
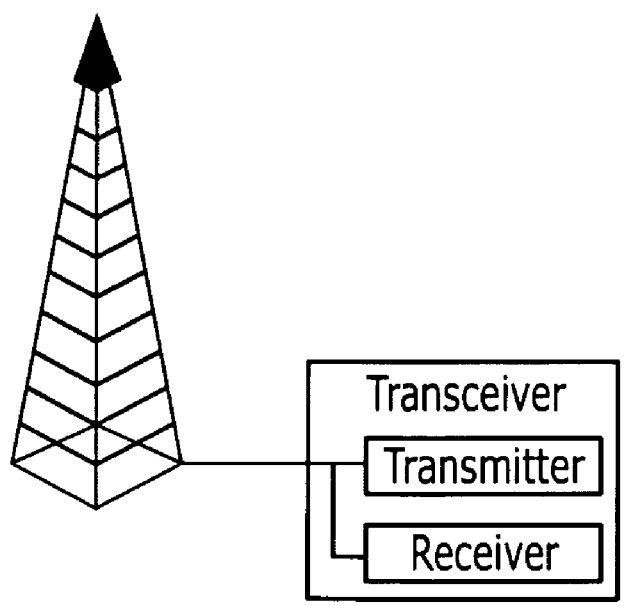

Finally, it will be understood that, in all of the embodiments that have been described herein, a push-to-send radioterminal may include a transceiver which itself includes a transmitter and a receiver, as illustrated in FIG. 27, which perform the push-to-send transmitting and receiving operations, respectively, that were described herein. The antenna of the radioterminal may be regarded as a component of the transceiver. Similarly, in all of the embodiments described herein, a terrestrial base station may also include a transceiver which itself includes a transmitter and a receiver, as illustrated in FIG. 28, which perform the push-to-send transmitting and receiving operations, respectively, that were described herein. The antenna of the base station may be regarded as a component of the transceiver.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A push-to-send radioterminal communication method comprising:
  using a satellite to route selected push-to-send messages among terrestrial base stations via wireless links between the satellite and the terrestrial base stations;
  wherein using a satellite to route selected push-to-send messages among terrestrial base stations comprises:
  accessing a listing of terrestrial base stations and push-to-send radioterminals that are communicating therewith;
  determining from the listing whether a source push-to-send radioterminal and a destination push-to-send radioterminal are communicating with a single terrestrial base station; and
  using the satellite to route a push-to-send message from the source push-to-send radioterminal to the destination push-to-send radioterminal if the source push-to-send radioterminal and the destination push-to-send radioterminal are not communicating with a single terrestrial base station.

2. A method according to claim 1 wherein using a satellite to route selected push-to-send messages among terrestrial base stations comprises:

using a satellite of a satellite radioterminal communication system to route push-to-send messages among terrestrial base stations.

3. A method according to claim 1 wherein using a satellite to route selected push-to-send messages among terrestrial base stations comprises:
using a satellite to at least partially bypass terrestrial routing of push-to-send messages among terrestrial base stations.

4. A method according to claim 1 wherein accessing is preceded by:
registering the source push-to-send radioterminal and the destination push-to-send radioterminal with the listing.

5. A method according to claim 4 wherein registering is performed upon power-on of the source push-to-send radioterminal or the destination push-to-send radioterminal and/or upon movement of the source push-to-send radioterminal or the destination push-to-send radioterminal among terrestrial base stations.

6. A method according to claim 1 wherein the listing is associated with a satellite gateway for the satellite.

7. A method according to claim 1 wherein the listing is associated with the single terrestrial base station.

8. A method according to claim 1 wherein the terrestrial base stations communicate with push-to-send radioterminals using at least one satellite band frequency.

9. A method according to claim 1 wherein using a satellite to route push-to-send messages among terrestrial base stations comprises:
using a satellite to route push-to-send signaling messages and/or push-to-send communications messages among terrestrial base stations.

10. A push-to-send radioterminal communication method comprising:
using a satellite to route selected push-to-send messages among terrestrial base stations via wireless links between the satellite and the terrestrial base stations;
wherein using a satellite to route selected push-to-send messages among terrestrial base stations comprises:
accessing a listing of terrestrial base stations and push-to-send radioterminals that are communicating therewith;
determining from the listing whether a source push-to-send radioterminal and a destination push-to-send radioterminal are communicating with terrestrial base stations that are proximate one another; and
using the satellite to route a push-to-send message from the source push-to-send radioterminal to the destination push-to-send radioterminal if the source push-to-send radioterminal and the destination push-to-send radioterminal are not communicating with terrestrial base stations that are proximate one another.

11. A method according to claim 10 wherein accessing is preceded by:
registering the source push-to-send radioterminal and the destination push-to-send radioterminal with the listing.

12. A method according to claim 11 wherein the listing is associated with a satellite gateway for the satellite.

13. A method according to claim 11 wherein the listing is associated with at least one of the terrestrial base stations that are proximate one another.

14. A method according to claim 11 wherein registering is performed upon power-on of the source push-to-send radioterminal or the destination push-to-send radioterminal and/or upon movement of the source push-to-send radioterminal or the destination push-to-send radioterminal among terrestrial base stations.

15. A push-to-send radioterminal communication method comprising:
using a satellite to route push-to-send messages among terrestrial base stations via wireless links between the satellite and the terrestrial base stations;
wherein using a satellite to route push-to-send messages among terrestrial base stations comprises:
sending a push-to-send message from a source push-to-send radioterminal to a first terrestrial base station communicating therewith;
sending the push-to-send message from the first terrestrial base station to the satellite;
sending the push-to-send message from the satellite to a satellite gateway that is associated with the satellite;
determining by the satellite gateway, a second terrestrial base station that is communicating with the destination push-to-send radioterminal;
sending the push-to-send message from the satellite gateway back to the satellite along with routing information that identifies the second terrestrial base station;
sending the push-to-send message from the satellite to the second terrestrial base station; and
sending the push-to-send message from the second terrestrial base station to the destination push-to-send radioterminal.

16. A method according to claim 15 wherein the following is performed between sending a push-to-send message from a source push-to-send radioterminal to a first terrestrial base station communicating therewith and sending the push-to-send message from the first terrestrial base station to the satellite:
determining whether the destination push-to-send radioterminal is also communicating with the first terrestrial base station; and
wherein sending the push-to-send message from the first terrestrial base station to the satellite is selectively performed if the destination push-to-send radioterminal is not communicating with the first terrestrial base station.

17. A method according to claim 15 wherein the following is performed between sending a push-to-send message from a source push-to-send radioterminal to a first terrestrial base station communicating therewith and sending the push-to-send message from the first terrestrial base station to the satellite:
determining whether the second terrestrial base station is proximate the first terrestrial base station; and
wherein sending the push-to-send message from the first terrestrial base station to the satellite is selectively performed if the second terrestrial base station is not proximate the first terrestrial base station.

18. A method according to claim 15 wherein determining by the satellite gateway, a second terrestrial base station that is communicating with the destination push-to-send radioterminal comprises:
accessing a listing, that is located at the satellite gateway and/or outside the satellite gateway, of terrestrial base stations and push-to-send radioterminals that are communicating therewith; and
identifying from the listing the second terrestrial base station that is communicating with the destination push-to-send radioterminal.

19. A method according to claim 15 wherein sending the push-to-send message from the first terrestrial base station to the satellite comprises:

concentrating the push-to-send message with other communications from the first terrestrial base station to the satellite.

20. A method according to claim 15 wherein sending the push-to-send message from the second terrestrial base station to the destination radioterminals comprises:
deconcentrating the push-to-send message from other communications from the satellite to the second terrestrial base station.

21. A method according to claim 15 wherein sending the push-to-send message from the second base station to the destination radioterminal comprises:
sending the push-to-send message from the second terrestrial base station to a plurality of destination radioterminals.

22. A method according to claim 15:
wherein sending the push-to-send message from the satellite to the second terrestrial base station comprises sending the push-to-send message from the satellite to a plurality of the second terrestrial base stations; and
wherein sending the push-to-send message from the second terrestrial base station to the destination radioterminal comprises sending the push-to-send message from the plurality of second base stations to a plurality of destination radioterminals that communicate therewith.

23. A method according to claim 15 wherein determining by the satellite gateway, a second terrestrial base station that is communicating with the destination push-to-send radioterminal is selectively performed for a first push-to-send message from the source push-to-send radioterminal to the destination push-to-send radioterminal and is not performed for subsequent push-to-send messages from the source push-to-send radioterminal to the destination push-to-send radioterminal that are closely spaced in time to the first push-to-send message from the source push-to-send radioterminal to the destination push-to-send radioterminal.

24. A method according to claim 15 wherein the following is performed between determining by the satellite gateway, a second terrestrial base station that is communicating with the destination push-to-send radioterminal and sending the push-to-send message from the satellite gateway back to the satellite along with routing information that identifies the second terrestrial base station:
interrogating the destination push-to-send-radioterminal to determine whether it is capable of receiving the push-to-send message.

25. A method according to claim 24 wherein interrogating is selectively performed for a first push-to-send message from the source push-to-send radioterminal to the destination push-to-send radioterminal and is not performed for subsequent push-to-send messages from the source push-to-send radioterminal to the destination push-to-send radioterminal that are closely spaced in time to the first push-to-send message from the source push-to-send radioterminal to the destination push-to-send radioterminal.

26. A method according to claim 15 wherein sending the push-to-send message from the satellite to the second terrestrial base station comprises sending the push-to-send message from the satellite to the second terrestrial base station using a satellite spot beam that covers a plurality of terrestrial base stations including the second terrestrial base station.

27. A method according to claim 26 further comprising ignoring the push-to-send message at the plurality of terrestrial base stations that are covered by the satellite spot beam, except for the second terrestrial base station.

28. A method according to claim 15 wherein sending a push-to-send message from a source push-to-send radioterminal to a first terrestrial base station communicating therewith comprises:
seizing an uplink channel of the first terrestrial base station by the source push-to-send radioterminal;
receiving confirmation from the first terrestrial base station in response to the seizing the uplink channel; and
sending the push-to-send message from the source push-to-send radioterminal to the first terrestrial base station over the uplink channel in response to receiving the confirmation.

29. A method according to claim 28 wherein the following is performed by the first terrestrial base station between seizing an uplink channel of the first terrestrial base station by the source push-to-send radioterminal and receiving confirmation from the first terrestrial base station in response to the seizing the uplink channel:
determining at least one likely destination push-to-send radioterminal based upon a listing of likely destination push-to-send radioterminals that is associated with the source push-to-send radioterminal;
determining whether the at least one likely destination push-to-send radioterminal is able to receive the push-to-send message; and
sending the confirmation to the source push-to-send radioterminal upon determining that the at least one likely destination push-to-send radioterminal is able to receive the push-to-send message.

30. A method according to claim 28 wherein determining whether the at least one likely destination push-to-send radioterminal is able to receive the push-to-send message comprises determining whether the listing of likely destination push-to-send radioterminals that is associated with the source push-to-send radioterminal indicates that the at least one likely destination push-to-send radioterminal is able to receive the push-to-send message.

31. A method according to claim 29 wherein determining whether the at least one likely destination push-to-send radioterminal is able to receive the push-to-send message comprises interrogating the at least one likely destination push-to-send radioterminal.

32. A method according to claim 15 wherein sending a push-to-send message from a source push-to-send radioterminal to a first terrestrial base station communicating therewith comprises:
requesting an uplink channel from the first terrestrial base station by the source push-to-send radioterminal;
receiving assignment of an uplink channel from the first terrestrial base station in response to the requesting; and
sending the push-to-send message from the source push-to-send radioterminal to the first terrestrial base station over the uplink channel in response to receiving the assignment.

33. A method according to claim 32 wherein the following is performed by the first terrestrial base station between requesting an uplink channel from the first terrestrial base station by the source push-to-send radioterminal and receiving assignment of an uplink channel from the first terrestrial base station in response to the requesting:
determining at least one likely destination push-to-send radioterminal based upon a listing of likely destination push-to-send radioterminals that is associated with the source push-to-send radioterminal;

determining whether the at least one likely destination push-to-send radioterminal is able to receive the push-to-send message; and sending the assignment of an uplink channel to the source push-to-send radioterminal upon determining that the at least one likely destination push-to-send radioterminal is able to receive the push-to-send message.

34. A method according to claim 33 wherein determining whether the at least one likely destination push-to-send radioterminal is able to receive the push-to-send message comprises determining whether the listing of likely destination push-to-send radioterminals that is associated with the source push-to-send radioterminal indicates that the at least one likely destination push-to-send radioterminal is able to receive the push-to-send message.

35. A method according to claim 33 wherein determining whether the at least one likely destination push-to-send radioterminal is able to receive the push-to-send message comprises interrogating the at least one likely destination push-to-send radioterminal.

36. A method according to claim 15:
wherein sending a push-to-send message from a source push-to-send radioterminal to a first terrestrial base station communicating therewith is performed over a return link using a return link alphabet; and
wherein sending the push-to-send message from the second base station to the destination radioterminal is performed over a forward link using a forward link alphabet that has more symbols than the return link alphabet.

37. A method according to claim 36 wherein sending a push-to-send message from a source push-to-send radioterminal to a first terrestrial base station communicating therewith is performed over a channel of the return link in a manner that collides with at least one other message from a radioterminal to the first terrestrial base station, and wherein the first terrestrial base station is configured to decode both the push-to-send message and the at least one other message.

38. A method according to claim 37 wherein the push-to-send message comprises a push-to-send signaling message and/or push-to-send communication message and wherein the first terrestrial base station is configured to decode both the at least one other message and the push-to-send signaling message and/or push-to-send communication message.

39. A push-to-send radioterminal communication method comprising:
using a satellite to route selected push-to-send messages among terrestrial base stations via wireless links between the satellite and the terrestrial base stations;
wherein using a satellite to route selected push-to-send messages among terrestrial base stations comprises:
determining whether a source push-to-send radioterminal and at least one of a plurality of destination push-to-send radioterminals are not communicating with a single terrestrial base station; and
using the satellite to route a push-to-send message from the source push-to-send radioterminal to the plurality of destination push-to-send radioterminals if the source push-to-send radioterminal and at least one of the plurality of destination push-to-send radioterminals are not communicating with the single terrestrial base station.

40. A push-to-send radioterminal communication method comprising:
using a satellite to route selected push-to-send messages among terrestrial base stations via wireless links between the satellite and the terrestrial base stations;
wherein using a satellite to route selected push-to-send messages among terrestrial base stations comprises:
determining whether a source push-to-send radioterminal and at least one of a plurality of destination push-to-send radioterminals are not communicating with a plurality of terrestrial base stations that are proximate one another; and
using the satellite to route a push-to-send message from the source push-to-send radioterminal to the plurality of destination push-to-send radioterminals if the source push-to-send radioterminal and at least one of the plurality of destination push-to-send radioterminals are not communicating with the terrestrial base stations that are proximate one another.

41. A push-to-send radioterminal communication method comprising:
using a satellite to route push-to-send messages among terrestrial base stations via wireless links between the satellite and the terrestrial base stations;
wherein using a satellite to route push-to-send messages among terrestrial base stations comprises:
sending a push-to-send message from a source push-to-send radioterminal to a first terrestrial base station communicating therewith;
sending the push-to-send message from the first terrestrial base station to the satellite;
determining at the satellite, a satellite spot beam that covers a second terrestrial base station that is communicating with the destination push-to-send radioterminal;
sending the push-to-send message from the satellite to the second terrestrial base station over the spot beam that was determined; and
sending the push-to-send message from the second terrestrial base station to the destination push-to-send radioterminal.

42. A method according to claim 41 wherein the following is performed between sending a push-to-send message from a source push-to-send radioterminal to a first terrestrial base station communicating therewith and sending the push-to-send message from the first terrestrial base station to the satellite:
determining whether the destination push-to-send radioterminal is also communicating with the first terrestrial base station; and
wherein sending the push-to-send message from the first terrestrial base station to the satellite is selectively performed if the destination push-to-send radioterminal is not communicating with the first terrestrial base station.

43. A method according to claim 41 wherein the following is performed between sending a push-to-send message from a source push-to-send radioterminal to a first terrestrial base station communicating therewith and sending the push-to-send message from the first terrestrial base station to the satellite:
determining whether the second terrestrial base station is proximate the first terrestrial base station; and
wherein sending the push-to-send message from the first terrestrial base station to the satellite is selectively performed if the second terrestrial base station is not proximate the first terrestrial base station.

44. A method according to claim 41 wherein determining at the satellite, a satellite spot beam that covers a second terrestrial base station that is communicating with the destination push-to-send radioterminal comprises:

accessing a listing that is located at the satellite, of terrestrial base stations, push-to-send radioterminals that are communicating therewith and spot beams that are assoicated therewith; and identifying from the listing the satellite spot beam that covers the second terrestrial base station that is communicating with the destination push-to-send radioterminal.

45. A method according to claim 41 wherein sending the push-to-send message from the second terrestrial base station to the destination radioterminal comprises:

sending the push-to-send message from the second terrestrial base station to a plurality of destination radioterminals.

46. A method according to claim 41 wherein the satellite spot beam that was determined covers a plurality of base stations including the second terrestrial base station.

47. A method according to claim 46 further comprising ignoring the push-to-send message at the plurality of terrestrial base stations that are covered by the satellite spot beam, except for the second terrestrial base station.

48. A method according to claim 41 wherein sending a push-to-send message from a source push-to-send radioterminal to a first terrestrial base station communicating therewith comprises:

seizing an uplink channel of the first terrestrial base station by the source push-to-send radioterminal;

receiving confirmation from the first terrestrial base station in response to the seizing the uplink channel; and sending the push-to-send message from the source push-to-send radioterminal to the first terrestrial base station over the uplink channel in response to receiving the confirmation.

49. A method according to claim 48 wherein the following is performed by the first terrestrial base station between seizing an uplink channel of the first terrestrial base station by the source push-to-send radioterminal and receiving confirmation from the first terrestrial base station in response to the seizing the uplink channel:

determining at least one likely destination push-to-send radioterminal based upon a listing of likely destination push-to-send radioterminals that is associated with the source push-to-send radioterminal;

determining whether the at least one likely destination push-to-send radioterminal is able to receive the push-to-send message; and sending the confirmation to the source push-to-send radioterminal upon determining that the at least one likely destination push-to-send radioterminal is able to receive the push-to-send message.

50. A method according to claim 49 wherein determining whether the at least one likely destination push-to-send radioterminal is able to receive the push-to-send message comprises determining whether the listing of likely destination push-to-send radioterminals that is associated with the source push-to-send radioterminal indicates that the at least one likely destination push-to-send radioterminal is able to receive the push-to-send message.

51. A method according to claim 49 wherein determining whether the at least one likely destination push-to-send radioterminal is able to receive the push-to-send message comprises interrogating the at least one likely destination push-to-send radioterminal.

52. A method according to claim 41 wherein sending a push-to-send message from a source push-to-send radioterminal to a first terrestrial base station communicating therewith comprises:

requesting an uplink channel from the first terrestrial base station by the source push-to-send radioterminal;

receiving assignment of an uplink channel from the first terrestrial base station in response to the seizing the requesting; and sending the push-to-send message from the source push-to-send radioterminal to the first terrestrial base station over the uplink channel in response to receiving the assignment.

53. A method according to claim 52 wherein the following is performed by the first terrestrial base station between requesting an uplink channel from the first terrestrial base station by the source push-to-send radioterminal and receiving assignment of an uplink channel from the first terrestrial base station in response to the requesting:

determining at least one likely destination push-to-send radioterminal based upon a listing of likely destination push-to-send radioterminals that is associated with the source push-to-send radioterminal;

determining whether the at least one likely destination push-to-send radioterminal is able to receive the push-to-send message; and sending the assignment of an uplink channel to the source push-to-send radioterminal upon determining that the at least one likely destination push-to-send radioterminal is able to receive the push-to-send message.

54. A method according to claim 53 wherein determining whether the at least one likely destination push-to-send radioterminal is able to receive the push-to-send message comprises determining whether the listing of likely destination push-to-send radioterminals that is associated with the source push-to-send radioterminal indicates that the at least one likely destination push-to-send radioterminal is able to receive the push-to-send message.

55. A method according to claim 53 wherein determining whether the at least one likely destination push-to-send radioterminal is able to receive the push-to-send message comprises interrogating the at least one likely destination push-to-send radioterminal.

56. A method according to claim 41:

wherein sending a push-to-send message from a source push-to-send radioterminal to a first terrestrial base station communicating therewith is performed over a return link using a return link alphabet; and wherein sending the push-to-send message from the second base station to the destination radioterminal is performed over a forward link using a forward link alphabet that has more symbols than the return link alphabet.

57. A method according to claim 56 wherein sending a push-to-send message from a source push-to-send radioterminal to a first terrestrial base station communicating therewith is performed over a channel of the return link in a manner that collides with at least one other message from a radioterminal to the first terrestrial base station, and wherein the first terrestrial base station is configured to decode both the push-to-send message and the at least one other message.

58. A method according to claim 57 wherein the push-to-send message comprises a push-to-send signaling message and/or push-to-send communication message and wherein the first terrestrial base station is configured to decode both the at least one other message and the push-to-send signaling message and/or push-to-send communication message.

59. A push-to-send radioterminal communication method comprising:
using a satellite to route push-to-send messages among terrestrial base stations via wireless links between the satellite and the terrestrial base stations;
wherein using a satellite to route push-to-send messages among terrestrial base stations comprises:
configuring a first multimode radioterminal to use a first communication protocol and/or a first air interface in response to activation of a push-to-send mode;
sending a push-to-send message from the first multimode radioterminal to a first terrestrial base station communicating therewith using the first communication protocol and/or the first air interface;
sending the push-to-send message from the first terrestrial base station to the satellite;
sending the push-to-send message from the satellite to a second terrestrial base station that is communicating with a second multimode radioterminal;
configuring the second multimode radioterminal to use the first communication protocol and/or the first air interface in response to the second terrestrial base station; and
sending the push-to-send message from the second terrestrial base station to the second multimode radioterminal using the first communication protocol and/or air interface.

60. A push-to-send radioterminal communication method comprising:
using a satellite to route push-to-send messages among terrestrial base stations via wireless links between the satellite and the terrestrial base stations;
wherein using a satellite to route push-to-send messages among terrestrial base stations comprises:
configuring a first multimode radioterminal to use a first communication protocol and/or a first air interface in response to activation of a push-to-send mode;
sending a push-to-send message from the first multimode radioterminal to a first terrestrial base station communicating therewith using the first communication protocol and/or the first air interface;
sending the push-to-send message from the first terrestrial base station to the satellite;
sending the push-to-send message from the satellite to a second terrestrial base station that is communicating with a second multimode radioterminal;
configuring the second multimode radioterminal to use a second communication protocol and/or a second air interface that is different from the first communication protocol and/or the first air interface in response to the second terrestrial base station; and
sending the push-to-send message from the second terrestrial base station to the second multimode radioterminal using the second communication protocol and/or air interface.

61. A push-to-send radioterminal communication method comprising:
transmitting push-to-send messages among push-to-send radioterminals and terrestrial base stations using a satellite frequency band; and
using a satellite to route selected push-to-send messages among terrestrial base stations;
wherein using a satellite to route selected push-to-send messages among terrestrial base stations comprises:
determining whether a source push-to-send radioterminal and a destination push-to-send radioterminal are communicating with a single terrestrial base station; and
using the satellite to route a push-to-send message from the source push-to-send radioterminal to the destination push-to-send radioterminal if the source push-to-send radioterminal and the destination push-to-send radioterminal are not communicating with a single terrestrial base station.

62. A push-to-send radioterminal communication method comprising:
transmitting push-to-send messages among push-to-send radioterminals and terrestrial base stations using a satellite frequency band; and
using a satellite to route selected push-to-send messages among terrestrial base stations;
wherein using a satellite to route selected push-to-send messages among terrestrial base stations comprises:
determining whether a source push-to-send radioterminal and a destination push-to-send radioterminal are communicating with terrestrial base stations that are proximate one another; and
using the satellite to route a push-to-send message from the source push-to-send radioterminal to the destination push-to-send radioterminal if the source push-to-send radioterminal and the destination push-to-send radioterminal are not communicating with terrestrial base stations that are proximate one another.

63. A push-to-send radioterminal communication system comprising:
a terrestrial base station that is configured to transmit push-to-send messages from source push-to-send radioterminals to a satellite via a wireless link from the terrestrial base station to the satellite and to transmit push-to-send messages that are received from the satellite via a wireless link from the satellite to the terrestrial base station to destination push-to-send radioterminals;
wherein the terrestrial base station is further configured to determine whether a destination push-to-send radioterminal is communicating with the terrestrial base station and to transmit the push-to-send message from the source push-to-send radioterminal to the satellite if the destination push-to-send radioterminal is not communicating with the terrestrial base station;
wherein the terrestrial base station further comprises a listing of terrestrial base stations and push-to-send radioterminals that are communicating therewith; and
wherein the terrestrial base station is configured to determine from the listing whether the destination push-to-send radioterminal is communicating with the terrestrial base station.

64. A system according to claim 63 wherein the terrestrial base station is configured to transmit selected push-to-send messages from the source push-to-send radioterminals to the satellite.

65. A system according to claim 63 wherein the base station is further configured to register push-to-send radioterminals that are communicating therewith in the listing.

66. A system according to claim 63 wherein the terrestrial base station communicates with push-to-send radioterminals using at least one satellite band frequency.

67. A system according to claim 63 wherein the terrestrial base station is further configured to concentrate the push-to-send messages from source push-to-send radioterminals with other communications from the terrestrial base station to the satellite.

68. A system according to claim 63 wherein the terrestrial base station is further configured to deconcentrate the push-to-send messages from the satellite from other communications from the satellite.

69. A system according to claim 63 wherein the terrestrial base station is further configured to send a push-to-send message that is received from the satellite to a plurality of destination radioterminals that are communicating therewith.

70. A system according to claim 63 wherein the push-to-send messages comprise push-to-send signaling messages and/or push-to-send communications messages.

71. A system according to claim 63 wherein the terrestrial base station is further configured to ignore a push-to-send message that is received from the satellite but that does not apply to a push-to-send radioterminal that is communicating with the terrestrial base station.

72. A system according to claim 63 wherein the terrestrial base station is further configured to determine whether at least one of a plurality of destination push-to-send radioterminals is not communicating with the terrestrial base station and to transmit a push-to-send message from the source push-to-send radioterminal to the satellite if at least one of the plurality of destination push-to-send radioterminals is not communicating with the terrestrial base station.

73. A push-to-send radioterminal communication system comprising:
a terrestrial base station that is configured to transmit push-to-send messages from source push-to-send radioterminals to a satellite via a wireless link from the terrestrial base station to the satellite and to transmit push-to-send messages that are received from the satellite via a wireless link from the satellite to the terrestrial base station to destination push-to-send radioterminals;
wherein the terrestrial base station is further configured to determine whether a destination push-to-send radioterminal is communicating with another terrestrial base station that is proximate the terrestrial base station and to transmit the push-to-send message from the source push-to-send radioterminal to the satellite if the destination push-to-send radioterminal is not communicating with another terrestrial base station that is proximate the terrestrial base station;
wherein the terrestrial base station further comprises a listing of terrestrial base stations and push-to-send radioterminals that are communicating therewith; and
wherein the terrestrial base station is configured to determine from the listing whether the destination push-to-send radioterminal is communicating with another terrestrial base station that is proximate the terrestrial base station.

74. A system according to claim 73 wherein the terrestrial base station is further configured to register push-to-send radioterminals that are communicating therewith in the listing.

75. A push-to-send radioterminal communication system comprising:
a terrestrial base station that is configured to transmit push-to-send messages from source push-to-send radioterminals to a satellite via a wireless link from the terrestrial base station to the satellite and to transmit push-to-send messages that are received from the satellite via a wireless link from the satellite to the terrestrial base station to destination push-to-send radioterminals;
wherein the terrestrial base station is further configured to determine whether at least one of a plurality of destination push-to-send radioterminals is not communicating with another terrestrial base station that is proximate the terrestrial base station and to transmit a push-to-send message from the source push-to-send radioterminal to the satellite if at least one of the plurality of destination push-to-send radioterminals is not communicating with another terrestrial base station that is proximate the terrestrial base station.

76. A push-to-send radioterminal communication system comprising:
a terrestrial base station that is configured to transmit push-to-send messages from source push-to-send radioterminals to a satellite via a wireless link from the terrestrial base station to the satellite and to transmit push-to-send messages that are received from the satellite via a wireless link from the satellite to the terrestrial base station to destination push-to-send radioterminals;
wherein the terrestrial base station is configured to receive a push-to-send message from a source push-to-send radioterminal communicating therewith over a return link using a return link alphabet; and
wherein the terrestrial base station is configured to send a push-to-send message to a destination radioterminal over a forward link using a forward link alphabet that has more symbols than the return link alphabet.

77. A system according to claim 76 wherein the terrestrial base station is configured to receive a push-to-send message from a source push-to-send radioterminal communicating therewith over the return link in a manner that collides with at least one other message from a radioterminal to the terrestrial base station, and wherein the terrestrial base station is configured to decode both the push-to-send message and the at least one other message.

78. A push-to-send radioterminal communication system comprising:
a satellite gateway that is configured to route selected push-to-send messages among terrestrial base stations via wireless links between the terrestrial base station and a satellite;
wherein the satellite gateway is configured to route selected push-to-send messages among terrestrial base stations via wireless links between the terrestrial base stations and the satellite by routing a push-to-send message from a source terrestrial base station that is communicating with a source push-to-send radioterminal to a destination terrestrial base station that is communicating with a destination push-to-send radioterminal if the source terrestrial base station and the destination terrestrial base station are not proximate one another.

79. A system according to claim 78 wherein the satellite gateway further comprises:
a listing of terrestrial base stations and push-to-send radioterminals that are communicating therewith; and
wherein the gateway is configured to determine the destination base station from the listing.

80. A system according to claim 79 wherein the satellite gateway is further configured to register the push-to-send radioterminals with the listing.

81. A system according to claim 80 wherein the registering is performed upon power-on of a push-to-send radioterminal and/or upon movement of a push-to-send radioterminal among terrestrial base stations.

82. A system according to claim 78 wherein the satellite gateway is configured to route push-to-send messages among terrestrial base stations by routing push-to-send signaling messages and/or push-to-send communications messages among the terrestrial base stations.

83. A push-to-send radioterminal communication system comprising:
a satellite gateway that is configured to route selected push-to-send messages among terrestrial base stations via wireless links between the terrestrial base stations and a satellite;
wherein the satellite gateway is configured to route selected push-to-send messages among terrestrial base stations via a satellite by routing a push-to-send message from a source terrestrial base station that is communicating with a source push-to-send radioterminal to a destination terrestrial base station that is communicating with a destination push-to-send radioterminal if the source terrestrial base station and the destination terrestrial base station are not identical;
wherein the satellite gateway further comprises a listing of terrestrial base stations and push-to-send radioterminals that are communicating therewith; and
wherein the satellite gateway is configured to determine the destination terrestrial base station from the listing.

84. A system according to claim 83 wherein the satellite gateway is further configured to register the push-to-send radioterminals with the listing.

85. A system according to claim 84 wherein the registering is performed upon power-on of a push-to-send radioterminal and/or upon movement of a push-to-send radioterminal among terrestrial base stations.

86. A push-to-send radioterminal communication system comprising:
a satellite gateway that is configured to route push-to-send messages among terrestrial base stations via wireless links between the terrestrial base stations and a satellite;
wherein the satellite gateway is configured to route a push-to-send message among terrestrial base stations by receiving a push-to-send message from the satellite including identification of a destination push-to-send radioterminal, determining a destination terrestrial base station that is communicating with the destination push-to-send radioterminal, and sending the push-to-send message back to the satellite along with information that identifies the destination terrestrial base station.

87. A system according to claim 86 wherein the following is performed between determining a destination terrestrial base station that is communicating with the destination push-to-send radioterminal and sending the push-to-send message back to the satellite along with routing information that identifies the destination terrestrial base station:
interrogating the destination push-to-send-radioterminal to determine whether it is capable of receiving the push-to-send message.

88. A system according to claim 87 wherein interrogating is selectively performed for a first push-to-send message from the source push-to-send radioterminal to the destination push-to-send radioterminal and is not performed for subsequent push-to-send messages from the source push-to-send radioterminal to the destination push-to-send radioterminal that are closely spaced in time to the first push-to-send message from the source push-to-send radioterminal to the destination push-to-send radioterminal.

89. A push-to-send radioterminal communication system comprising:
a satellite that is configured to route push-to-send messages among terrestrial base stations via wireless links between the satellite and the terrestrial base stations;
wherein the satellite is configured to route push-to-send messages among terrestrial base stations by routing a push-to-send message from a source terrestrial base station that is communicating with a source push-to-send radioterminal to a destination terrestrial base station that is communicating with a destination push-to-send radioterminal if the source terrestrial base station and the destination terrestrial base station are not identical;
wherein the satellite further comprises a listing of terrestrial base stations and push-to-send radioterminals that are communicating therewith; and
wherein the satellite is configured to determine the destination terrestrial base station from the listing.

90. A system according to claim 89 wherein the satellite comprises a space-based component of a satellite radioterminal communication system.

91. A system according to claim 89 wherein the satellite is further configured to register the push-to-send radioterminals with the listing.

92. A system according to claim 91 wherein registering is performed upon power-on of a push-to-send radioterminal and/or upon movement of a push-to-send radioterminal among terrestrial base stations.

93. A system according to claim 89 wherein the satellite is configured to route push-to-send signaling messages and/or push-to-send communications messages among terrestrial base stations.

94. A push-to-send radioterminal communication system comprising:
a satellite that is configured to route push-to-send messages among terrestrial base stations via wireless links between the satellite and the terrestrial base stations;
wherein the satellite is configured to route push-to-send messages among terrestrial base stations by routing a push-to-send message from a source terrestrial base station that is communicating with a source push-to-send radioterminal to a destination terrestrial base station that is communicating with a destination push-to-send radioterminal if the source terrestrial base station and the destination terrestrial base station are not proximate one another;
wherein the satellite further comprises a listing of terrestrial base stations and push-to-send radioterminals that are communicating therewith; and
wherein the satellite is configured to determine the destination terrestrial base station from the listing.

95. A system according to claim 94 wherein the satellite is further configured to register the push-to-send radioterminals with the listing.

96. A system according to claim 95 wherein registering is performed upon power-on of a push-to-send radioterminal and/or upon movement of a push-to-send radioterminal among terrestrial base stations.

97. A push-to-send radioterminal communication system comprising:
a satellite that is configured to route push-to-send messages among terrestrial base stations via wireless links between the satellite and the terrestrial base stations;
wherein the satellite is further configured to receive a push-to-send message from a source terrestrial base station including identification of a destination pushto-send radioterminal, and to send the push-to-send message from the satellite to a destination terrestrial base station that is communicating with the destination push-to-send radioterminal; and wherein the satellite is configured to selectively determine a destination terrestrial base station that is communicating with the destination push-to-send radioterminal for a first push-to-send message from the source push-to-send radioterminal to the destination push-to-send radioterminal but not for subsequent push-to-send messages from the source push-to-send send radioterminal to the destination push-to-send radioterminal that are closely spaced in time to the first push-to-send message from the source push-to-send radioterminal to the destination push-to-send radioterminal.

98. A system according to claim 97 wherein the satellite is further configured to receive the push-to-send message along with other communications from the first terrestrial base station.

99. A system according to claim 97 wherein the satellite is configured to send the push-to-send message to the second terrestrial base station along with other communications from the satellite.

100. A system according to claim 97 wherein the satellite is further configured to send the push-to-send message to a plurality of destination terrestrial base stations.

101. A push-to-send radioterminal communication system comprising:
a satellite that is configured to route push-to-send messages among terrestrial base stations via wireless links between the satellite and the terrestrial base stations;
wherein the satellite is further configured to receive a push-to-send message from a source terrestrial base station including identification of a destination push-to-send radioterminal, and to send the push-to-send message from the satellite to a destination terrestrial base station that is communicating with the destination push-to-send radioterminal; and
wherein the following is performed between receiving a push-to-send message from a source terrestrial base station and sending the push-to-send message from the satellite to the destination terrestrial base station:
interrogating the destination push-to-send radioterminal to determine whether it is capable of receiving the push-to-send message.

102. A system according to claim 101 wherein interrogating is selectively performed for a first push-to-send message from the source push-to-send radioterminal to the destination push-to-send radioterminal and is not performed for subsequent push-to-send messages from the source push-to-send radioterminal to the destination push-to-send radioterminal that are closely spaced in time to the first push-to-send message from the source push-to-send radioterminal to the destination push-to-send radioterminal.

103. A push-to-send radioterminal communication system comprising:
a satellite that is configured to route push-to-send messages among terrestrial base stations via wireless links between the satellite and the terrestrial base stations;
wherein the satellite is further configured to receive a push-to-send message from a source terrestrial base station including identification of a destination push-to-send radioterminal, and to send the push-to-send message from the satellite to a destination terrestrial base station that is communicating with the destination push-to-send radioterminal; and wherein the satellite is configured to send the push-to-send message from the satellite to the destination terrestrial base station by sending the push-to-send message from the satellite to the destination terrestrial base station using a satellite spot beam that covers a plurality of terrestrial base stations including the destination terrestrial base station.

104. A push-to-send radioterminal communication system comprising:
a satellite that is configured to route push-to-send messages among terrestrial base stations via wireless links between the satellite and the terrestrial base stations;
wherein the satellite is configured to route push-to-send messages among terrestrial base stations by receiving a push-to-send message from a source terrestrial base station that is communicating with a source push-to-send radioterminal, determining a satellite spot beam that covers a destination terrestrial base station that is communicating with a destination push-to-send radioterminal, and sending the push-to-send message to the destination terrestrial base station over the spot beam that was determined.

105. A system according to claim 104 wherein the satellite is configured to determine the satellite spot beam that covers a destination terrestrial base station that is communicating with the destination push-to-send radioterminal by accessing a listing that is located at the satellite, of terrestrial base stations, push-to-send radioterminals that are communicating therewith and spot beams that are associated therewith, and by identifying from the listing the satellite spot beam that covers the destination terrestrial base station.

106. A system according to claim 104 wherein the satellite spot beam that was determined covers a plurality of base stations including the destination terrestrial base station.

107. A push-to-send radioterminal system comprising:
a central server that comprises registration information for all push-to-send radioterminals in the push-to-send radioterminal system;
wherein the registration information comprises:
a listing of terrestrial base stations and push-to-send radioterminals that are communicating therewith;
wherein the listing further comprises a listing of likely destination push-to-send radioterminals that is associated with a source push-to-send radioterminal; and
wherein the listing further comprises a listing of spot beams that are associated with the terrestrial base stations.

108. A system according to claim 107 wherein the central server is configured to register the push-to-send radioterminals with the listing.

109. A system according to claim 108 wherein the central server is configured to register a push-to-send radioterminal with the listing upon power-on of the push-to-send radioterminal and/or upon movement of the push-to-send radioterminal among terrestrial base stations.

* * * * *

UNITED STATES PATENT AND TRADEMARK OFFICE
CERTIFICATE OF CORRECTION

PATENT NO.        : 7,203,490 B2
APPLICATION NO.   : 10/795620
DATED             : April 10, 2007
INVENTOR(S)       : Karabinis et al.

It is certified that error appears in the above-identified patent and that said Letters Patent is hereby corrected as shown below:

Column 30, line 31, change "claim 28" to -- claim 29 --.
Column 34, line 8, change "to the seizing the" to -- to the --.

Signed and Sealed this

Fifteenth Day of December, 2009

David J. Kappos
*Director of the United States Patent and Trademark Office*